United States Patent [19]
Sato

[11] Patent Number: 6,058,149
[45] Date of Patent: May 2, 2000

[54] FRAME TRANSMITTING AND RECEIVING METHOD AND COMMUNICATION DEVICE USING SUCH A METHOD

[75] Inventor: Kazuhiro Sato, Tachikawa, Japan

[73] Assignee: Fujitsu Limited, Kanagawa, Japan

[21] Appl. No.: 08/772,185

[22] Filed: Dec. 20, 1996

[30] Foreign Application Priority Data

Mar. 29, 1996 [JP] Japan .................................. 8-076927
May 10, 1996 [JP] Japan .................................. 8-116586

[51] Int. Cl.⁷ .............................. H04L 7/00; H04J 3/06
[52] U.S. Cl. ...................... 375/365; 375/366; 370/509; 370/512
[58] Field of Search .................................. 375/362, 365, 375/363, 219, 364; 370/509, 510, 512, 516, 517

[56] References Cited

U.S. PATENT DOCUMENTS

| | | | |
|---|---|---|---|
| 4,543,652 | 9/1985 | Amada et al. | 370/368 |
| 4,876,670 | 10/1989 | Nakabayashi et al. | 365/194 |
| 5,140,618 | 8/1992 | Kinoshita et al. | 375/368 |
| 5,317,572 | 5/1994 | Satoh | 370/509 |
| 5,434,890 | 7/1995 | Kimura et al. | 375/365 |
| 5,448,562 | 9/1995 | Osakabe et al. | 370/392 |
| 5,452,305 | 9/1995 | Nagatake | 370/516 |
| 5,663,954 | 9/1997 | Hakkanen | 370/509 |

FOREIGN PATENT DOCUMENTS 1-288189 11/1989 Japan .
4-275792 10/1992 Japan .
8-107465 4/1996 Japan .

Primary Examiner—Stephen Chin
Assistant Examiner—Albert Park

[57] ABSTRACT

There is provided a method of transmitting and receiving a frame including unique pattern information indicative of a starting point of digital information. Step (a) performs a receive synchronizing process in which the frame is pulled in a given phase of a machine cycle equal to m which is equal to $(1/N) \times L$ where L denotes the number of bits forming the frame, N is a positive integer and m is a positive integer larger than 2. Step (b) performs, in a receive process executing phase forming part of a same machine cycle as that of the step (a), a receive process in which receive control channel data contained in a received frame is written into a shared memory in accordance with first m-bit stream program information which defines the receive process and is stored in the shared memory. Step (c) performs, in a transmit process executing phase forming another part of the same machine cycle, a transmit process in accordance with second m-bit stream program information which defines a transmit procedure and is stored in the shared memory while reading transmit control channel data stored in the shared memory, whereby the transmit control channel data is transmitted in a phase of a bit level or a clock level.

6 Claims, 41 Drawing Sheets

FIG.2 PRIOR ART

| F No. | \multicolumn{13}{c|}{TS NUMBER} |
|---|---|---|---|---|---|---|---|---|---|---|---|

| F No. | 00 | 01 | 02···09 | 10···31 | 32 | 33 | 34 | ····· | 125 | 126 | 127 |
|---|---|---|---|---|---|---|---|---|---|---|---|
| 00 | MF | M-CH | — | | B0 | B1 | B2 | ····· | B93 | B94 | — |
| 01 | SF | \multicolumn{3}{c|}{C0-CH} | B0 | B1 | B2 | ····· | B93 | B94 | — |
| 02 | SF | \multicolumn{3}{c|}{C1-CH} | B0 | B1 | B2 | ····· | B93 | B94 | — |
| 03 | SF | \multicolumn{3}{c|}{C2-CH} | B0 | B1 | B2 | ····· | B93 | B94 | — |
| 04 | SF | \multicolumn{3}{c|}{C3-CH} | B0 | B1 | B2 | ····· | B93 | B94 | — |
| 05 | SF | \multicolumn{3}{c|}{D0-CH} | B0 | B1 | B2 | ····· | B93 | B94 | — |
| 06 | SF | \multicolumn{3}{c|}{D1-CH} | B0 | B1 | B2 | ····· | B93 | B94 | — |
| 07 | SF | \multicolumn{3}{c|}{—} | B0 | B1 | B2 | ····· | B93 | B94 | — |
| 08 | SF | \multicolumn{3}{c|}{—} | B0 | B1 | B2 | ····· | B93 | B94 | — |
| 09 ⑤ 29 | SF | \multicolumn{3}{c|}{—} | B0 | B1 | B2 | ····· | B93 | B94 | — |
| 30 | SF | \multicolumn{3}{c|}{—} | B0 | B1 | B2 | ····· | B93 | B94 | — |
| 31 | SF | \multicolumn{3}{c|}{—} | B0 | B1 | B2 | ····· | B93 | B94 | — |

MF : MULTIFRAME SYNC PATTERN
SF : SINGLE FRAME SYNC PATTERN
— : NOT USED (FREE)

| FIG.4A |
|--------|
| FIG.4B |

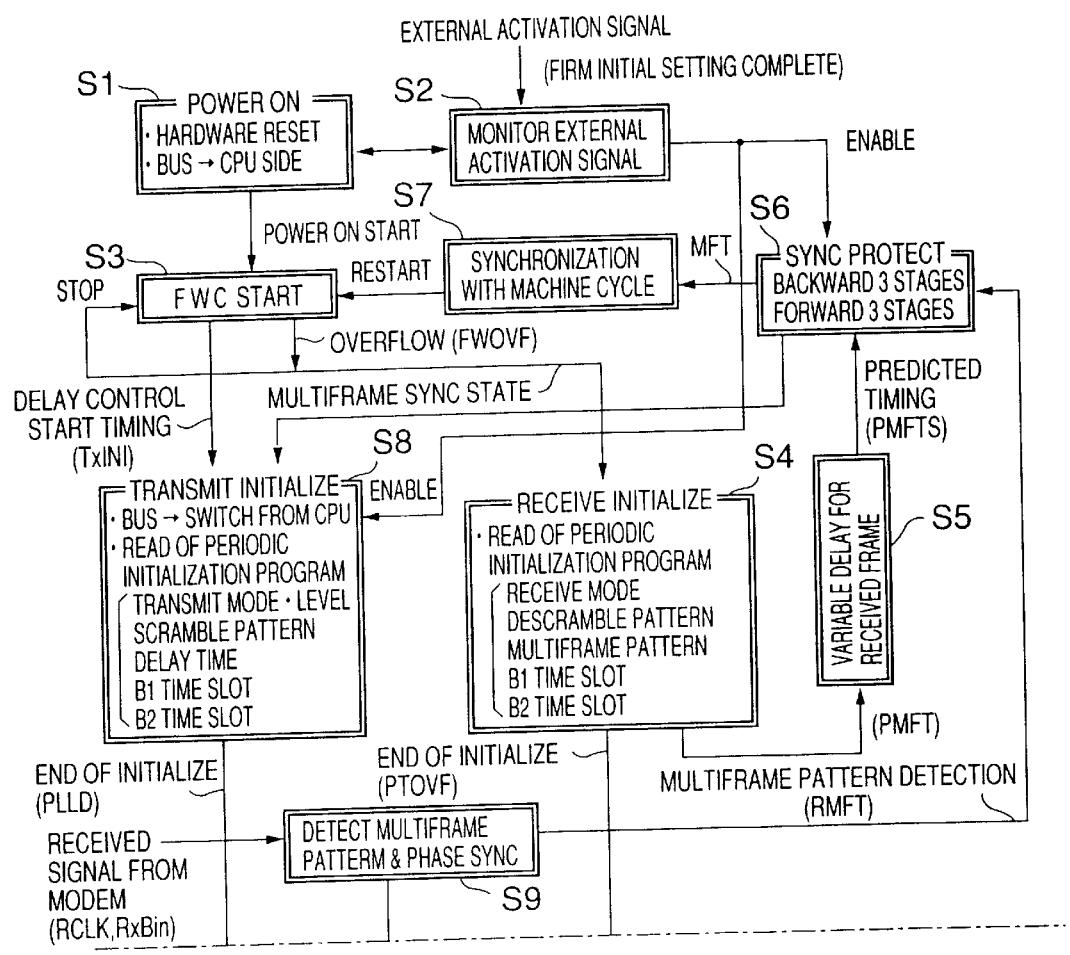

FIG.7

| | |
|---|---|
| RECEIVE PART | 000<br>PERIODIC INITIALIZATION PROGRAM INFORMATION AREA |
| | 008<br>m-BIT STREAM PROGRAM INFORMATION AREA |
| | 100<br>RECEIVE CONTROL CH DATA AREA |
| TRANSMIT PART | 200<br>PERIODIC INITIALIZATION PROGRAM INFORMATION AREA |
| | 208<br>m-BIT STREAM PROGRAM INFORMATION AREA |
| | 300<br>TRANSMIT CONTROL CH DATA AREA |

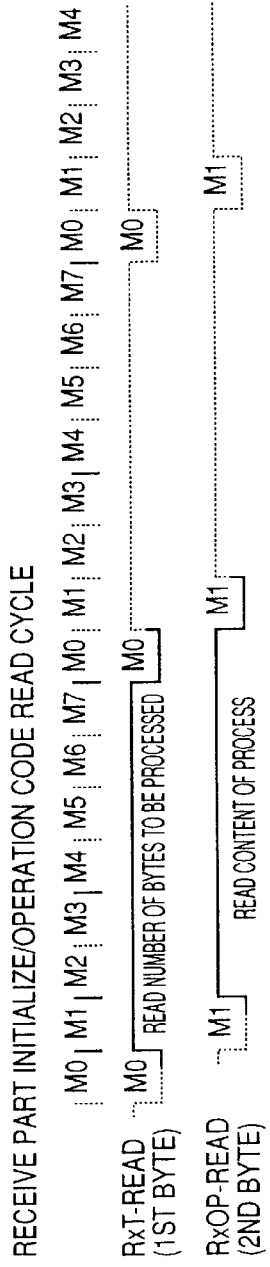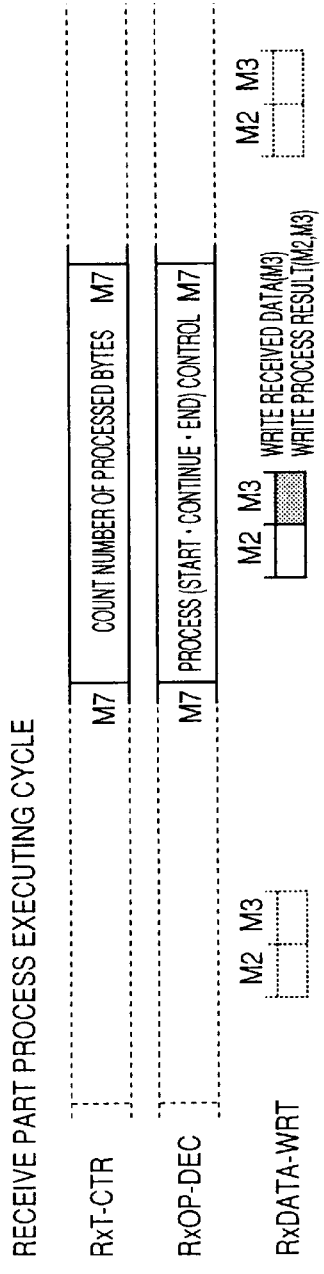

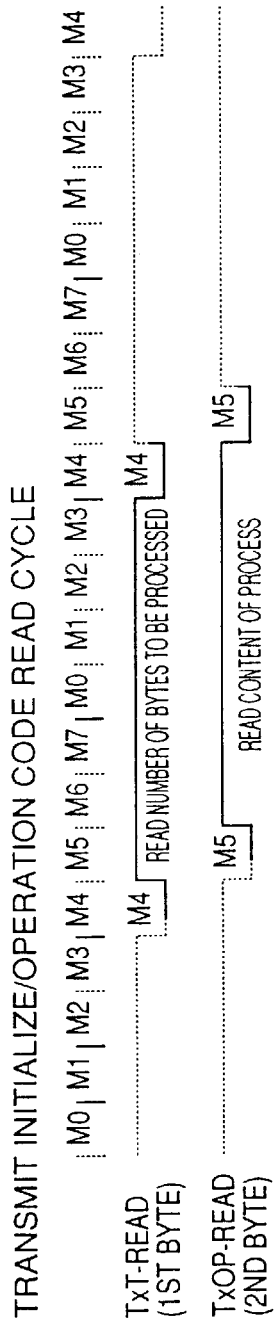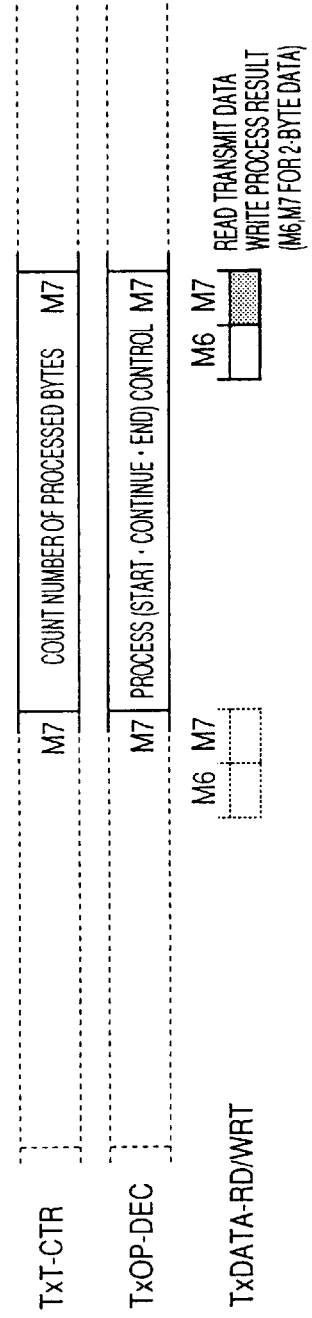

FIG.17

| FAS DETECTION TIMING FOR MACHINE CYCLE (MFT) | RECEIVED DATA DELAY (RxD) | nTH FRAME FAS DETECTION SIGNAL DELAY (MFTS) | (n+1)TH FRAME FAS DETECTION PREDICTED TIMING FAS HUNTING SIGNAL DELAY (PMFT) |
|---|---|---|---|
| M0 | 7 BITS | 7 BITS | 1 BIT |
| M1 | 6 BITS | 6 BITS | 2 BITS |
| M2 | 5 BITS | 5 BITS | 3 BITS |
| M3 | 4 BITS | 4 BITS | 4 BITS |
| M4 | 3 BITS | 3 BITS | 5 BITS |
| M5 | 2 BITS | 2 BITS | 6 BITS |
| M6 | 1 BIT | 1 BIT | 7 BITS |
| M7 | 8 BITS | 8 BITS | 0 BIT |

FIG.19

| DATA<br>D5 D4 D3 | TRANSMIT FRAME START<br>SIGNAL FOR MACHINE CYCLE | TRANSMIT DATA DELAY<br>(DELAY FROM SET OF BUFFER TO TRANSMIT) |
|---|---|---|
| 0 0 0 | PB0 | 8 BITS |
| 0 0 1 | PB1 | 7 BITS |
| 0 1 0 | PB2 | 6 BITS |
| 0 1 1 | PB3 | 5 BITS |
| 1 0 0 | PB4 | 4 BITS |
| 1 0 1 | PB5 | 3 BITS |
| 1 1 0 | PB6 | 2 BITS |
| 1 1 1 | PB7 | 1 BIT |

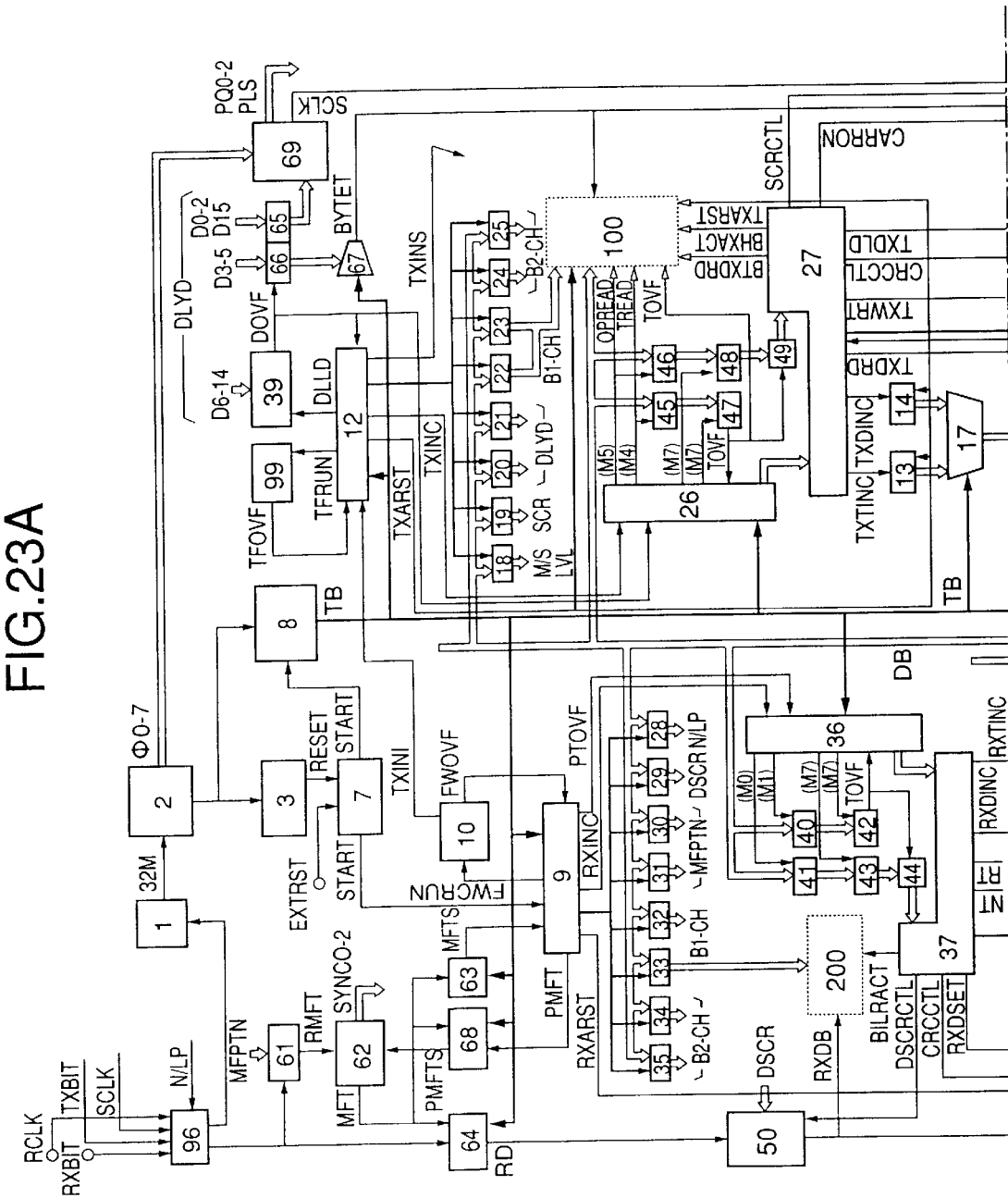

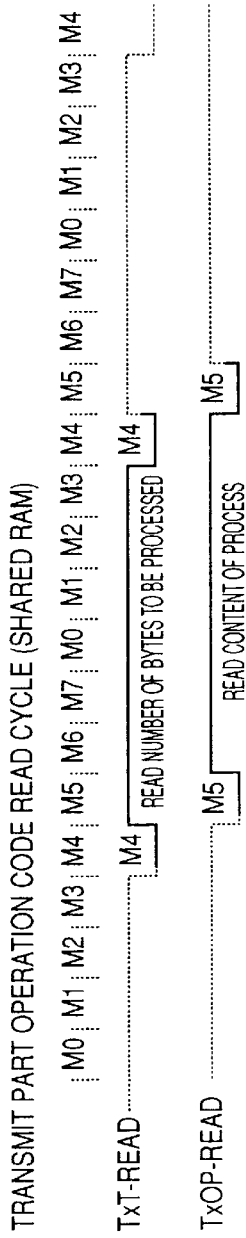
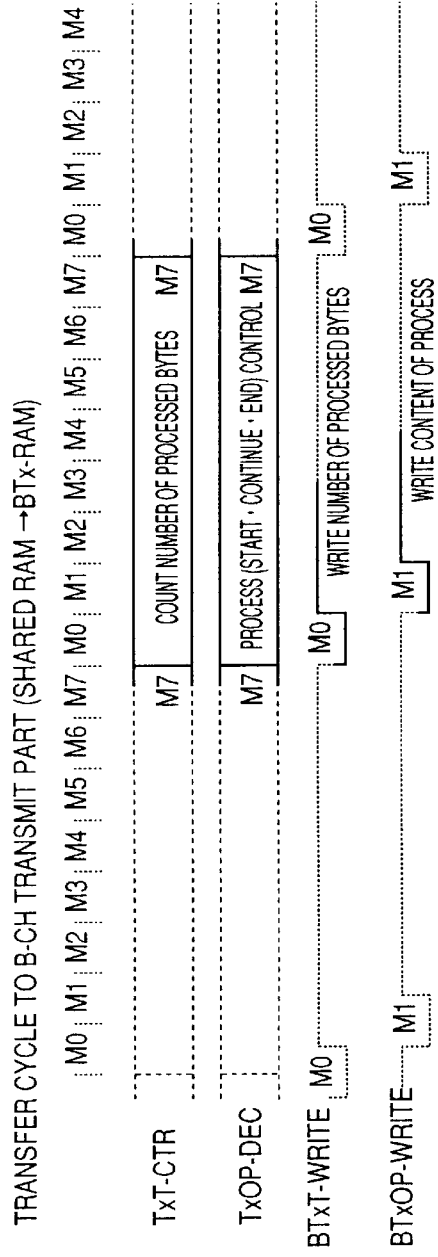

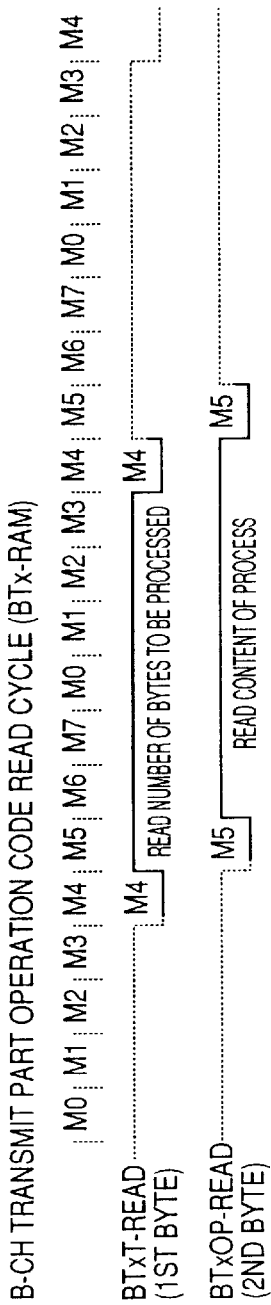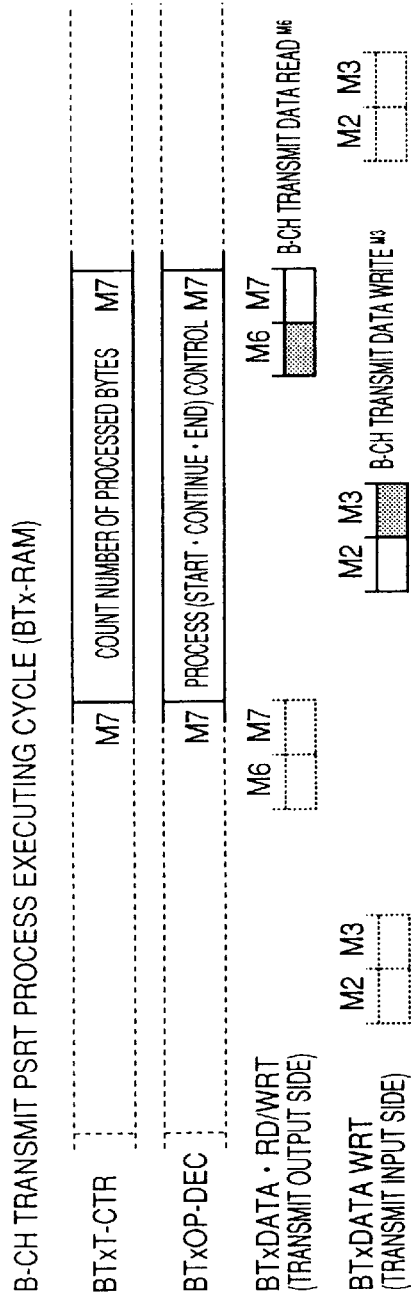

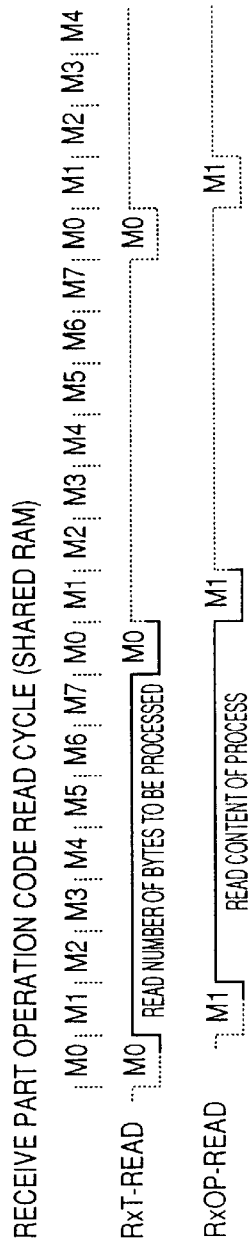
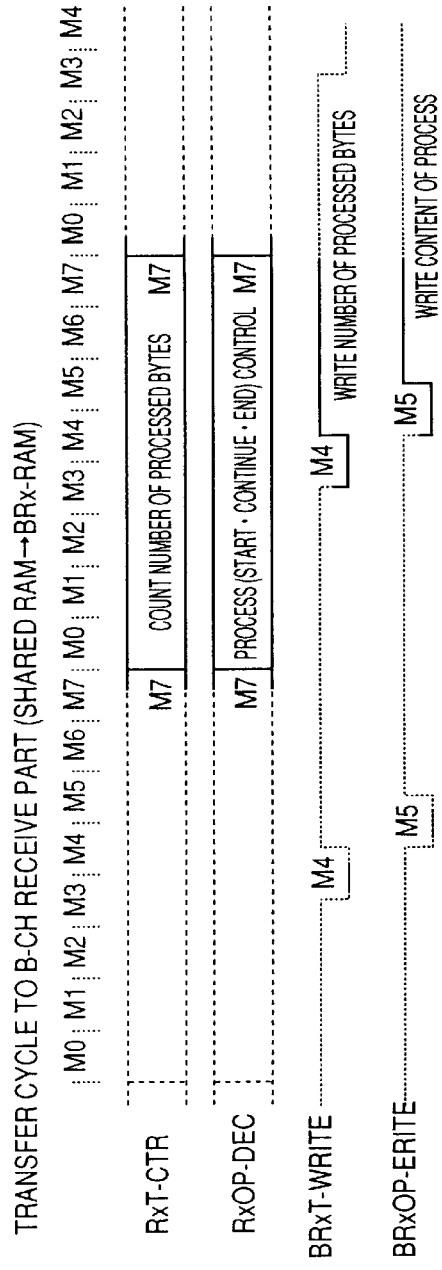

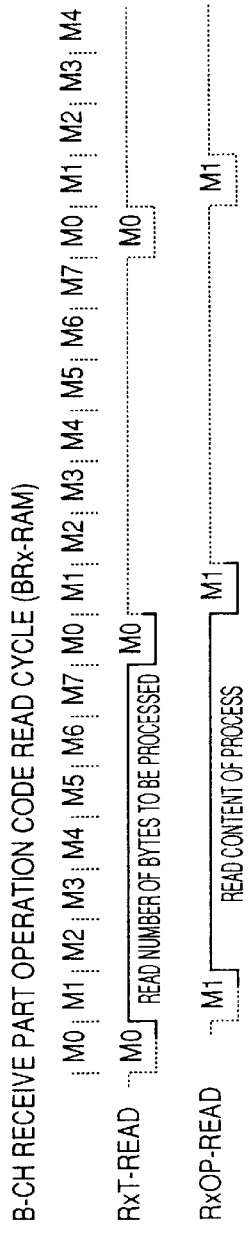
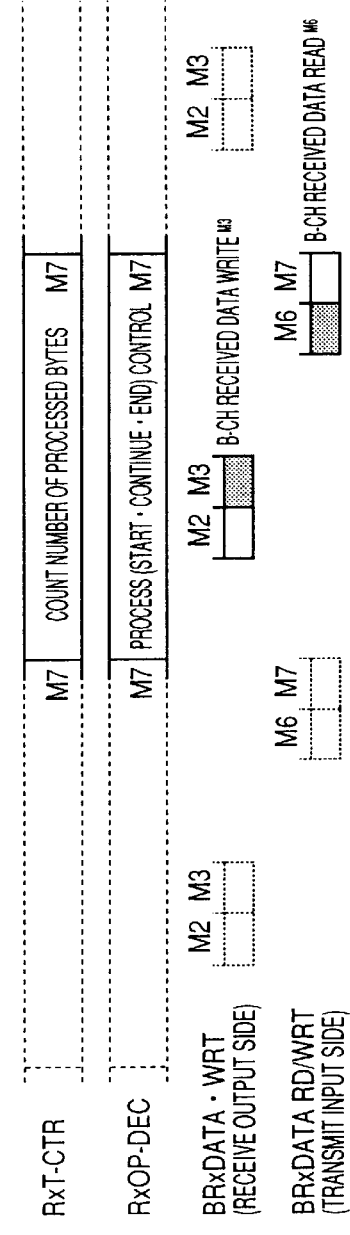
FIG.30A
FIG.30B

FIG.31

| | | B7 | TRANSMIT MODE | | | |
|---|---|---|---|---|---|---|
| ADDRESS 200h SETTING OF TRANSMIT PART / ADDRESS 000h SETTING OF RECEIVE PART | | | 0 : SLAVE | | 1 : MASTER | |
| | | B6 | TRANSMIT FRAME MODE | | | |
| | | | 0 : BURST  1 : SUCCESSIVE | | 0 : BURST  1 : SUCCESSIVE | |
| | | B5 | SCRAMBLER | | SCRAMBLER | |
| | | | 0:VALID  1:INVALID  0:VALID  1:INVALID | | 0:VALID  1:INVALID  0:VALID  1:INVALID | |
| B7 | B6 | B5 | | | | |
| RECEIVE MODE 0:NORMAL | MULTIFRAME PATTERN 0:NORMAL | DESCRAMBLER 0:VALID | SUBSCRIBER TERMINAL | | PSEUDO SWITCH STATION | |
| | | 1:INVALID | | | | |
| | 1:REVERSE | 0:VALID | | | | |
| | | 1:INVALID | | | | |
| 1:LOOP-BACK | MULTIFRAME PATTERN 0:NORMAL | DESCRAMBLER 0:VALID | COMBINATION NOT AVAILABLE | | IN LSI SELF-TEST | |
| | | 1:INVALID | | | | |
| | 1:REVERSE | 0:VALID | | | | |
| | | 1:INVALID | | | | |

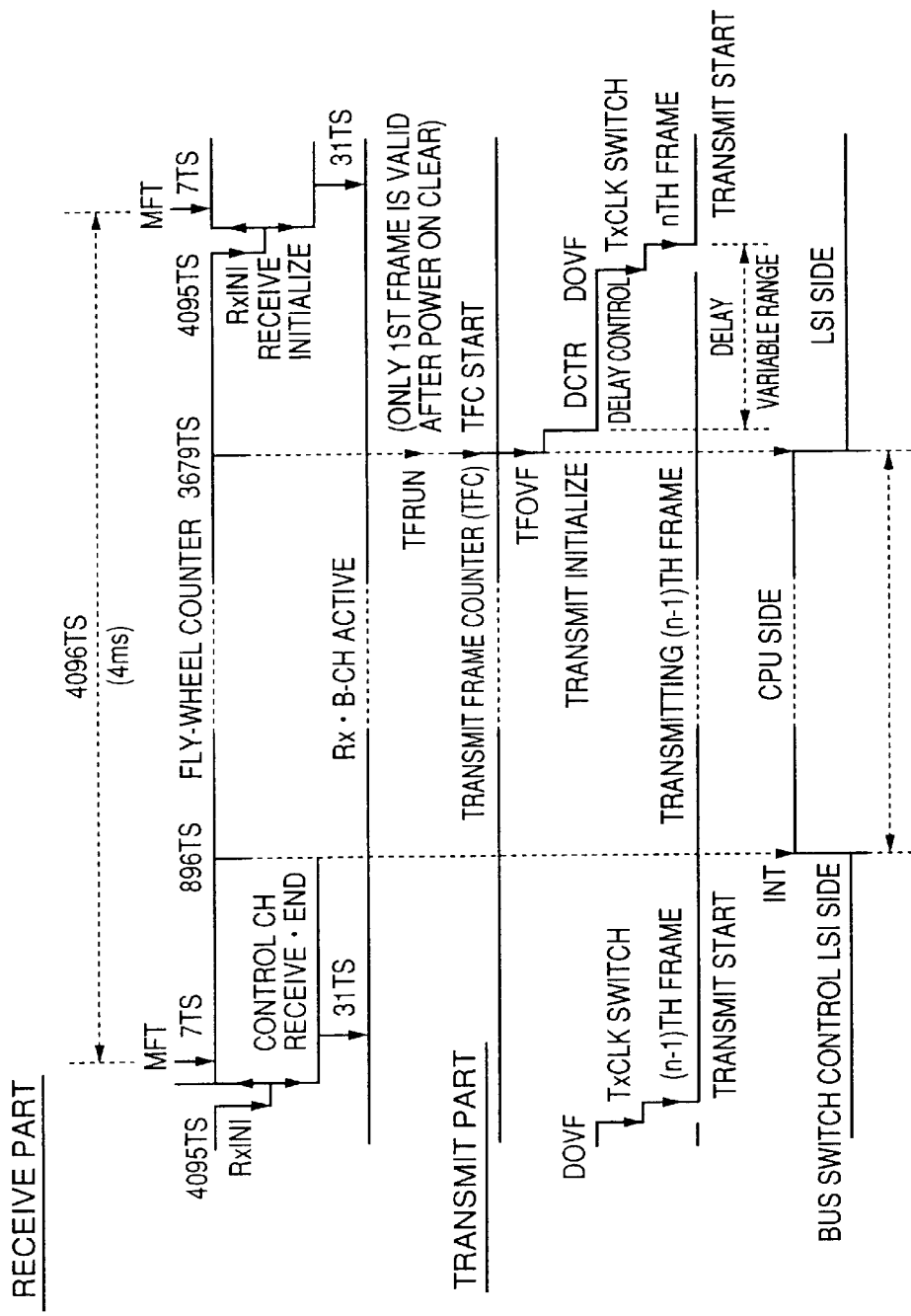

FRAME TRANSMITTING AND RECEIVING METHOD AND COMMUNICATION DEVICE USING SUCH A METHOD

BACKGROUND OF THE INVENTION

1. Field of the Invention

The present invention generally relates to a frame transmitting and receiving method and a communication device using the same. More particularly, the present invention is concerned with a frame transmitting and receiving method and a communication device using the same, such as a transceiver, in a digital multiplexed communication system.

Nowadays, a digital multiplexed communication system is applied to not only a network in which data is transferred at an extremely high speed, but also a relatively-low-speed communication with terminal equipment. A variety of digital multiplexed communication systems has been proposed and used in practice.

For example, a TDM/TDMA (Time Division Multiplexing/Time Division Multiple Access) communication system is known as a two-way communication system necessary to realize interactive services in a CATV (CAble TeleVision) network or the like. In practice, various frame formats have been proposed in such a two-way communication system. Hence, it is desired to provide a frame transmitting and receiving method and apparatus suitably provided in an LSI formation. It may be required that such a method and apparatus is flexible with various frame formats and enables reductions in terms of development, power consumption and cost as well as down-sizing.

2. Description of the Related Art

Generally, the digital multiplexed communication system has a concept of a "frame" which is a periodical repetition and "time slot" which is a time-based definition. Hence, the assembling and disassembling of frames is carried out.

FIG. 1 is a diagram of frame formats, and FIG. 2 is a diagram for explaining time slots. In these figures, a down frame is a frame to be sent from a switch office to a terminal, and an up frame is a frame to be sent from a terminal to a switch office. The down frames are consecutively sent with a period of 4 ms, while the up frames are burst signals so that a guard time GT is provided. In other words, the down frame is time division multiplexing (TDM), while the up frame is the time division multiple access (TDMA) in which the burst signal is sent in response to an instruction from the switch station (sent to via the down frame).

Each of the up and down frames has a speech-communication channel (hereinafter, simply referred to as B channel), and a control channel. The control channel includes a maintenance channel (hereinafter, simply referred to as M channel), and two call control channels (C, D). One of the two call control channels is a D channel for telephone services, and the other channel is a C channel for video-on-demand (VOD) services.

The up frame includes channels AD and AC used to return acknowledge signals to the down control channels D and C, respectively. The channels have respective formats as shown in FIG. 1.

The down and up frames are summarized as follows.

Down Frame
  frame directed to subscriber terminal to switch station
    F00–F31: single frame (125 μs), time slots TS000–TS127; multiframe pattern is transmitted at time slots TS000 and TS001 of F00
      M: maintenance channel (assigned time slots TS002–TS009)
      B: speech communication channel B00–B94 (for each single frame); assigned time slots TS032–TS126
      -: unused time slots (TS000–TS031 of F07–F31) (TS127 of F00–F31)
    C0–C3: C channels disassembled into single frames F01–F04 and sent; assigned time slots TS002–TS031
    D0, D1: D channels disassembled into single frames F05 and F06 and sent; assigned time slots TS002–TS031
Up frame
  frame directed to switch station from subscriber terminal
    M: maintenance channel (2GT+31PW+1UW+2TID+4DT+2BCC)=42 bytes
    C: C channel (2GT+15PW+1UW+2TID+60DT+2BCC)=82 bytes
    D: D channel (2GT+15PW+1UW+2TID+28DT+2BCC)=50 bytes
    AC: acknowledge (ACK) channel for C channel (2GT+3PW+1UW+2TID+1DT+2BCC)=11 bytes
    AD: ACK channel for D channel (2GT+3PW+1UW+2TID+1DT+2BCC)=11 bytes
  B00–B94: speech communication channel (2GT+3PW+1UW+32PCM)=38 bytes
  2GT+3PW+1UW: header FIG. 3 is a block diagram of related art which performs transmission and reception processes while disassembling and assembling the above-mentioned frames. The structure shown in FIG. 3 is applied to a subscriber in-house device (which is also referred to as subscriber terminal) in a digital multiplexed communication having a CATV station in a CATV system.

A bit stream of a received frame from a decoder part of a modem (not shown) is applied to a receive process unit 101, which makes the received bit stream synchronized with a secondary clock signal different from a (primary) received clock signal with which the bit stream is synchronized. Hence, a jitter can be eliminated from the bit stream. The secondary clock signal is generated by a secondary clock generating unit 102, which includes a PLL (Phase-Locked Loop) circuit.

The receive process unit 101 detects a multiframing pattern from the bit stream synchronized with the secondary clock signal, and outputs it to a receive control unit 103. The unit 103 performs a known synchronization protection. When the synchronization is established, the receive control unit 103 notifies an external control CPU that the synchronization has been established.

When the receive control unit 103 receives a request for receiving data after the synchronization is established, the receive control unit 103 outputs start/stop timing signals to the receive process unit 101 and a B-channel receive process unit 104 in order to perform necessary processes for the control channels in conformity with the down frame format shown in FIG. 1. For example, a descrambling process and a CRC check process are carried out. The above timing signals can be generated by counting bits after the timing at which the multiframing pattern for synchronization is detected. When a given bit position is indicated by the count value, a corresponding necessary process is carried out. The receive process unit 101 inputs data while performing the necessary processes for the respective control channels, and writes the input data into a receive data buffer (not shown).

The B-channel receive process unit 104 receives PCM data positioned in a time slot specified by the timing signal from the receive control unit 103, and converts the PCM data into data which conforms with a PCM.CODEC interface.

A transmit control unit 105 is notified by the receive control unit 103 that the multiframing pattern is detected.

When a request for transmitting data is received from the CPU, the transmit control unit 105 performs a transmit delay control so that a frame to be transmitted is started with a given phase difference with respect to the received frame, Further, the transmit control unit 105 performs a process base on the format of each of the burst signals.

The transmit control of the transmit control unit 105 is carried out by outputting start/stop signals to a transmit process unit 106 and a B-channel transmit process unit 107 in order to perform necessary processes for the control channels in conformity with the up frame format. For example, a scramble process and an addition of a block check character (BCC) are carried out. The above timing signals can be generated by counting bits based on the transmit frame starting timing. When a given bit position is indicated by the count value, a corresponding necessary process is carried out.

It should be noted that, in such a digital multiplexed communication like the CATV system there is a certain distance between the switch station and the subscriber terminal and there is a need to improve the transmission efficiency, the transmit delay control should be carried out at a precision equal to 1/n (n is less than 10) of the clock cycle. In such a case, the clock-based timing control is carried out.

Upon receipt of the transmit control signal, the transmit process unit 106 serially reads transmit data from a transmit data buffer (not shown), and assembles the transmit data into a burst. The burst signal thus formed is sent from the transmit process unit 106.

The B-channel transmit process unit 107 assembles PCM data received via the PCM.CODEC interface into the B-channel format. The assembled PCM data is output to the time slot specified by the timing signal from the transmit control unit 105.

A data transfer with the CPU is carried out so that data of the receive control channels is transferred via a receive bus line, and data of the transmit control channels is transferred via a transmit bus line. The access control of the transmit and receive buffers is carried out while the CPU refers to indications of the transmit and receive states.

The above-mentioned prior art has the following disadvantages. The various timing signals of the bit level or the clock level are generated based on the frame structure and are distributed to the bit processing function parts. Hence, the prior art does not flexibly correspond to a modification of the frame structure. Thus, it is very difficult to proceed with a detailed design of the transmit and receive devices or transceiver until the specification of the frame structure is defined in detail. As a result, it is impossible to efficiently develop the transmit and receive devices or transceiver.

In the case where the transmit frame is different from the receive frame, it is required to prepare a pseudo remote device in order to perform the transmission or the reception. This is troublesome.

SUMMARY OF THE INVENTION

It is a general object of the present invention to provide a frame transmitting and receiving method and device in which the above disadvantages are eliminated.

A more specific object of the present invention is to provide a method and device of transmitting and receiving a frame including unique pattern information indicative of the starting point of digital information, in which the method and device can flexibly correspond to various frame structures.

Another object of the present invention is to provide a programmable frame transmitting and receiving method and device equipped with a self-test function.

The above objects of the present invention are achieved by a method of transmitting and receiving a frame including unique pattern information indicative of a starting point of digital information, the method comprising the steps of:

(a) performing a receive synchronizing process in which the frame is pulled in a given phase of a machine cycle equal to m which is equal to $(1/N) \times L$ where L denotes the number of bits forming the frame, N is a positive integer and m is a positive integer larger than 2;

(b) performing, in a receive process executing phase forming part of the same machine cycle as that of the step (a), a receive process in which receive control channel data contained in a received frame is written into a shared memory in accordance with first m-bit stream program information which defines the receive process and is stored in the shared memory; and (c) performing, in a transmit process executing phase forming another part of the same machine cycle, a transmit process in accordance with second m-bit stream program information which defines a transmit procedure and is stored in the shared memory while reading transmit control channel data stored in the shared memory, whereby the transmit control channel data is transmitted in a phase of a bit level or a clock level.

In other words, the m-bit stream equal to 1/N times the number of bits forming the frame is the transmit/receive process unit. The machine cycle has a period equal to the above transmit/receive process unit. The phase of the real received frame is pulled in the machine cycle. The receive process is carried out while the first m-bit stream program information is read from the shared memory (RAM), the first m-bit stream program defining the receive process procedure for each m-bit stream. The transmit process is carried out while reading second m-bit stream program is read from the shared memory, and the phase of the transmit frame processed in the same machine cycle as described above is changed to the phase of the real transmit frame.

Irrespective of the transmit/receive processes are carried out for every m-bit stream, the real transmit/receive frames can follow a change of the phase of the bit level. Hence, it is possible to easily modify the transmit and receive processes so that the processes conform with a change of the frame structure by modifying the first and second m-bit stream program information. Examples of the modifications of the frame structures are the transmit/receive time slots, data length, transmit FAS pattern and the length thereof, the presence/non-presence of scramble and descramble, presence/non-presence of CRC check, and guard time length.

It is also possible to perform the processes for every m-bit in the mutually independent receive and transmit process executing phases, so that the memory can be shared by the transmit and receive processes.

The method may further comprise:

(d) correcting a delay time of control channel data received under a situation in which there is a time difference between a detection of the pattern information carried out in the receive synchronizing process and a write timing of the shared memory; and (e) correcting a delay time of data to be transmitted under a situation in which there is a time difference between a read timing of the shared memory and a given transmit frame starting timing externally supplied.

The method may further comprise:

(d) generating a hunting timing of detecting a machine cycle level of a next frame by using the pattern information of the machine cycle level in the receive synchronizing process; and (e) converting the hunting timing of the next frame generated at the step (d) into timing information of the bit level for detecting pattern information contained in the next frame.

The method may further comprise the step of controlling a phase of a transmitted frame with respect to a phase of a received frame so that the phase of the transmitted frame is controlled at a machine cycle level in advance of the phase of the received frame by a maximum delay control time and is then controlled at the bit level or the clock level after the control of the phase of the transmitted frame is completed at the machine cycle level.

The method may further comprise the step of transmitting, when a specific bit corresponding to a guard time is read, as a transmit request, from a transmit data area of the shared memory, transmitting data after the guard time and logically changing the specific bit to an original value in order to release the transmit request.

The method may further comprise the step of switching, when the receive process is completed according to the first m-bit stream program information, a common bus, through which the receive synchronizing process, the transmit process and the receive process communicate with each other, to a CPU so that the CPU can use the common bus and switching back to an original state immediately before the transmit delay control for each frame is carried out.

The method may further comprise the steps of:

(d) writing, when the second m-bit stream program information (operation code) relates to a speech-communication channel, the second m-bit stream program information and a header of the received frame stored in the shared memory into a speech-communication channel transmit memory (BTx-RAM 110) in the receive process executing phase and writing transmit speech-communication channel data externally supplied into the speech-communication channel transmit memory (from PCM codec 300, for example); and (e) reading, in the transmit process executing phase, the header and the transmit speech-communication channel data from the speech-communication channel transmit memory and transmitting the header and the transmit speech-communication channel data.

The method may further comprise the steps of:

(d) writing in the transmit process executing phase, when the first m-bit stream program information relates to a speech-communication channel, the first m-bit stream program information stored in the shared memory into a speech-communication channel receive memory (BRx-RAM 210), reading receive speech-communication channel data from the speech-communication channel receive memory in the transmit process executing phase, and externally outputting the receive speech-communication channel data; and (e) writing, in the receive process executing phase, the receive speech-communication channel data into the speech-communication channel receive memory according to the first m-bit stream program information.

The above objects of the present invention are also achieved by a device of transmitting and receiving a frame including unique pattern information indicative of a starting point of digital information, the device comprising:

a machine clock generating circuit generating a machine clock having a machine cycle equal to a length of m bits where m is larger than 2 and equal to $(1/N) \times L$ where L denotes the number of bits forming the frame and N is a positive integer;

a receive synchronizing circuit which pulls the frame in a given phase of the machine cycle;

a shared memory in which first and second m-bit stream program information respectively define a receive procedure and a transmit procedure, and transmit control channel data are stored beforehand;

a transmit/receive process part which performs, in a receive process executing phase forming part of a same machine cycle as that processed by the receive synchronizing circuit, a receive process in which receive control channel data contained in a received frame into the shared memory in accordance with the first m-bit stream program information, and which performs, in a transmit process executing phase forming another part of the same machine cycle, a transmit process in accordance with the second m-bit stream program information while reading the transmit control channel data stored in the shared memory; and a transmit phase control circuit which transmits the transmit control channel data in a phase of a bit level or a clock level.

The device may further comprise a common bus switching circuit which allows an external CPU to access the shared memory via a common bus.

The device may be configured so that the receive synchronizing circuit comprises:

a pattern information detecting circuit which detects the pattern information in the phase of the bit level;

a receive frame synchronization protecting circuit which stabilizes a pattern information detecting operation of the pattern information detecting circuit;

a received frame length counter which performs a count operation in the phase of the machine cycle;

a pattern information synchronizing circuit which synchronizes a pattern information detecting signal output by the pattern information detecting circuit with the phase of the machine cycle level whereby another pattern information detecting signal synchronized with the machine cycle; and a phase level converting circuit which converts a pattern information hunting signal having the phase of the machine cycle level into another pattern information hunting signal having the phase of the bit level, and wherein:

the received frame length counter starts the count operation in response to the pattern information detection signal having the phase of the machine cycle level, and generates the pattern information hunting signal having the phase of the machine cycle level immediately before one frame is counted by the received frame length counter; and the received frame synchronization protecting circuit protects the received frame synchronization by the another pattern information detection signal having the phase of the bit level from the pattern information detecting circuit and the pattern information hunting signal having the phase of the bit level.

With the above structure, it is possible to protect the receive frame synchronization in which the phase of the real receive frame can be followed.

The device may be configured so that:

the transmit phase control circuit includes a transmit delay control circuit which controls a phase of a transmitted frame with respect to the phase of the received frame; and the received frame length counter activates the transmit delay control circuit by the received frame length counter so that the transmit delay control circuit is activated in advance of the phase of the received frame by a maximum delay control time. Hence, data can be transmitted at a desired transmit phase.

The device may be configured so that:

the transmit delay control circuit comprises a delay counter having the phase of the machine cycle level, a first selector having the phase of the bit level and a second selector having the phase of the clock level; and bit-level and clock-level delay controls are sequentially carried out after a machine-cycle-level delay control is completed, so that the transmit/receive process part starts to access the shared memory. Hence, the transmit process part can operate at the machine cycle level, and the transmitted frame can be subjected to a very fine transmit delay control of the clock level.

The device may be configured so that:

the transmit/receive process part includes a transmit result writing circuit which performs a write operation on a transmit data area of the shared memory;

a specific bit of transmitted data corresponding to a guard time is made to relate to a transmit request flag; and when transmitted data read from the shared memory is the transmit request flag, the transmitted data is transmitted after the guard time and logically changing the specific bit to an original value in order to release the transmit request flag. Hence, the CPU can be notified of the completion of the transmit process by reading the state of the transmit request flag.

The device may be configured so that the common bus switching circuit switches, when the receive process is completed according to the first m-bit stream program information, the common bus to the CPU and switches back to an original state immediately before the transmit process for each frame is started, the common bus connecting the pattern information detecting circuit, the receive frame synchronization protecting circuit, the received frame length counter, the pattern information synchronizing circuit, and the phase level converting circuit together. Hence, the CPU can definitely carry out the control for each frame.

The device may be configured so that, in the shared memory, there is stored beforehand periodic initialization program information which defines frame-based operation modes and process conditions, and the transmit/receive process part executes the transmit and receive processes in accordance with the periodic initialization program information.

The device may be configured so that the receive synchronizing circuit comprises:

a pattern information detecting circuit which detects the pattern information in the phase of the bit level;

a receive frame synchronization protecting circuit which stabilizes a pattern information detecting operation of the pattern information detecting circuit;

a received frame length counter which performs a count operation in the phase of the machine cycle;

a pattern information synchronizing circuit which synchronizes a pattern information detecting signal output by the pattern information detecting circuit with a phase of the count operation of the received frame length counter;

a receive-part periodic initialization executing circuit which initializes a receive part of the transmit/receive process part in accordance with the periodic initialization program information; and a phase-level converting circuit which converts a pattern information hunting signal of the phase of the machine cycle level generated at an end of the periodic initialization for the receive part into another pattern information hunting signal having a phase of the bit level, and wherein:

the received frame length counter starts the initial setting and count operation in response to the pattern information detection signal having the phase of the machine cycle level;

when the received frame length counter overflows, the received frame length counter activates the receive-part periodic initialization executing circuit, which generates the pattern information hunting signal of the phase of the machine cycle level after completion of the initialization at a given counter value X and activates the received frame length counter again; and the received frame synchronization protection circuit protects the received frame synchronization by the pattern information detection signal having the phase of the bit level from the pattern information detecting circuit and the pattern information hunting signal having the phase of the bit level from the phase level converting circuit.

With the above structure, it is possible to protect the receive frame synchronization so that the phase of the real receive frame can be followed and to periodically set the operation mode.

The device may be configured so that the transmit phase control circuit comprises:

a transmit-part periodic initialization executing circuit which initializes a transmit part of the transmit/receive process part in accordance with periodic initialization program information; and a transmit delay control circuit which controls a transmit phase of a frame corresponding to the phase of the received frame, and wherein:

the received frame length counter activates the transmit-part periodic initialization executing circuit in advance of the phase of the received frame by a timing Y equal to the sum of a maximum control time of the transmit delay control circuit and a time Z necessary to execute the transmit-part periodic initialization; and the transmit-part periodic initialization executing circuit activates the transmit delay control circuit when the time Z elapses after completion of the transmit-part periodic initialization.

Hence, it is possible to transmit data in a given phase and perform the transmit delay control for each frame.

The device may be configured so that:

the transmit delay control circuit includes a delay counter of the machine cycle level, a first selector having the phase of the bit level, and a second selector having the phase of the clock level;

the delay counter of the machine cycle level performs a delay control of the machine cycle level after activated;

the first and second selectors sequentially perform delay controls of the bit level and clock level, and then a transmit process part of the transmit/receive process part starts the transmission process.

The device may be configured so that:

the transmit/receive process part includes a transmit result writing circuit which performs a write operation on a transmit data area of the shared memory;

a specific bit of transmitted data corresponding to a guard time is made to relate to a transmit request flag; and when transmitted data read from the shared memory is the transmit request flag, the transmitted data is transmitted after the guard time and logically changing the specific bit to an original value in order to release the transmit request flag.

The device may be configured so that:

the CPU includes a common bus switching circuit for accessing the shared memory via the common bus; and the common bus switching circuit switches, when the receive process is completed according to the first m-bit stream program information, the common bus to the CPU and switches back to an original state immediately before the transmit process for each frame is started.

Hence, the phase of the transmit frame can be controlled by the periodic initialization sequence. It is also possible to verify the functions of the receive part for each frame.

The device may be configured so that:

the periodic initialization program information includes program information concerning an initialization of the transmit part and an initialization of the receive part;

the initialization of the transmit part includes at least data indicative of an amount of delay in the transmit delay control; and the initialization of the receive part includes at least the pattern information.

The device may further comprise a speech-communication channel transmit memory, wherein:

when the second m-bit stream program information relates to a speech-communication channel, the second m-bit stream program information and a header of the received frame stored in the shared memory (RAM) are written into a speech-communication channel transmit memory (BTx-RAM) in the receive process executing phase, and transmit speech-communication channel data externally supplied is written into the speech-communication channel transmit memory; and the header and the transmit speech-communication channel data are read, in the transmit process executing phase, from the speech-communication channel transmit memory and the header and the transmit speech-communication channel data are transmitted.

The device may further comprise a speech-communication channel receive memory, wherein:

when the first m-bit stream program information relates to a speech-communication channel, the first m-bit stream program information stored in the shared memory (RAM) is written, in the transmit process executing phase, into a speech-communication channel receive memory (BRx-RAM), and receive speech-communication channel data is read from the speech-communication channel receive memory in the transmit process executing phase, and is externally output; and the receive speech-communication channel data is written, in the receive process executing phase, into the speech-communication channel receive memory according to the first m-bit stream program information.

Referring to FIG. 23, the program information is transferred to the BTx-RAM 110 and BRx-RAM 210 from the shared RAM 6. The CPU 5 can modify the m-bit stream program information (operation code) concerning the speech-communication channel via the shared RAM 6.

The machine cycle is divided into the speech-communication channel transmit process executing phase and the bit-stream program information transmit phase. Hence, the speech-communication channel transmit/receive processes for every m-bit stream can be independently carried out. Further, the speech-communication channel transmit memory can be formed of a single RAM chip, and the speech-communication channel transmit process can be realized by using a gate array function irrespective of it is comprised of a built-in RAM or is equipped with an externally connected RAM. Similarly, the speech-communication channel receive memory can be realized by a single RAM chip, and the speech-communication channel receive process can be realized by using a gate array function irrespective of it is comprised of a built-in RAM or is equipped with an externally connected RAM.

Furthermore, the time-based positions of the m-bit-stream program information transmit phase and the transmit PCM data write phase in the speech-communication channel transmit part correspond to the receive process executing phase of the shared RAM. The phase of the m-bit-stream program information transmit phase and the received PCM data read phase in the speech-communication channel receive part correspond the transmit process executing phase of the shared RAM. The speech-communication channel transmit process executing phase in the speech-communication channel transmit part corresponds to the transmit process executing phase of the shared RAM. The phase of the speech-communication channel receive process executing phase in the speech-communication channel receive part corresponds to the receive process executing phase of the shared RAM. Hence, the phase control of the real transmit/receive frames in the speech-communication channels can be assigned to the above receive synchronizing circuit and the transmit phase control circuit.

The device may be configured so that:

the transmit phase control circuit includes a transmit frame length counter which performs a count operation in the phase of the machine cycle level, and a transmit mode setting circuit;

the transmit mode setting circuit sets a slave mode at a given timing after a synchronization of the received frame is established, and a master mode in which a frame can be transmitted irrespective of presence/non-presence of the received frame;

the received frame length counter activates the transmit delay control circuit in the slave mode; and the transmit frame length counter activates the transmit delay control circuit in the master mode.

The device may be configured so that:

the receive synchronizing circuit includes a received input signal switching circuit and a receive mode setting circuit which can set a normal mode or a loop-back mode; and the received input switching circuit receives the transmitted frame when the receive mode setting circuit sets the loop-back mode.

The device may further comprise a speech-communication channel data loop-back circuit which transfers data received via a speech channel to speech-channel transmit data, and speech-channel mode setting circuit which sets a speech-communication channel normal mode and a speech-communication channel loop-back mode.

BRIEF DESCRIPTION OF THE DRAWINGS

Other objects, features and advantages of the present invention will become more apparent from the following detailed description when read in conjunction with the accompanying drawings, in which:

FIG. 2 shows a down frame format used in the prior art and the present invention in which frame formats as shown in FIG. 1 are multiplied;

FIG. 4A is a block diagram of a part of a frame transmit/receive device according to an embodiment of the present invention;

FIG. 4B is a block diagram of another part of the frame transmit/receive device;

FIG. 5 is a block diagram showing how FIGS. 5A and 5B are combined together;

FIG. 5A is a sequence diagram of a part of the principle of the frame transmit/receive method and device of the present invention;

FIG. 5B is a sequence diagram of another part of the principle of the frame transmit/receive method and device of the present invention;

FIG. 7 is a diagram of an outline of a memory map of a shared RAM used in the present invention;

FIGS. 13A and 13B are time charts of process cycles in a receive part;

FIGS. 14A and 14B are time charts of process cycles in a transmit part;

FIG. 17 shows a receive delay control;

FIG. 19 shows a transmit delay control;

FIG. 23 is a block diagram showing how FIGS. 23A and 23B are combined together;

FIG. 23A is a block diagram of a part of a frame transmit/receive device equipped with control channel transmit and receive parts;

FIG. 23B is a block diagram of another part of the frame transmit/receive device;

FIGS. 27A and 27B are time charts of a receive process executing phase (background process) for the speech-communication channel transmit RAM (BTx-RAM);

FIGS. 28A and 28B are time charts of a transmit process executing phase (foreground process) for the speech-communication channel transmit RAM (BTx-RAM);

FIGS. 29A and 29B are time charts of a receive process executing phase (background process) for the speech-communication channel receive RAM (BRx-RAM);

FIGS. 30A and 30B are time charts of a transmit process executing phase (foreground process) for the speech-communication channel receive RAM;

FIG. 31 shows a matrix of mater and slave operation modes of the frame transmit/receive method and device of the present invention;

FIG. 32 is a time chart of transmit and receive processes in the master mode;

DETAILED DESCRIPTION OF THE PREFERRED EMBODIMENTS

Figures 4, 4A:
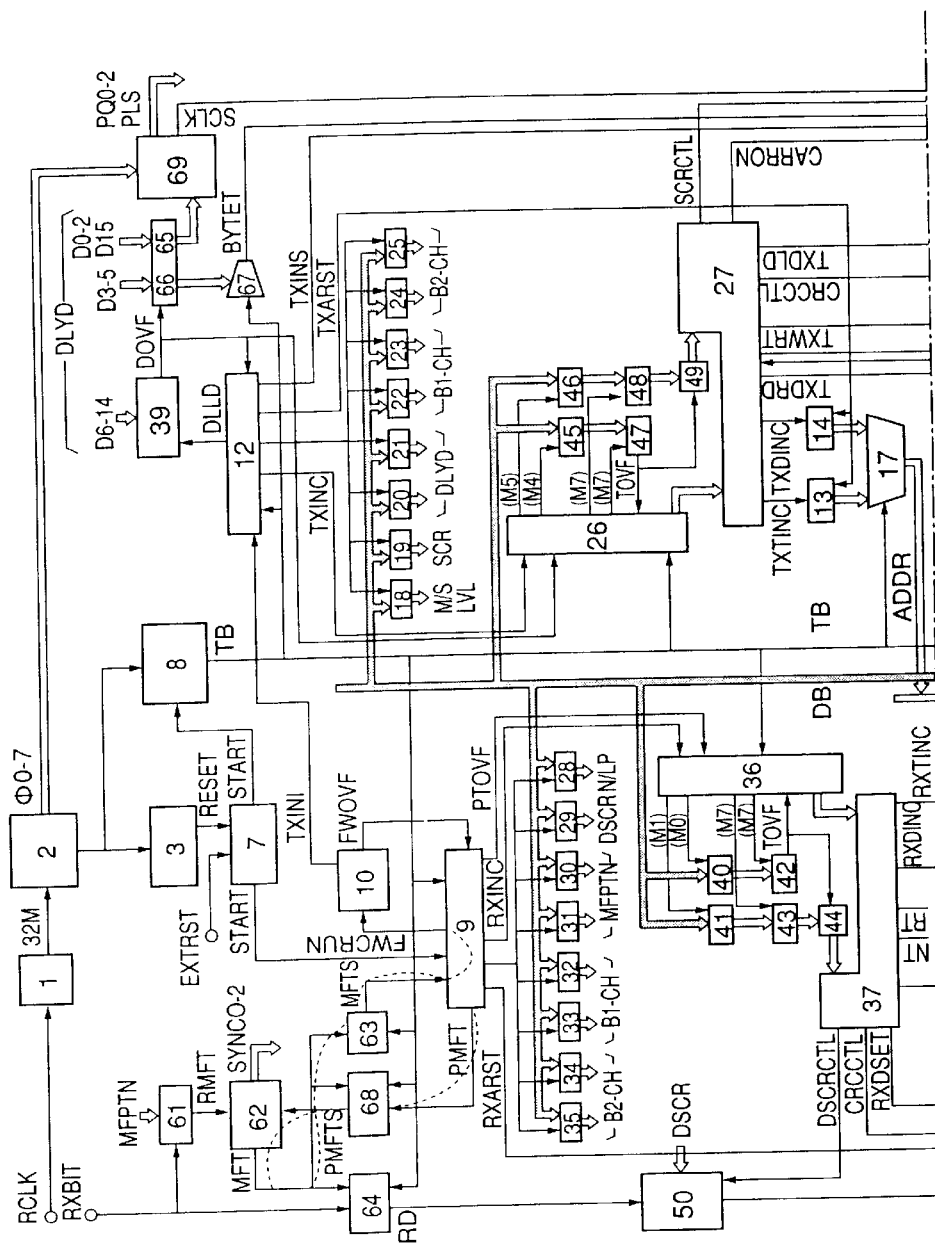
FIG. 4 is a block diagram showing how
FIGS. 4A and 4B are combined together.
Figure 4B:
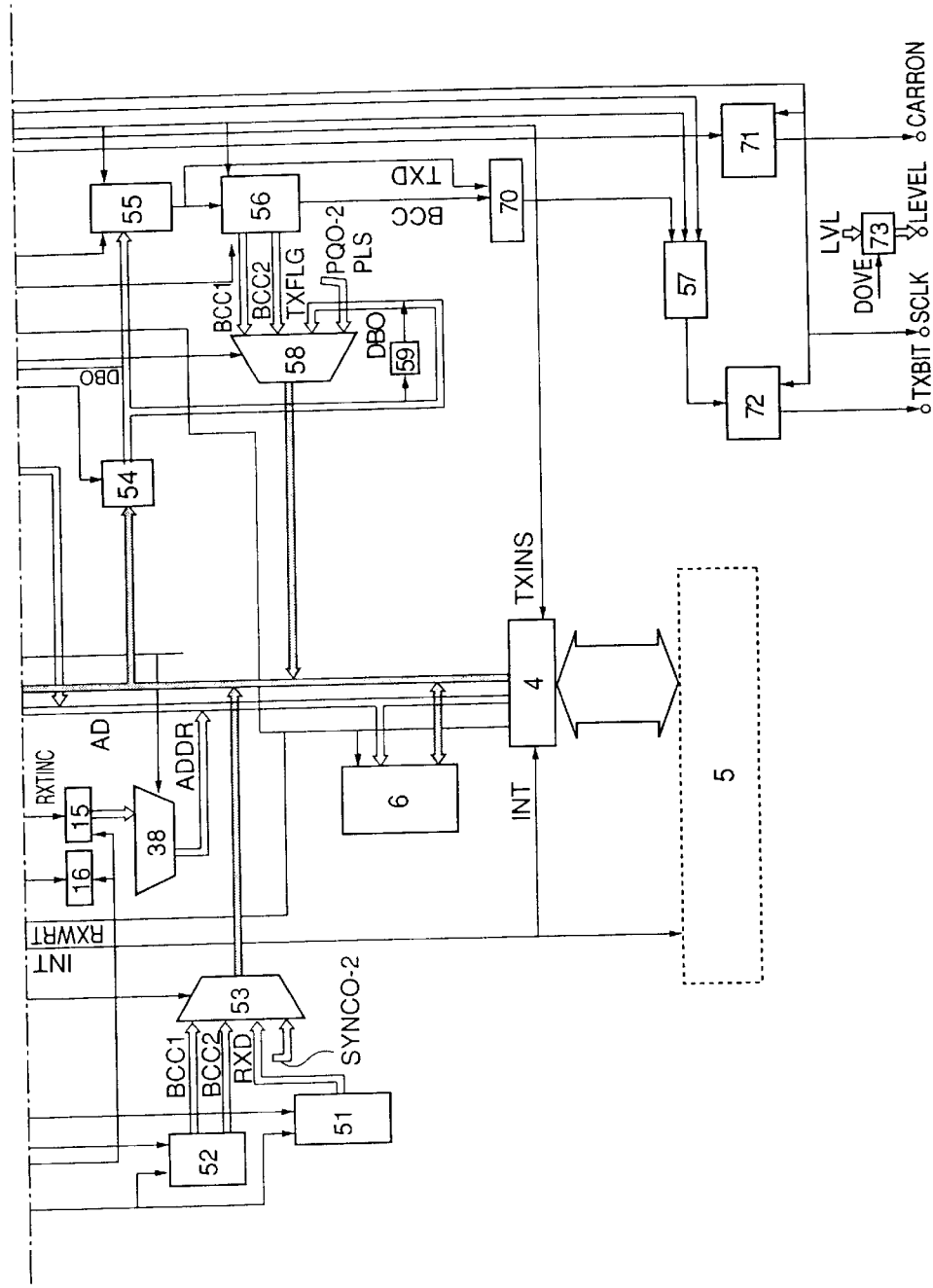

FIGS. 4A and 4B are block diagrams of a frame transmitting and receiving device according to an embodiment of the present invention. More particularly, the structure of FIGS. 4A and 4B corresponds to a control channel transmitting and receiving part CSR of a terminal such as a subscriber terminal provided in a CATV system, which is described in U.S. patent application Ser. No. 683,361, the disclosure of which is hereby incorporated by reference. More specifically, the structure shown FIGS. 4A and 4B corresponds to a frame termination part of a communication terminal device disclosed in the above U.S. application.

A receive clock signal RCLK is applied to a phase locked loop (PLL) circuit 1, which is connected to an eight-phase clock generating circuit 2. The circuit 2 is connected to a power-on detection circuit 3, a machine clock generating circuit 8 and a clock phase selecting circuit 69.

The power-on detection circuit 3 is connected to a power-on initializing circuit 7, which is connected to a machine clock generating circuit 8 and a periodically initializing circuit (receive part) 9 and is supplied with an external reset signal ExTRST. The periodically initializing circuit 9 sends a fly-wheel counter 10 a control signal FWCRUN, and receives a fed-back overflow signal FWOVF therefrom. The periodically initializing circuit 9 supplies a received frame variable delay circuit 68 with a control signal PMFT. The circuit 68 supplies an output signal PMFTS to a framing protection circuit 62.

The framing protection circuit 62 is supplied with an output signal RMFT of a multiframe pattern detection circuit 61, and sends an output signal MFT to a received data phase synchronizing circuit 64, the received frame variable delay circuit 68, and a received frame synchronizing circuit 63. An output signal MFTS of the received frame synchronizing circuit 63 is fed back to the periodically initializing circuit 9. The multiframe pattern detection circuit 61 and the received data phase synchronizing circuit 64 are supplied with received data RxBIT.

The periodically initializing circuit 9 is connected so that registers 28–35 for the periodic initialization (transmit part) are periodically initialized. Further, the circuit 9 supplies a decoder circuit 36 with output signals PTOVF and RxINC, and supplies an address counter for the operation code (receive part) 15 and an address counter (receive part) 16 for data. The registers 28–35 are connected to a CPU 5 via a data bus DB and a common bus switching circuit 4.

The decoder circuit 36 supplies control signals to a byte register (receive part) 40, a primary function register (receive part) 41, a byte counter (receive part) 42 and a secondary function register 43. Initially, data from the data bus DB is stored in the registers 40 and 41. Then, the stored data is transferred to the byte counter 42 and the register 43. Further, the data is transferred from the register 43 to a receive task timing circuit 37 via a function decoder circuit (receive part) 44. The function decoder circuit 44 receives an output signal TOVF from the byte counter 42. The receive task timing circuit 37 is supplied with machine cycles M0–M7 from the decoder circuit 36.

An output signal DSCRCTL from the task timing circuit 37 is supplied to a descramble circuit 50, an output signal CRCCTL of which is applied to a CRC check circuit 52. An output signal RxDSET is applied to a serial-to-parallel converter circuit 51. Further, output signals RxTINC and RxDINC of the task timing circuit 37 are respectively supplied to address counters 15 and 16.

The descramble circuit 50 performs a descramble operation on received data RD supplied from the received data phase synchronizing circuit 64, and sends the result of the descramble operation to the CRC check circuit 52 and the serial-to-parallel converter circuit 51. The output data of the CRC check circuit 52 and the serial-to-parallel converter circuit 51 are sent to a write data selector (receive part) 53, which is controlled by the timing signal from the task timing circuit 37, so that selected output data is applied to the data bus DB.

Output signals of the address counters 15 and 16 are applied to an address bus AB via an address multiplexer (receive part) 38, which is supplied to a select signal from the machine clock generating circuit 8 via a timing bus TB. A commonly-owned RAM 6 is connected to the data bus DB and the address bus AB. An interrupt signal INT from the task timing circuit 37 is supplied to the bus switching circuit 4 and the CPU 5.

An output signal TxINT of the fly-wheel counter 10 is applied to a periodically initializing circuit 12, which receives the timing signal from the timing bus TB. The circuit 12 supplies a delay counter load start signal DLLD to a transmit delay counter 39, and supplies an output signal TxINC to a machine cycle decoder circuit 26. The periodically initializing circuit 12 sends an output signal TxARST to address counters 13 and 14, and sends an output signal TxINS to the bus switching circuit 4.

The periodically initializing circuit 12 is connected so that control signals are periodically applied to registers 18–25, as in the case of the periodically initializing circuit 9. The circuit 12 receives a fed-back output signal of the transmit delay counter 39.

The decoder circuit 26 is connected to registers 45–48 and a decoder circuit 49, as in the case of the registers 40–43 and the decoder circuit 44 in the receive part. Further, the decoder circuit 49 is connected to the transmit task timing signal 27, which receives the output signal of the decoder circuit 26. The transmit task timing circuit 27 supplies the address counters 13 and 14 with output signals TxTINC and TxDINC, respectively. The circuit 27 sends an output signal TxDRD to a transmit data buffer register 54, and sends an output signal TxWRT to the shared RAM 6. Further, the circuit 27 supplies the output signal TxDLD a parallel-to-serial converter circuit 55, and supplies output signal CARRON to an elastic store circuit 71 for a carrier ON/OFF signal. Furthermore, the transmit task timing circuit 27 applies an output signal SCRCTL to a scramble circuit 57.

The output signals of the address counters 13 and 14 are supplied to an address multiplexer (transmit part) 17, which sends an output signal to the address bus AB in response to the timing signal from the timing bus TB.

The transmit buffer register 54 is connected to the data bus DB, and sends output data to the parallel-to-serial converter circuit 55 and a write data selector (transmit part) 58. The data selector 58 is supplied with data from a CRC generating circuit 56 receiving serial transmit data from the parallel-to-serial converter circuit 55. Then, the output data passes the selector 58 in response to the control signal from the task timing circuit 27, the output data being applied to the data bus DB.

The output signals of the parallel-to-serial converter circuit 55 and the CRC generating circuit 56 are applied to the scramble circuit 57 via an OR circuit 70. An output signal of the scramble circuit 57 is applied to an elastic store circuit 72 for the transmit frame. An output signal DOVF of the transmit delay counter 39 is applied to registers 66 and 65. A bit phase selecting circuit 67 receives data from the register 66 and a machine clock from the timing bus TB, and thus outputs a byte timing signal BYTET to the parallel-to-serial converter circuit 55, the CRC generating circuit 56 and the scramble circuit 57.

The clock phase selecting circuit 69 is supplied with the data from the register 65 and output signals $\phi 0$–$\phi 7$ from the eight-phase clock generating circuit 2, and sends an output signal SCLK to the elastic store circuits 71 and 72. The circuit 69 further supplies the data selector 58 with state signals PQ0–PQ2 and PLS indicative of the clock phase selecting result. The elastic store circuits 17 and 72 are supplied with a basic clock SCLK, and function to make the output signals of the transmit task timing circuit 27 and the scramble circuit 57 synchronized with the clock signal SCLK, respectively.

A description will now be given of an operation of the transmit and receive device.

1. From Power on to Immediately Before Starting First Read Operation on Shared RAM When a supply of power is turned ON, the PLL circuit 1 generates a clock signal of 32 MHz, which is applied to the eight-phase clock generating circuit 2. The circuit 2 produces eight 8 MHz clock signals φ0–φ7 from the 32 MHz clock signal. The eight clock signals φ0–φ7 have a mutual phase difference equal to approximately 15 ns. When there is the received clock signal, the 32 MHz clock signal is synchronized with the received clock signal.

The eight 8 MHz clock signals are used as follows. The 8 MHz clock signal of phase φ0 is used as the basic clock in the receive part and the transmit part. The other 8 MHz clock signals of phases φ1–φ7 are used to perform a transmit delay control in the transmit part, as will be described later. Hereinafter, the 8 MHz clock signal of phase φ0 may be referred to as a machine clock signal 8MCLK (see FIG. 6).

When the clock signal 8MCLK is applied to the power-on detection circuit 3 from the eight-phase clock generating circuit 2, each circuit is reset. In the reset state, the bus switching circuit 4 connects the common bus to the CPU 5, which is thus allowed to write data into the shared RAM 6.

Figure 8:
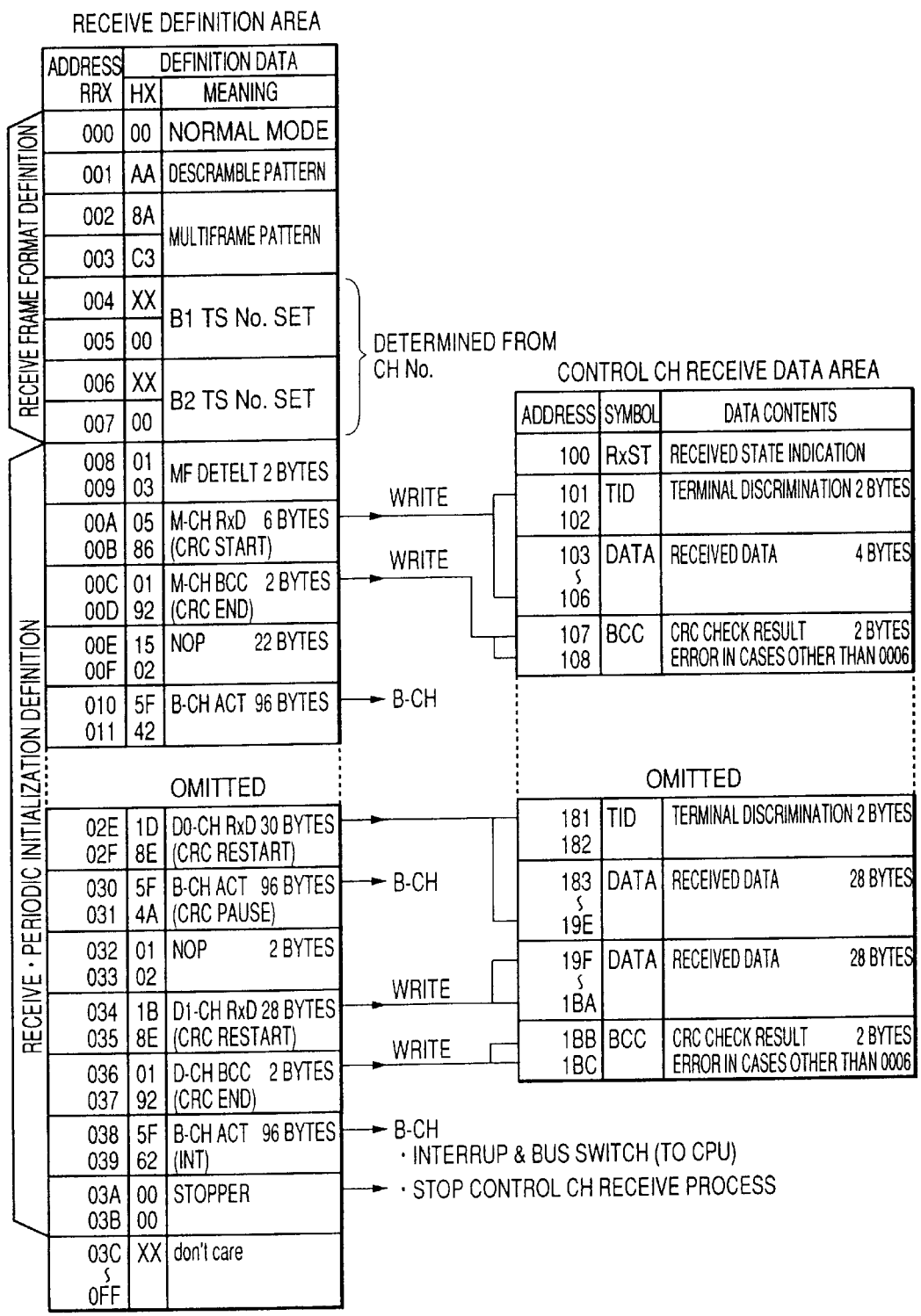
FIG. 8 is a diagram of a memory map of the shared RAM (transmit part)
Figure 9:
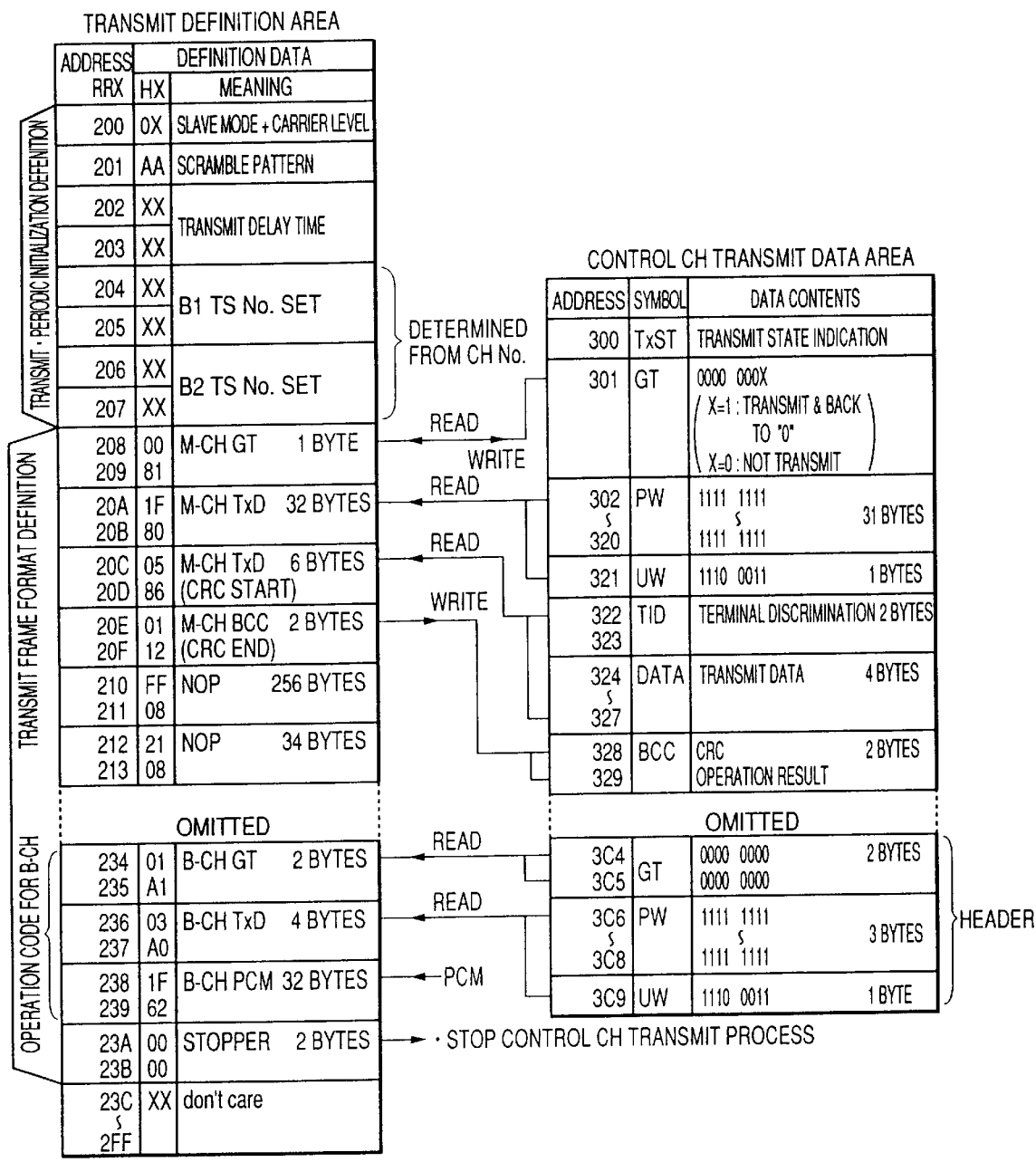
FIG. 9 is a diagram of another memory map of the shared RAM (receive part)

FIG. 7 schematically shows a map of the shared RAM 6. FIG. 8 shows a map of the shared RAM 6 on the receive side, and FIG. 9 shows a map of the shared RAM 6 on the transmit side. The CPU 5 writes program information shown in FIGS. 8 and 9 into the shared RAM 6, and releases the external reset signal ExTRST to the power-on initializing circuit 7 (step S1 shown in FIG. 5A.

The power-on initializing circuit 7 released from the external reset signal ExTRST activates the machine clock generating circuit 8 and the periodically initializing circuit 9 in the receive part. Hence, the circuits 8 and 9 operate in synchronism with each other. That is, the circuits 8 and 9 perform given operations in accordance with unit cycles M0–M7 (see FIG. 6) of a machine cycle defined by three machine clocks, namely, a 4 MHz clock signal (Q0), a 2 MHz clock signal (Q1) and a 1 MHz clock signal (Q2). These three machine clocks are output to the timing bus TB from the machine clock generating circuit 8. More particularly, when the machine clock generating circuit 8 generates the unit cycle M7 of the machine cycle, the periodically initializing circuit 9 recognizes the unit cycle M7 of the machine cycle as being a change point of the machine cycle, and makes a decision on the input signal. The circuit 9 generates the output signal with respect the unit cycle M7 of the machine cycle.

The machine cycle will be described in more detail with reference to FIG. 6. One machine cycle consists of consecutive unit cycles M0–M7, and is used as basic timings at which the operations of various parts are defined, as will be described below. In other words, the machine cycle is the base of a programmable transmit and receive process. In general, the machine cycle can be defined so that it consists of m equal to (1/N)×L where L denotes the number of bits forming the frame, N is a positive integer and m is a positive integer larger than 2.

The embodiment of the present invention being considered relates to a case where a serial signal of a bit rate of 8 Mbps is processed. It can be considered that the unit cycles M0–M7 of the machine cycle correspond to time-based positions of bits 0–7 (one byte or one time slot). That is, one machine cycle passes each time eight bits are input (or output) in serial formation.

Figure 6:
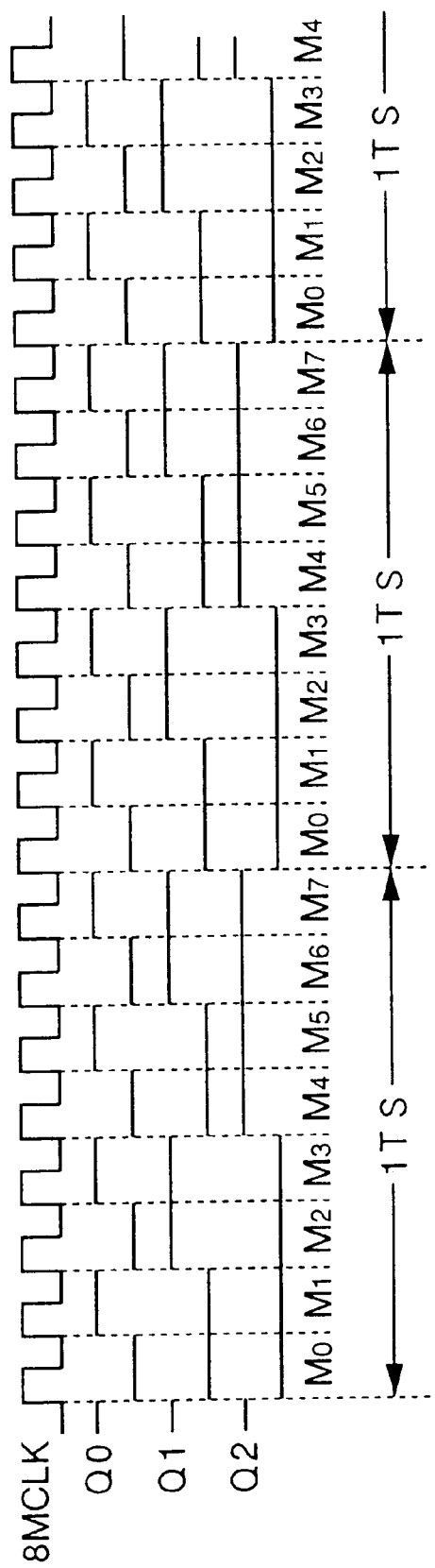
FIG. 6 is a time chart explaining a machine clock used in the present invention.

In the present embodiment, as shown in FIG. 6, the time slot is defined so that one time slot includes eight-bits (one byte) serial data. This means that time-slot-base programming can be carried out when one time slot consisting of eight bits is received or transmitted in one machine cycle. In the present embodiment, one machine cycle is separated into a group of unit cycles M0–M3 and a group of M4–M7. The group of unit cycles M0–M3 is assigned to the memory access in the receive process, and the other groups of unit cycles M4–M7 is assigned to the memory access in the transmit process. Hence, one shared RAM 6 can be accessed in the receive and transmit processes in one machine cycle (see FIG. 10).

Figure 10:
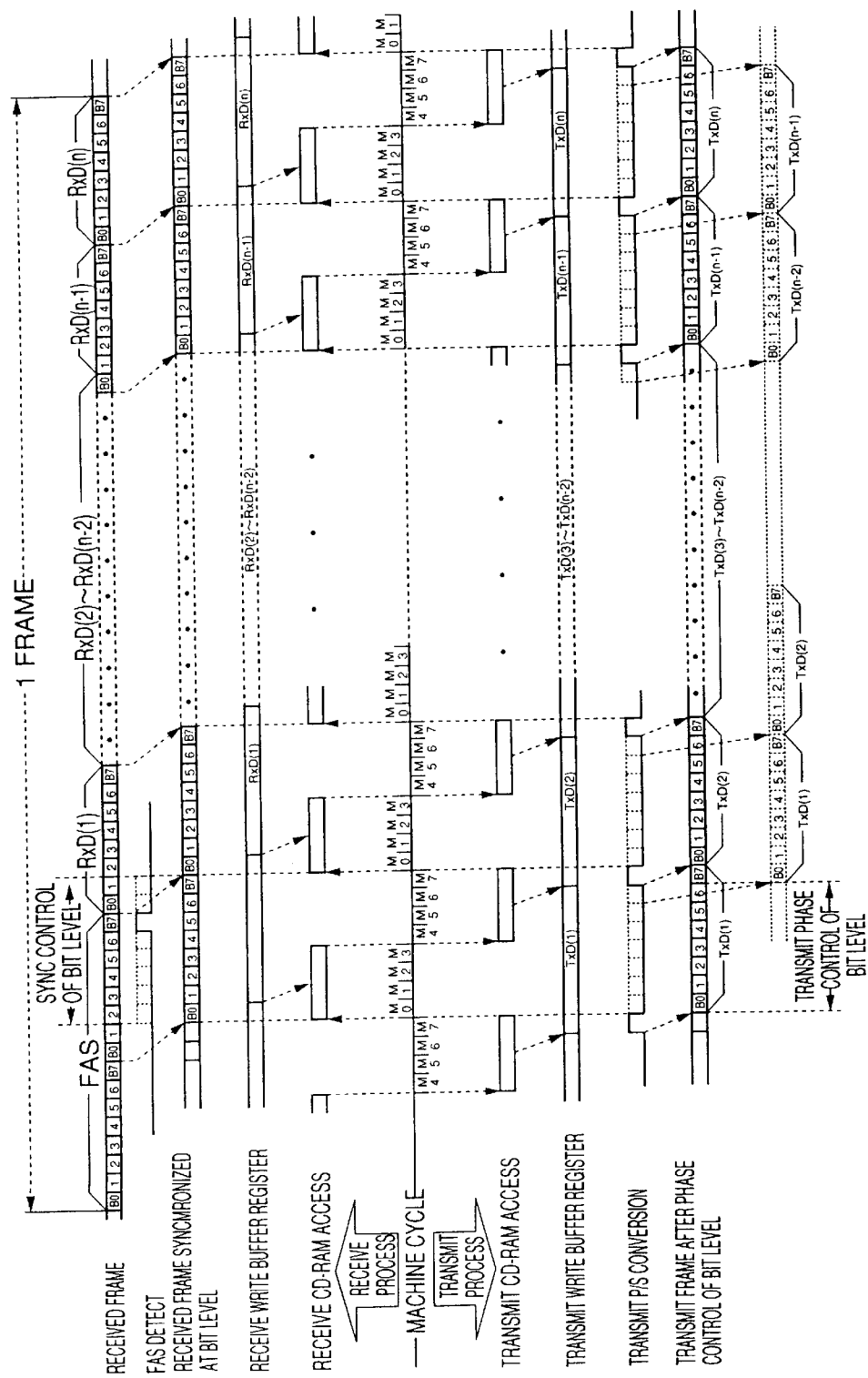
FIG. 10 is a time chart of a relationship between the transmit/receive frame phase and the machine cycle phase.

As shown in FIG. 10, reading of the program information and read/write of the processing result are carried out in time sharing formation in the transmit and receive parts, while all operations relating to the bit-serial signal process are independently carried out in parallel in the transmit and receive parts. In this case, the operations relating to the bit-serial signal process are carried out on real time so that each eight-bit-based process is completed in synchronism with the respective access timings of the shared RAM 6.

The periodically initializing circuit 9 is activated by the power-on initializing circuit 7, and activates the fly-wheel counter 10 at the timing of the unit cycle M7 (step S3 shown in FIG. 5A). The fly-wheel counter 7 starts the count operation from "7" which is preset. This is because one cycle is needed to synchronize the multiframe pattern detection signal MFT from the synchronization protection circuit 62 with the machine cycle (step S7). Further, the preset value "7" is selected taking into account that a delay caused by a process in which a predictive multiframe timing signal PMFT is converted into a hunting signal PMFTS of the bit phase level (step S5).

Figure 11:
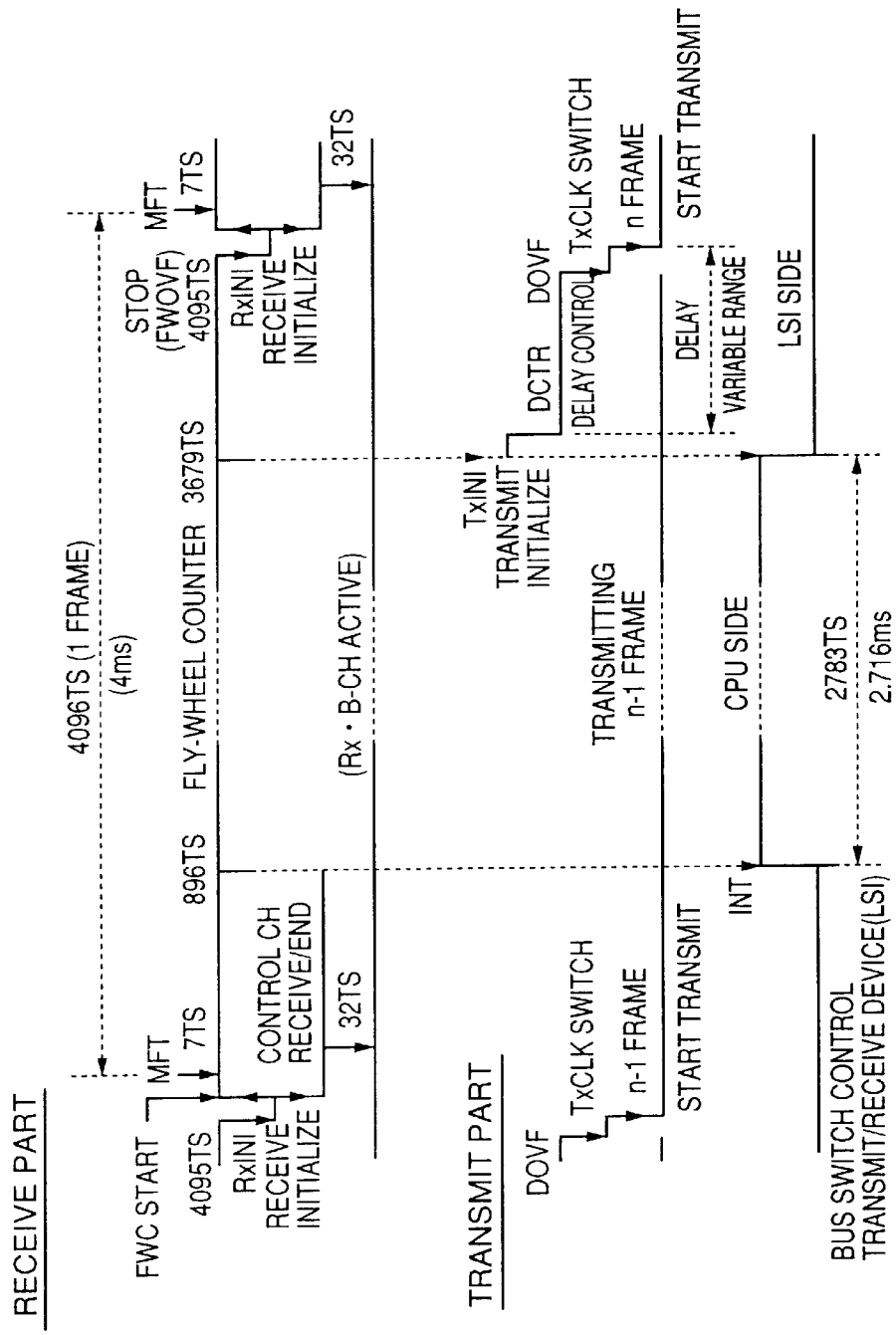
FIG. 11 is a timing chart of a transmit process and a receive process.

After the count operation is started, the fly-wheel counter 10 generates a periodic initialization activating signal TxINI with respect to the transmit part when the count value becomes equal to 3679 (time slot TS), and generates the overflow signal FWOVF when the counter value becomes equal to 4095 TS. The count operation is stopped at "0" (see FIG. 11). The count-up operation of the fly-wheel counter 10 is carried out at the timing M7 of the machine cycle. Hence, the lengths of the periodic initialization activating signal TxINI and the overflow signal FWOVF are equal to one machine cycle consisting of the unit cycles M0–M7.

The periodically initializing circuit 12 in the transmit part receives the signal TxINI, and supplies the bus switching circuit 4 with the switch signal TxINS indicative of switching from the CPU 5 to the present transmit/receive device, so that an access from the CPU 5 is inhibited. Further, the periodically initializing circuit 12 sends the address reset signal TxARST to the address counter 13 for the operation code and the address counter 14 for transmit data. Thereby, it is ready to read data from the shared RAM 6.

The periodically initializing circuit 9 in the receive part receives the overflow signal FWOVF, and outputs the address reset signal RxARST to the address counters 15 and 16 in the receive part. Thereby, it is ready to read data from the shared RAM 6.

Figure 12A:
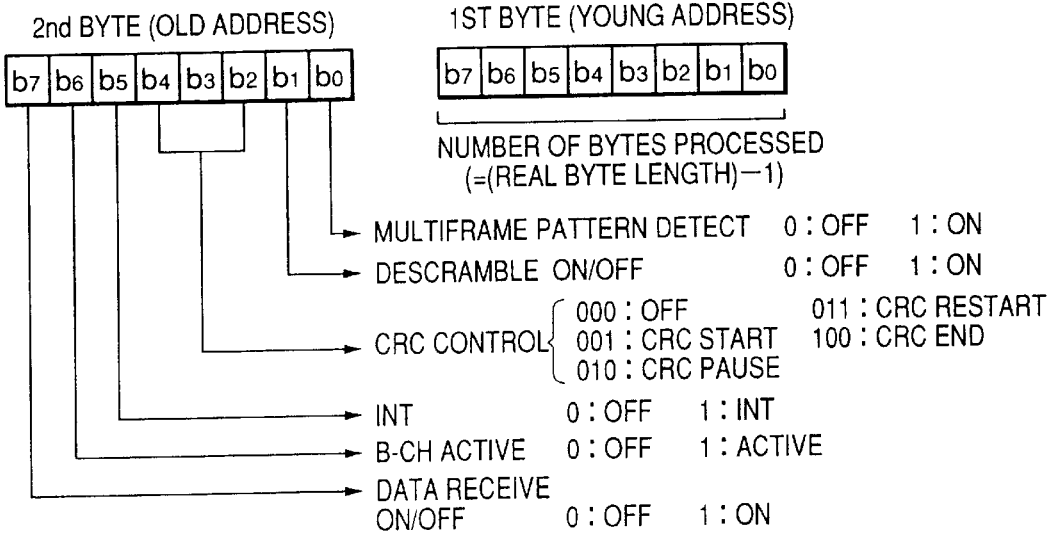
FIGS. 12A and 12B are diagrams of formats of operation codes.
Figure 12B:
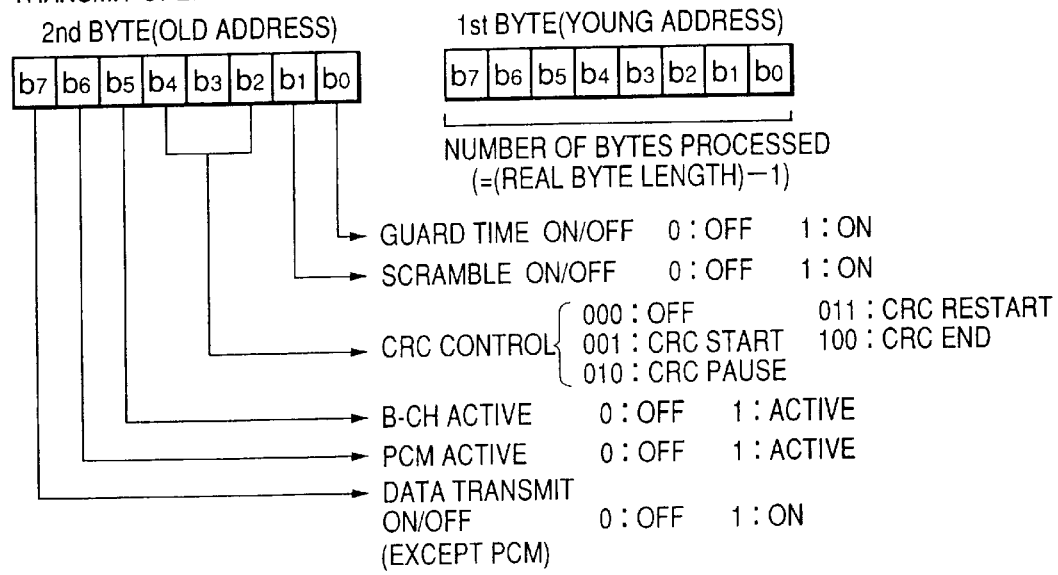

An example of the operation code used at the time of transmit and receive is shown in FIG. 12. The above operation is carried out before the shared RAM 6 is accessed after the power supply is turned ON. It will be noted that the above operation is directed to reading program information (frame format information) from the shared RAM 6 and is thus carried out in the above-mentioned manner each time the power supply is turned ON. That is, the above operation is not related to any operation mode, frame format, and receipt of a signal at all.

2. Periodic Initialize in Transmit and Receive Parts (Operation From Determination of Operation Mode to Immediately Before Reading of Program Information A description will now be given of the operation mode to be determined (or specified) and a parameter determined by the periodic initialization for every 4 ms-length frame.

The young-number address will be described with reference to FIGS. 7 through 9. As shown in FIG. 7, a periodic initialization program area for the receive part is provided, as shown in FIG. 7. As shown in "receive initialization definition" in FIG. 8, three items relating to a normal/loopback mode, framing pattern invert/non-invert, and descrambler validation/invalidation can be independently specified within the first byte in the periodic initialization program area. An initial set pattern of the descrambler can be specified in the second byte of the periodic initialization program area for the receive part. A multiframe pattern can be specified in the third and fourth bytes. A down communication channel (B1) of the first line circuit can be specified in the fifth and sixth bytes (setting of a path). A down communication channel (B2) of the second line circuit can be specified in the seventh and eighth bytes (setting of a path).

As shown in "transmit initialization definition" in FIG. 9, four items relating to the master/slave mode, successive/burst frame mode, scrambler validation/invalidation and carrier level can be independently specified within the first byte in the periodic initialization program area for the transmit part. An initial set pattern of the scrambler can be specified in the second byte. A transmit delay time can be specified in the third and fourth bytes. An up communication channel (B1) of the first line circuit can be specified in the fifth and sixth bytes. An up communication channel (B2) of the second line circuit can be specified in the seventh and eighth bytes.

The periodically initializing operations on the transmit and receive parts will now be described by referring to the contents specified.

In the periodically initializing operation (step S8) in the transmit part, the periodically initializing circuit 12 of the transmit part is activated by the signal TxINI from the fly-wheel counter 10. Hence, the common bus is switched to the present transmit and receive device, and the CPU 5 cannot access the common bus. The address counters 13 and 14 of the transmit part are reset and output "0".

At the timing of the unit cycle M4 of the machine cycle, the periodically initializing circuit 12 of the transmit part outputs a set pulse to the register 18, and reads the first byte (see FIGS. 10, 14A and 14B) The address of the shared RAM 6 is a ten-bit address signal output from the multiplexer 17. More particularly, the ten-bit address signal includes the seven bits from the address counter 13, and three bits Q0–Q2 which bits define the timing of M4. The bits Q1 and Q2 form the first and second most significant bits of the ten-bit address signal, and the bit Q0 forms the least significant bit thereof. In this case, the address indicates address "200" in hexadecimal notation (see FIG. 9).

At the timing of M5, the bit Q0 changes from "0" to "1", and thus the output of the multiplexer 17 indicates address "201". At the timing of M5, the periodically initializing circuit 12 outputs a set pulse to the register 19 in order to read the second byte, and outputs an increment indication signal TxINC to the machine cycle decoder circuit 26. In this manner, the two bytes can be read in one machine cycle.

The decoder circuit 26 receives the increment indication signal TxINC, and causes the address counter 13 to increment the count value by 1 via the task timing circuit 27, so that it is ready for the timings of M4 and M5 of the next machine cycle.

The above operation is repeatedly carried out every four machine cycles, so that the registers 18–25 are sequentially accessed and the periodically initializing operation on the transmit part by eight bytes stored in address "200" to "207" is completed. The transmit delay counter 39 is informed of the completion of the periodically initializing operation by the delay counter load start signal DLLD.

The periodically initializing operation of the receive part (step S4) is started when the periodically initializing circuit 9 receives the overflow signal FWOVF. This operation of the receive part is related to the address counter 15, the increment indication signal RxINC to the decoder circuit 36, the address multiplexer 38 and the task timing circuit 37. Eight bytes stored in address "000" to "007" of the shared RAM 6 are sequentially read at the timings of M0 and M1 of the machine cycle (two bytes per one machine cycle), and are applied to the registers 28–35. In this manner, the periodically initializing operation is completed (see FIGS. 10, 13A and 13B).

It can be seen that the periodically initializing operation of the receive part is the same as that of the transmit part except for the assignment of the timings in one machine cycle. The decoder circuit 36 is informed of the completion of the periodically initializing operation by the periodic initialization completion signal PTOVF (having a width equal to one machine cycle).

The periodically initializing circuit 9 outputs the predictive multiframe timing signal PMFT at the timing of M7 of the last machine cycle in the periodically initializing operation. Hence, the fly-wheel counter 10 can be restarted via a route indicated by a dotted line (step S3). The restart of the fly-wheel counter 10 is associated with the framing protection operation (step S6), and will thus be described later in detail.

3. Transmit and Receive Process (From Reading of Program Information to Switching of Common Bus to CPU)

After power on, the periodically initializing operation of the transmit part (step S8) is completed, and then the periodically initializing operation of the receive part (step S4) is completed, as has been described previously. Then, it becomes possible to read program information (operation code) from the shared RAM 6 and to perform a task control based on the read program information, a real-time process for data to be transmitted and received data, and an associated read/write operation on the shared RAM 6.

First, the access operation (read/write) on the shared RAM 6 will be described. Next, a description will be given of the task control in which a task control part interprets an operation code and controls a control part. Then, the above control part will be described.

3.1 Time Sharing Access to Shared RAM (Read/Write)

After the completion of the periodically initializing operations of the transmit and receive parts, the reading of program information (operation code) is started by, in the receive part, the aforementioned periodic initialization completion signal PTOVF (having a width equal to one machine cycle), and by, in the transmit part, the aforementioned overflow signal DOVF of the transmit delay counter 39 (step S12). The access operation on the shared RAM 6 in the transmit part is the same as that in receive part except for the start signals and the assignment of the timings in the machine cycle. Hence, by way of example, the access operation on the shared RAM 6 in the receive part will be described (FIGS. 10, 13A–16).

The aforementioned decoder circuit 36 receives the periodic initialization completion signal PTOVF (having a width equal to one machine cycle), and outputs the set pulse to the register 40 at the timing of M0 of the same machine cycle. As shown in the receive frame format definition in FIG. 8, the number of bytes to be processed stored in address "008" of the shared RAM 6 is read.

At the timing of M1 subsequent to M0, the decoder circuit 36 outputs the set pulse to the register 41 so that the content of the process (definition of the function) stored in address "009" is read. Further, the decoder circuit 36 outputs the increment signal RxTINC to the address counter 15, so that the count value is incremented by 1.

In the above manner, the reading of the format information is completed (the detection of the multiframe pattern is indicated by operation codes "01" and "03" shown in FIG. 12).

The subsequent timings of M2 and M3 are used to write the result of the process by the operation code read in the previous machine cycle into the shared RAM 6. However, in this case, the writing of data into the shared RAM 6 is not carried out because the state shifts, after the completion of the periodically initializing operation, to the state in which the first operation code can be read.

The above is the operation in half the machine cycle (M0–M3) assigned to the receive part (see FIGS. 13A and 13B). In the subsequent unit cycles M4–M7 of the same machine cycle as described above, the transmit part is allowed to access the shared RAM 6.

The number of bytes set in the register 40 determines whether the read operation on the shared RAM 6 should be carried out at the timings of M0 and M1 of the next machine cycle. If one byte is specified in the register 40, the read operation is carried out. If two bytes are specified in the register, the read operation is carried out in the next machine cycle (see FIG. 17).

Each time the indicated number of bytes is processed in the above manner, the reading of the operation code and increment of the address are repeatedly carried out until all-zero data functioning as a stopper is read.

As shown in FIGS. 13A, 13B, 14A and 14B, the writing of the received channel data and the result of the receive process is carried out. On the transmit side, the reading of the transmit control channel data and the writing of the result of the transmit process are carried out.

3.2 Task Control (Individual Control of Concurrent Transmit and Receive Operations in Parallel)

The following description focuses upon the operation of the task control part based on receipt of the operation codes written into the registers 40 and 41 of the receive part and the registers 45 and 46 of the transmit part. The following operation mainly relates to the receive part, but holds true for the operation in the transmit part. Hence, in the following description, the parts relating to the transmit part are indicated by the reference numbers placed in the parentheses.

It will be noted that an nth machine cycle is denoted by symbol "#n" where n is an integer. For example, the first machine cycle after the completion of the periodic initialization is denoted as #1, and the unit cycles M0–M7 thereof are respectively denoted as #1M0–#1M7. The first machine cycle is the machine cycle in which the signal PTOVF is output in the receive part and the signal DOVF is output in the transmit part.

When the operation code is written into the registers 40 and 41 (45 and 46) at the timings of #1M0 and #1M1 (#1M4 and #1M5), the decoder circuit 36 (26) loads the number of bytes to be processed in the register 40 (45) to the byte counter 42 (47), and loads the definition of the process function in the register 41 (46) to the register 43 (48). In the present embodiment of the invention, the byte counter 42 (47) is formed of a binary-up counter, and converts the number of bytes into time-based information by utilizing the overflow signal TOVF thereof.

More particularly, a value which is one byte less than the actual number of bytes is stored in the shared RAM 6, and is written into the register 40 (45). When the above value is loaded to the byte counter 42 (47), the value is logically inverted and loaded thereto (see FIG. 15). The byte counter 42 (47) starts the count-up operation from the loaded value, and informs the machine cycle decoder circuit 36 (26) and the function decoder circuit 44 (49) of the event such that the count value reaches a given number of bytes by overflow.

The byte counter 42 (47) is incremented at every timing of M7. When the decoder circuit 36 (26) receives the overflow signal TOVF, it reads the next operation code to the registers 40 and 41 (45, 46) at the timings of M0 (M4) and M1 (M5) of the present machine cycle. The above operation is repeatedly carried out until all-zero data is read. Hence, the process function definition information equal to the number of bytes to be processed (one machine cycle is equal to one byte) is always in the register 43 (48).

The function decoder circuit 44 (49) receives the process function definition information from the register 43 (48), and interprets it to thereby output a resultant task type indication signal to the task timing circuit 37 (27). The circuit 37 (27) generates the task control signal from the task type indication signal and the unit cycles M0–M7 from the decoder circuit 36 (26), and starts the output operation from the timing of #2M0 (#2M4). Then, the control of the process part is initiated.

As described above, the operation code read at the timings of #nM0–#nM1 (#nM4–#nM5) is executed at the timings of #n+1M0–#n+1M7. This operation is repeatedly carried out.

It should be noted that the task control in the transmit part needs the ON/OFF control of the carrier, which is carried out by the transmit task timing circuit 27. This is a function required when the operation mode of the transmit part is set to the burst transmit mode.

If the operation code relates to the presence of the guard time and the least significant bit DB0 of the beginning byte of transmit data is "1", the operation code is recognized as being a transmit request flag, the transmit data is delayed by the number of bytes specified by the operation code of the guard time (two bytes in the case shown in FIG. 9), and the signal CARRON indicating the carrier ON is output. The beginning byte is already read at the timing of M6, it is changed back to "0" at the next timing M7. This is executed by an exclusive-OR circuit 59.

The CPU 5 is notified of the completion of the data transmission. The carrier is turned OFF after the operation code of CRC is executed (step S13).

As described above, in both the transmit and receive parts, the next operation code is read at the same time as the process of the number of bytes specified by the operation code. In this manner, the operation codes are successively executed. If an operation code indicative of an interrupt is received in the receive part, the interrupt signal INT is supplied to the bus switching circuit 4 and the CPU 5 in the next machine cycle (step S11).

Thereafter, the CPU 5 accesses the shared RAM 6, and processes transmit data or received data. This process can be carried out until the common bus is switched in response to the next signal TxINS.

The task control parts in the transmit and receive parts activate circuit parts related to communication channels when an operation code indicative of B-channel activation.

The transmit and receive operations on the B channel can be carried out in the same manner as that of the prior art.

3.3 Operation of Process Part (Process Before Data is Stored in Shared RAM

The control channel process parts 50–52 in the receive part operate as follows. The descramble circuit 50 descrambles the received data in bit-serial formation. The descrambled received data is converted into parallel data by the serial-to-parallel converter circuit 51, and is subjected to the CRC check by the CRC check circuit 52. These processes are carried out in synchronism with the timing signals from the task timing circuit 37. The result of the processes is written into the received data area in the shared RAM 6 at the timings of M2 and M3 in such a way that the task timing circuit 37 controls the data selector 53 and the address counter 16.

Figure 15:
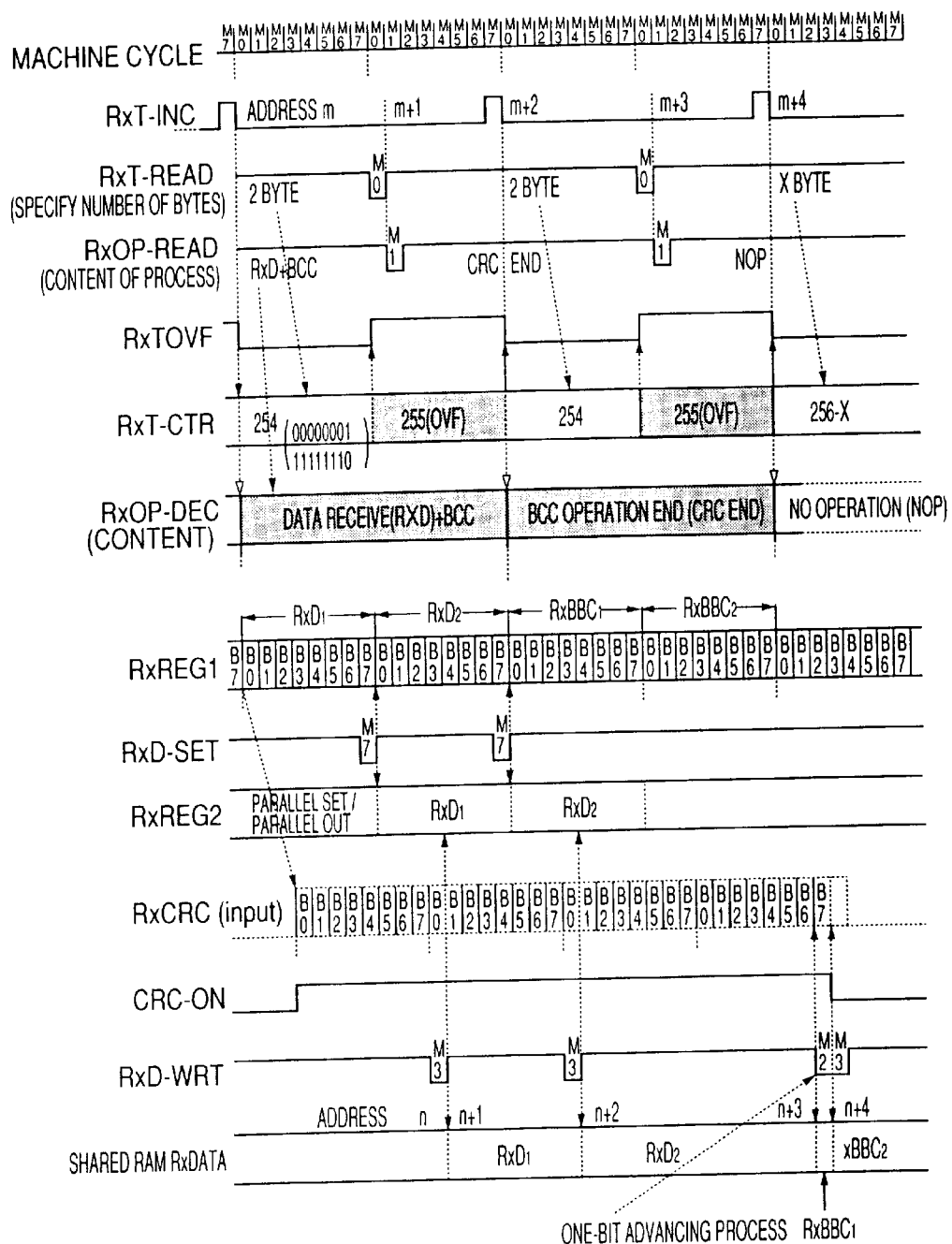
FIG. 15 is a time chart of an example (CRC process) of execution of the receive process.
Figure 16:
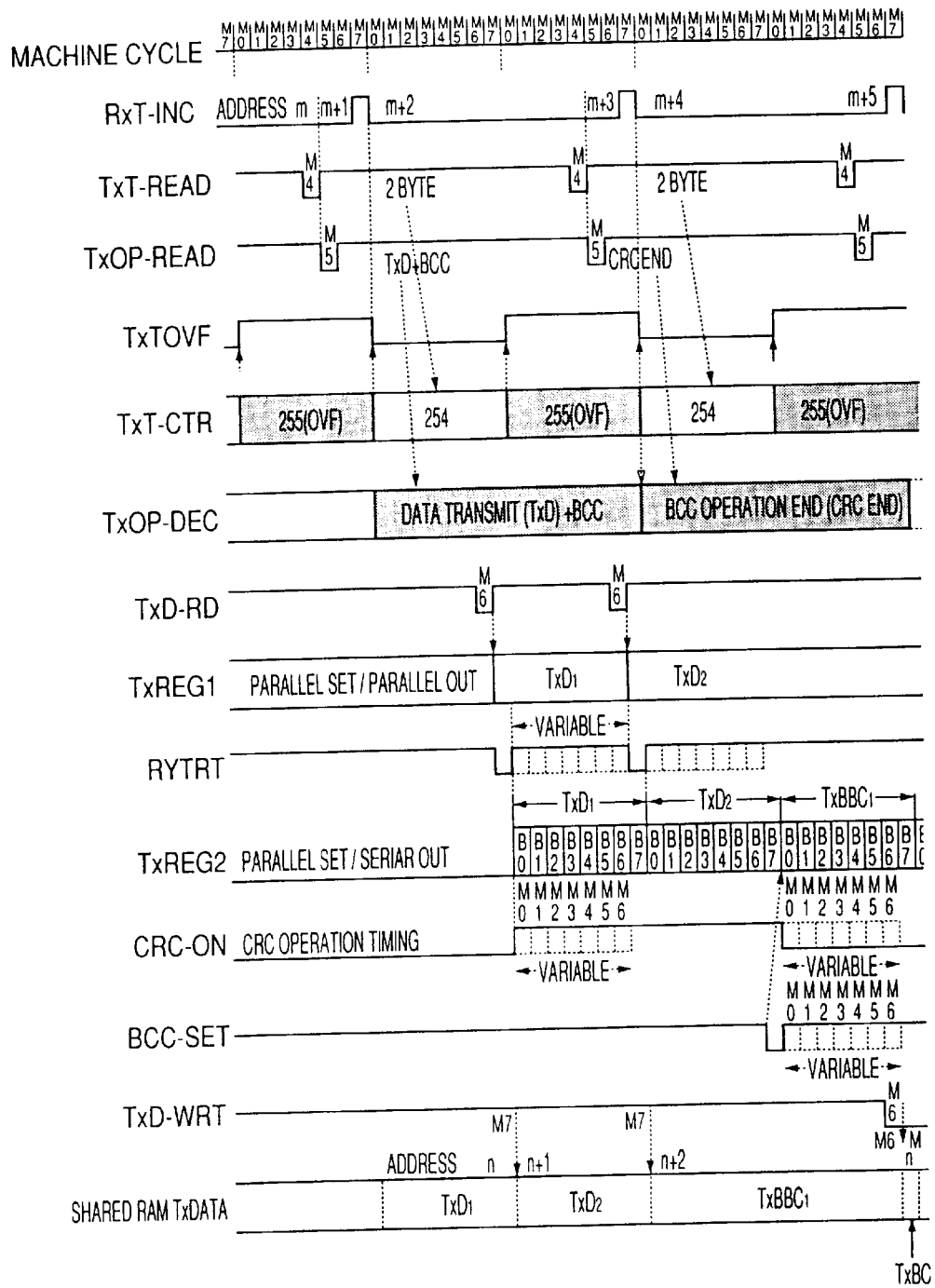
FIG. 16 is a time chart of an example (CRC process) of execution of the transmit process.

An example of the receive process is illustrated in FIG. 15.

Figure 18:
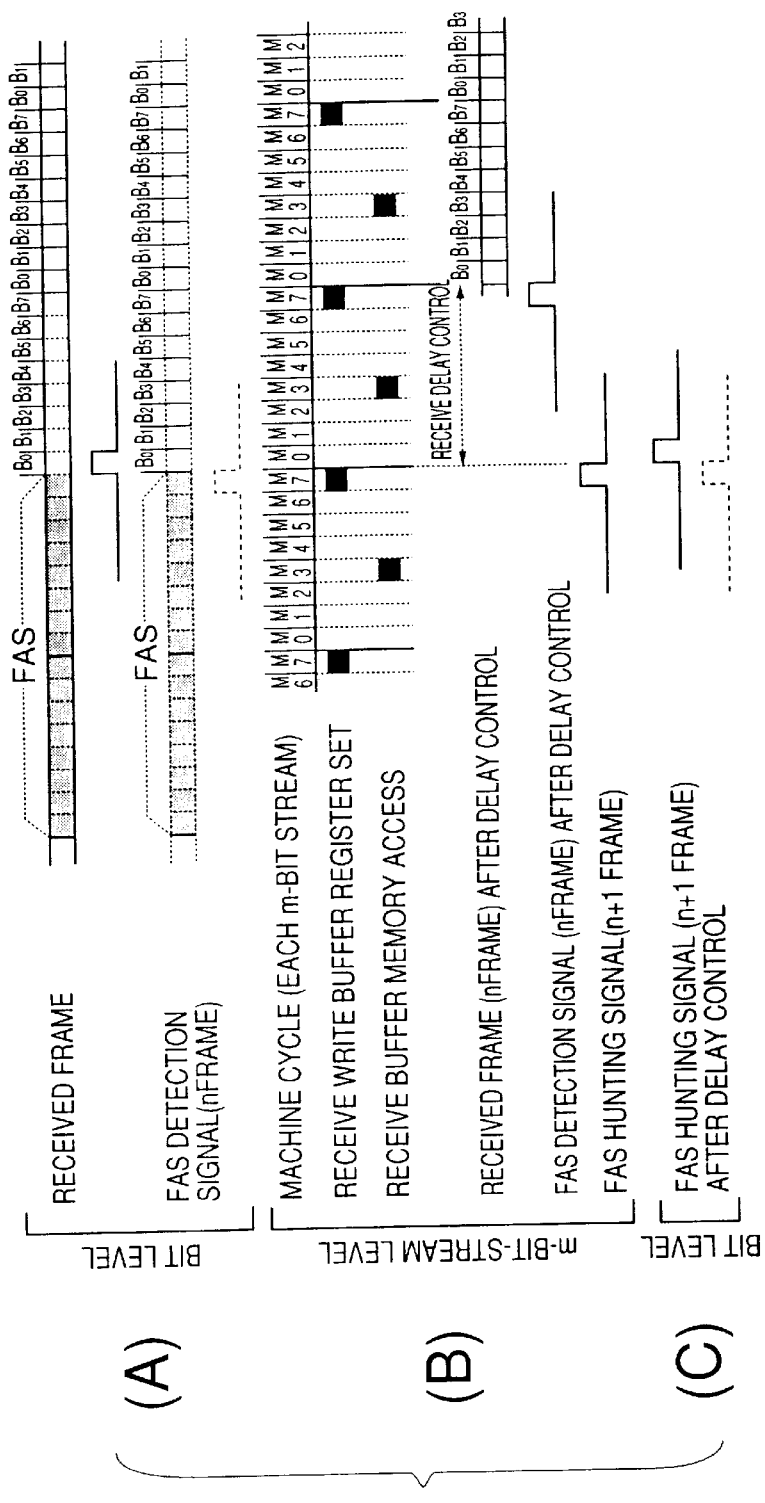
FIG. 18 is a time chart of a receive synchronizing operation.

In order to write the received data into the shared RAM 6 at the given timings of M2 and M3, the phase of the received frame is brought into synchronization with the phase of the machine cycle. This synchronizing operation is illustrated in FIGS. 17 and 18, which will be described later.

Figure 20:
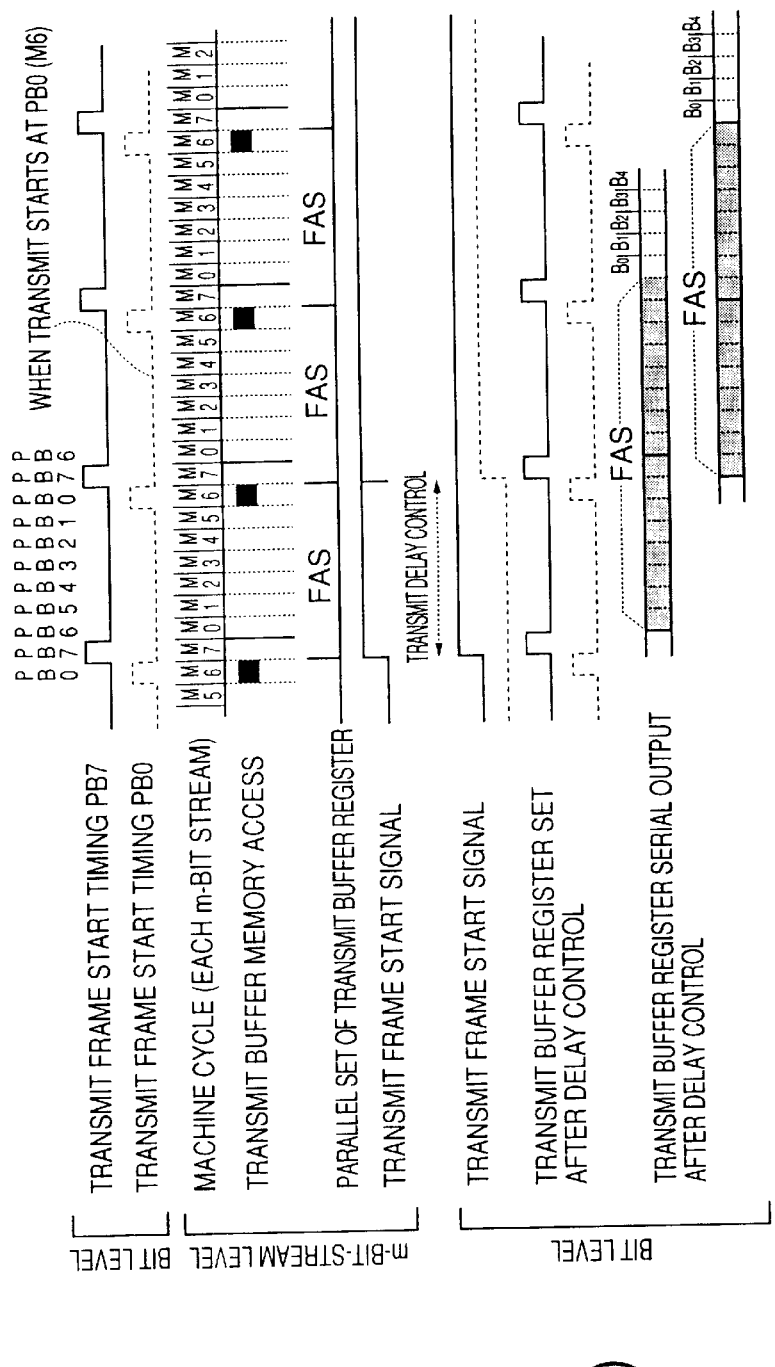
FIG. 20 is a time chart of a process of converting the machine cycle level into the bit cycle level.

The control channel process parts of the transmit part operates as follows. Parallel data is written, at the timing of M6, into the transmit data buffer register 54 from the transmit data area in the shared RAM 6. The parallel data is then converted into serial data by the parallel-to-serial converter circuit 55 with a bit phase (which will be described later), which gives the transmit data a transmit delay time indicated by the byte timing signal BYTET defined by the three-bit data in the register 66. Then, BCC is added to the transmit data by the CRC operation circuit 56, and is then scrambled by the scramble circuit 57. The above processes are carried out in synchronism with the timing signals from the task timing circuit 27 (see FIG. 20).

The phase is converted from the phase of the machine cycle to the phase of the bit in order to perform the read and write operations on the shared RAM 6 at the given timings M6 and M7 and make the phase of the transmit frame variable at the phase of the bit level shorter than the machine cycle. Such a phase conversion will be described later with reference to FIGS. 19 and 20.

4. Receive Synchronizing and Transit Phase Control

The above description was given in the sequence of "from power on to periodic initialize", "reading of frame format (operation code)", "interpret of operation code" and "process execute". The above sequence is common to the transmit and receive parts, and the individual processes thereof are regulated by the unit cycles M0–M7 of the machine cycle. That is, the individual processes are carried out for each byte (one time slot) of bit streams B0–B7 (see FIG. 10) without recognizing the bit timing (bit position) of the transmit and receive operations.

However, the actual transmit and receive frames are frame-synchronized at the bit timing level. Particularly, the transmit frame is subjected to the transmit timing control (delay control) at the level of the multiple-clock phase level which is more precise than the bit level.

With the above in mind, the following receive synchronization and transmit phase control are employed.

4.1 Receive Synchronization

At the commencement of the receive synchronization, as has been described, the fly-wheel counter 10 starts the count operation, and the periodically initializing circuit 9 of the receive part is activated by the signal FWOVF. When the periodic initialization is completed, the fly-wheel counter 10 is restarted (step S3). The above repetitive state is called a free-running state.

In the free-running state, the multiframe pattern detection circuit 61 outputs no detection signal RMFT (step S9) because there is no input receive frame via the input terminal RxBIT. Hence, it is considered that the restart of the fly-wheel counter 10 is carried out by a provisional multiframe pattern detection signal. That is, the cycle of restarting corresponds to the length of the multiframe (4 ms in the present embodiment). The fly-wheel counter 10 increments the count value at the timing of M7 of the machine cycle.

When an actual multiframe pattern FAS (which is inherent pattern information indicating the starting point of digital information) in the free-running state (step S9), the multiframe pattern detection circuit 61 outputs the received multiframe pattern detection signal RMFT to the frame synchronization protection circuit 62. The circuit 62 (step S6) outputs the received signal RMFT, as the multiframe pattern detection signal MFT, to the received frame synchronization circuit 63 (step S7), the received data phase synchronization circuit 64 and the received frame variable delay circuit 68. Then, the circuit frame synchronization protection circuit 62 shifts to a backward protection state (see FIG. 21).

Each time the received frame synchronization circuit 63, the received data phase synchronization circuit 64 and the received frame variable delay circuit 68 respectively receive the signal MFT, these circuits convert the received phase into information based on the timings of M0–M7 of the machine cycle, and store the converted phase information. Based on the stored phase information, a delay time is given (step S7) as shown in FIG. 17, so that the phase of the received frame is synchronized with the phase of the machine cycle (see FIG. 18).

The nth multiframe pattern detection signal MFTS synchronized with the phase of the machine cycle restarts the fly-wheel counter 10 via the periodically initializing circuit 9 of the receive part. Hence, the phase of the receive process which is carried out by reading program information from the shared RAM 6 is also synchronized with the fly-wheel counter 10. The periodically initializing circuit 9 is activated by the overflow signal FWOVF of the fly-wheel counter 10 restarted. The (n+1)th provisional (or predicted) multiframe timing signal PMFT which is output at the end of the count operation is converted into a bit-level-phase signal by the received frame variable delay circuit 68 (step S5). Then, the bit-level-phase signal is applied, as a hunting signal PMFTS, to the frame synchronization protection circuit 62.

Figure 21:
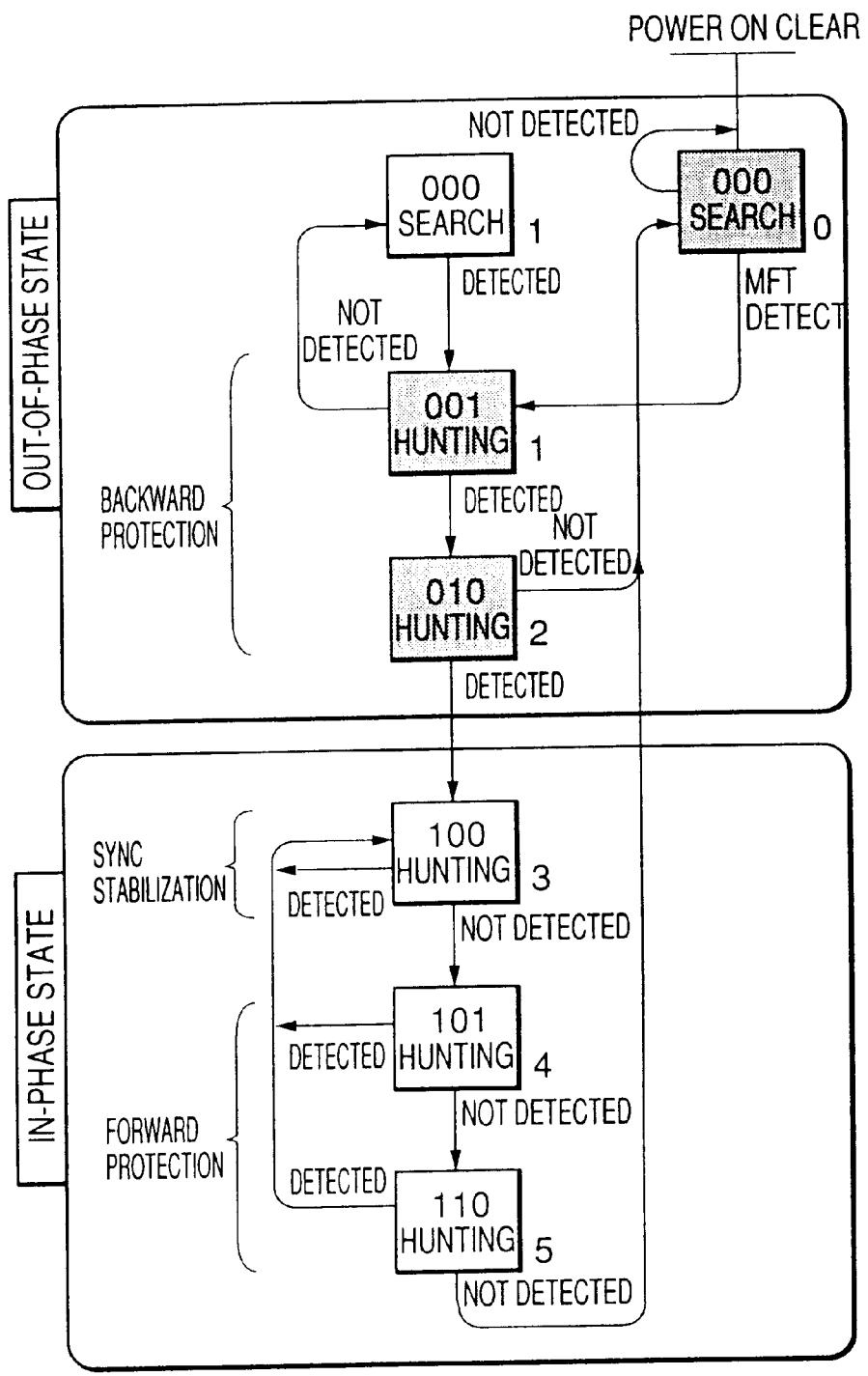
FIG. 21 is a diagram of a state transition in a receive frame synchronization protecting operation.
Figure 22:
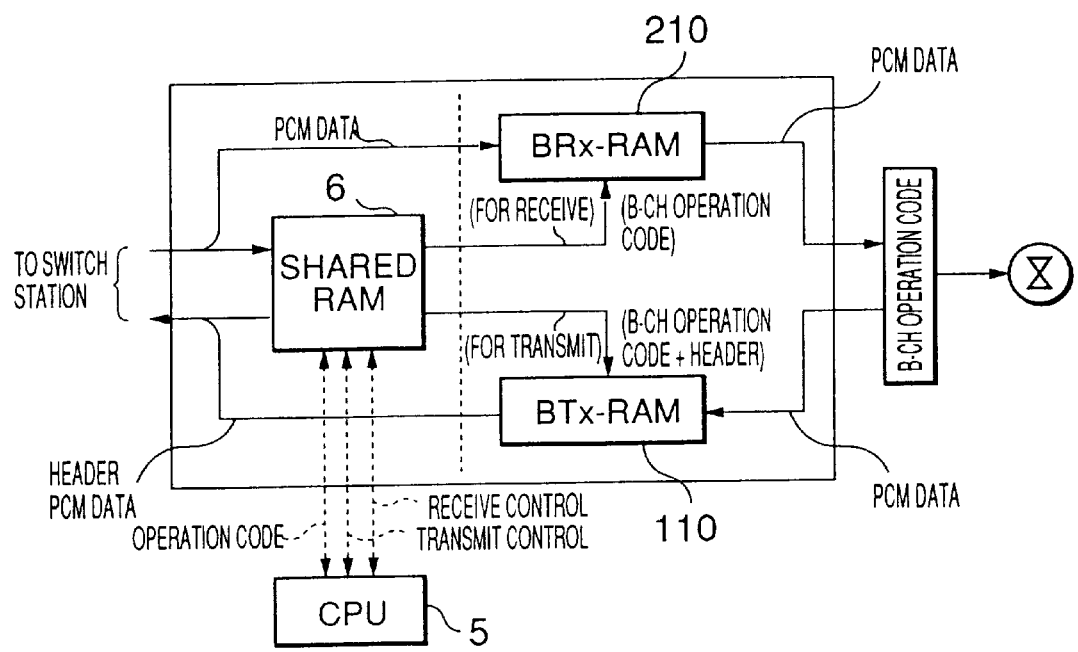
FIG. 22 is a block diagram for explaining a concept of a transmit/receive process in a speech-communication channel (B channel) in the frame transmit/receive method and device of the present invention.

A description will now be given of the received frame synchronization protection with reference to FIG. 21.

(1) State of Search 0

An aperture gate is in the open state until the synchronizing pattern is detected. In this state, the predictive signal of the frame timing defined at the time of a release from the power-on reset or the predictive signal from a state of hunting 2 passes through the aperture gate, and an counter FWC is thereby activated. Hence, an interrupt signal INT-F due to an out-of-synchronization state is generated (step S11). When the synchronization pattern is detected, the aperture gate is immediately closed, and the predictive signal cannot pass through the aperture gate. Further, the backward protection counter is incremented by +1, and the device switches to a state of hunting 1.

(2) State of Hunting 1

The counter FWC is activated at the frame timing detected by search 0 or 1, and the timing of detecting the next frame is hunted by a narrow aperture. If the narrow aperture is not detected, the aperture gate is immediately opened and the backward protection counter is reset, so that the device shifts to the state of search 1 (the predictive signal is not output). When the detection is successive, the backward protection counter is incremented by +1, and the device shifts to a state of hunting 2.

(3) State of Search 1

The aperture gate is in the open state until the synchronization pattern is detected. Since the predictive signal is not reached, the counter FWC cannot be activated. Hence, the interrupt of the out-of-synchronization cannot be produced. When the synchronization pattern is detected, the aperture gate is immediately closed (this detection timing serves as the predictive signal for the next frame), and the backward protection counter is incremented by +1. Hence, the device shifts to the state of hunting 1.

(4) State of Hunting 2

The counter FWC is activated at the frame timing detected by the hunting 1, and the detection timing for the next frame is hunted by the narrow aperture. If the detection timing is not hunted by the narrow aperture, the aperture gate is immediately opened, and simultaneously the predictive signal is output. The backward protection counter is reset, and the device shifts to the state of search 0. If the detection timing is hunted, the backward protection counter is reset and the synchronization establishing bit is set to "1". Thereby, the device shifts to a state of hunting 3.

(5) State of Hunting 3

The counter FWC is activated at the frame timing detected by the hunting 2, and the detection timing for the next frame is hunted by the narrow aperture. If the detection timing is not hunted, this timing is output as the predictive signal, and the forward protection counter is incremented by +1. Thereby, the device shifts to a state of hunting 4. If the detection timing is hunted, the device remains in the state of hunting 3.

(6) State of Hunting 4

The counter FWC is activated by the predictive signal for the hunting 3, and the detection timing for the next frame is hunted by the narrow aperture. If the detection timing is not hunted by the narrow aperture, this timing is output as the predictive signal, and the forward protection counter is incremented by +1. Hence, the device shifts to a state of hunting 5.

(7) State of Hunting 5

The counter FWC is activated by the prediction signal for the hunting 4, and the detection timing for the next frame is hunted by the narrow aperture. If the detection timing is not hunted by the narrow aperture, the aperture gate is immediately opened, and simultaneously the predictive signal is output. The forward protection counter and the synchronization establishing bit are reset to shift to the state of search 0. If the detection timing is hunted, the forward protection counter is reset, and the device returns to the state of hunting 3.

The backward protection counter and the forward protection counter can be realized by a single identical 2-bit counter in practice. The counter is controlled by the synchronization establishment bit (SYNC) so that it functions as the backward protection counter in the out-of-synchronization state or the forward protection counter in the synchronization-established state.

4.2 Transmit Phase Control (Phase Adjustment at Bit Level/Clock Level)

As has been described previously, the fly-wheel counter 10 starts the count operation, and the periodically initializing circuit 12 is activated by the signal TxINI which is output when the counter value is equal to 3679. When the periodic initialization operation is completed, the delay counter lad start signal DLLD is output to the transmit delay counter 39 (step S12). At this time, the value loaded in parallel to the transmit delay counter 39 at the timing of the signal DLLD is the transmit delay time of the machine cycle level (see FIGS. 19 and 20).

Now, the method of specifying the delay time will be described. In the present embodiment, the CPU 5 processes control data transmitted by a station (via the M channel) and dependent on the distance, and specifies the resultant delay time by making two-byte data indicative of the above delay time written into the periodic initialization definition area (see FIG. 9). The specified delay time is supplied to the register 20 (lower byte) and the register (upper byte) by the periodic initialization operation. Assuming that the most significant bit is denoted as D15 and the least significant bit is denoted as D0, three bits D0–D2 are used to perform the selection from among eight phase clocks $\phi 0$–$\phi 7$ (fine adjustment), and three bits D3–D5 are used to perform the selection from among the bit phases D0–D7 corresponding to the unit cycles M0–M7 of the machine cycle (fine adjustment). The six remaining bits D6–D14 are used to indicate the number of machine cycles (rough adjustment). The bit D15 indicates the sign "±", and the direction about $\phi 0$ can be specified when the selection from among $\phi 0$–$\phi 7$ is carried out.

Normally, the sign "+" is specified and a slow-oriented direction is used in which $\phi 1$–$\phi 7$ are slower than $\phi 0$ and become gradually slower in this order. When the sign "−" is specified, a fast-oriented direction is used in which $\phi 1$–$\phi 7$ are faster than $\phi 0$ and become gradually faster in this order. Hence, it is possible to define the transmit timing at the shortest delay within the range of one bit.

The value loaded in parallel to the transmit delay counter 39 consists of nine bits D6–D14. The transmit delay counter 39 is formed of an up counter, and increments at the timing of M7 of each machine cycle when the nine bits D6–D14 are loaded in parallel. Then, the counter 39 outputs the overflow signal DOVF and stops. The overflow signal DOVF serves as the transmit frame starting timing at the machine cycle level (see FIG. 11).

That is, as described above, the reading of the program information (operation code) concerning the transmit part is started in response to the overflow signal DOVF (step S13). The machine cycle in which the overflow signal DOVF is received serves as machine cycle #1Mn in which the first operation code is read and is executed in the machine cycle #2Mn.

In addition to the activation of the process, the overflow signal DOVF is used to write the bits D0–D2 for selecting one of the eight phase clocks $\phi 0$–$\phi 7$ into the register 65, and write the bits D3–D5 among the bit phases D0–D7 into the register 66. On the basis of the eight-phase clock selecting data D0–D2 stored in the register 65, the selector 69 selects one of the eight clocks from the clock generating circuit 2. The selected clock is applied to the elastic store circuits 71 and 72. The elastic store circuit 71 is supplied with the carrier-on control signal CARRON from the task timing circuit 27, and is thus controlled by the phase of the selected clock. The elastic store circuit 72 is supplied with the transmit data from the scrambler circuit 57, and is controlled by the phase of the selected clock (step S15).

The bit phase selecting circuit 67 performs the bit-timing control of the parallel-to-serial converter circuit 55, the CRC generating circuit 56 and the scrambler circuit 57 under the control of the register 66. The control data of the carrier level is set to the control register 73 at the timing of the signal DOVF and is output to the modem MODEM (step S16).

In the present embodiment, the switching of the common bus between the CPU 5 and the present transmit/receive device is carried out by the bus switching circuit 4. If the shared RAM 6 is formed of a dual-port RAM, the memory can be shared by using the ports. Hence, the switching control is no longer needed and the bus switching circuit 4 can be omitted. It is also possible to use two RAMs taking into account the fact that the receive part and the transmit part operate independently. It is also possible to use RAMs in order to separately form the definition area for the operation code and initialization and the control channel data area.

Figure 23B:
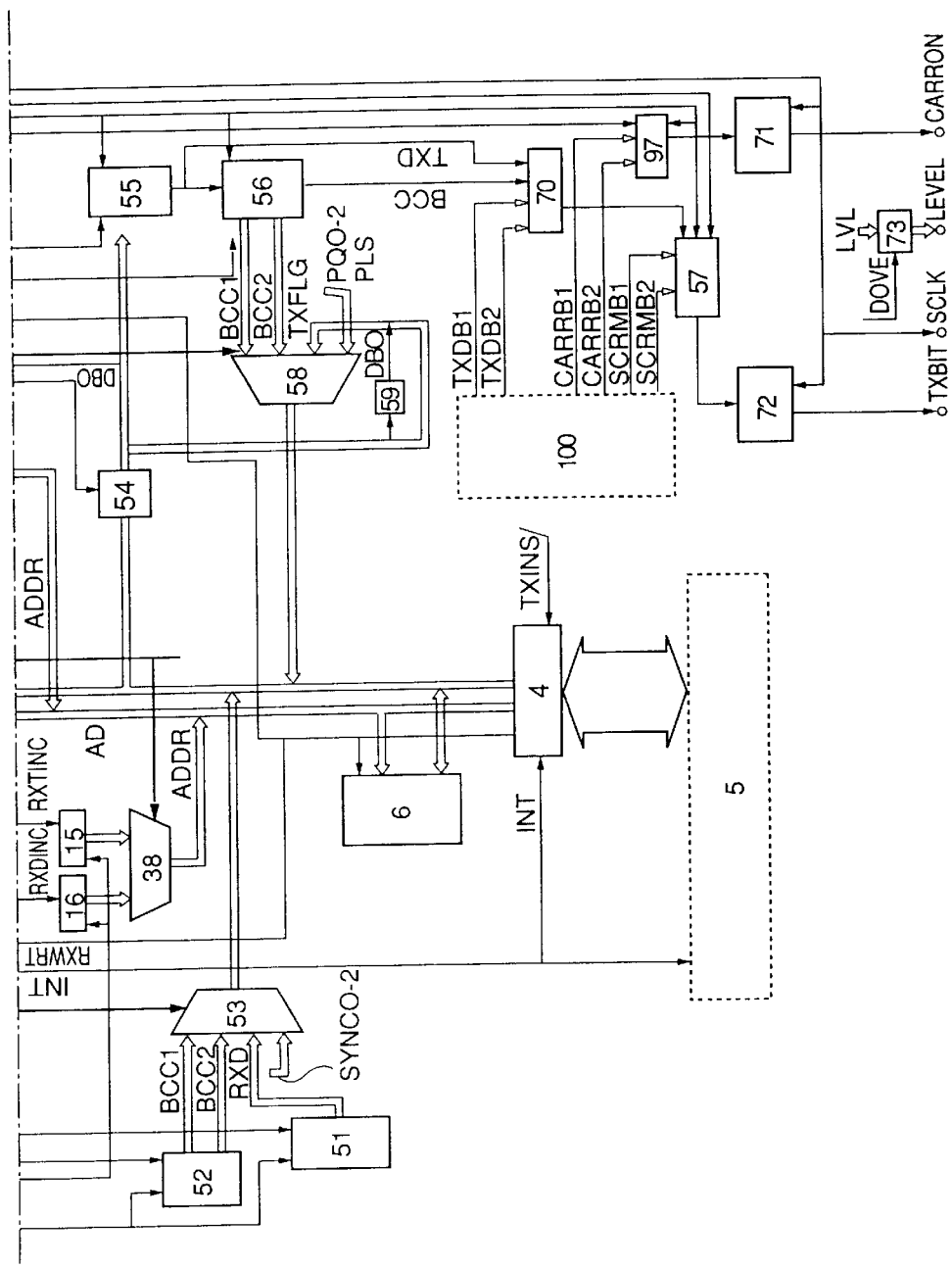
Figure 24:
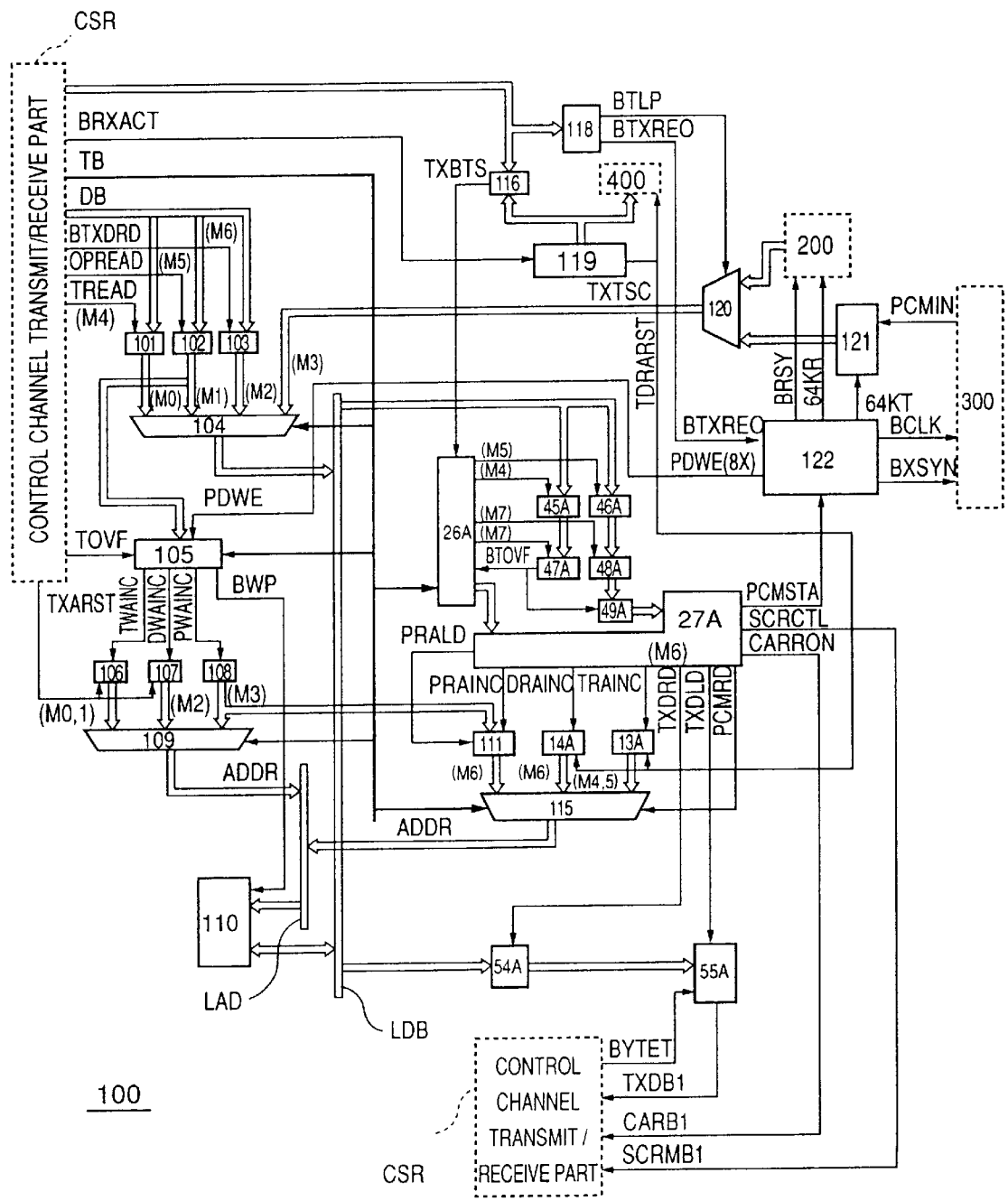
FIG. 24 is a block diagram of a speech-communication channel transmit part.
Figure 25:
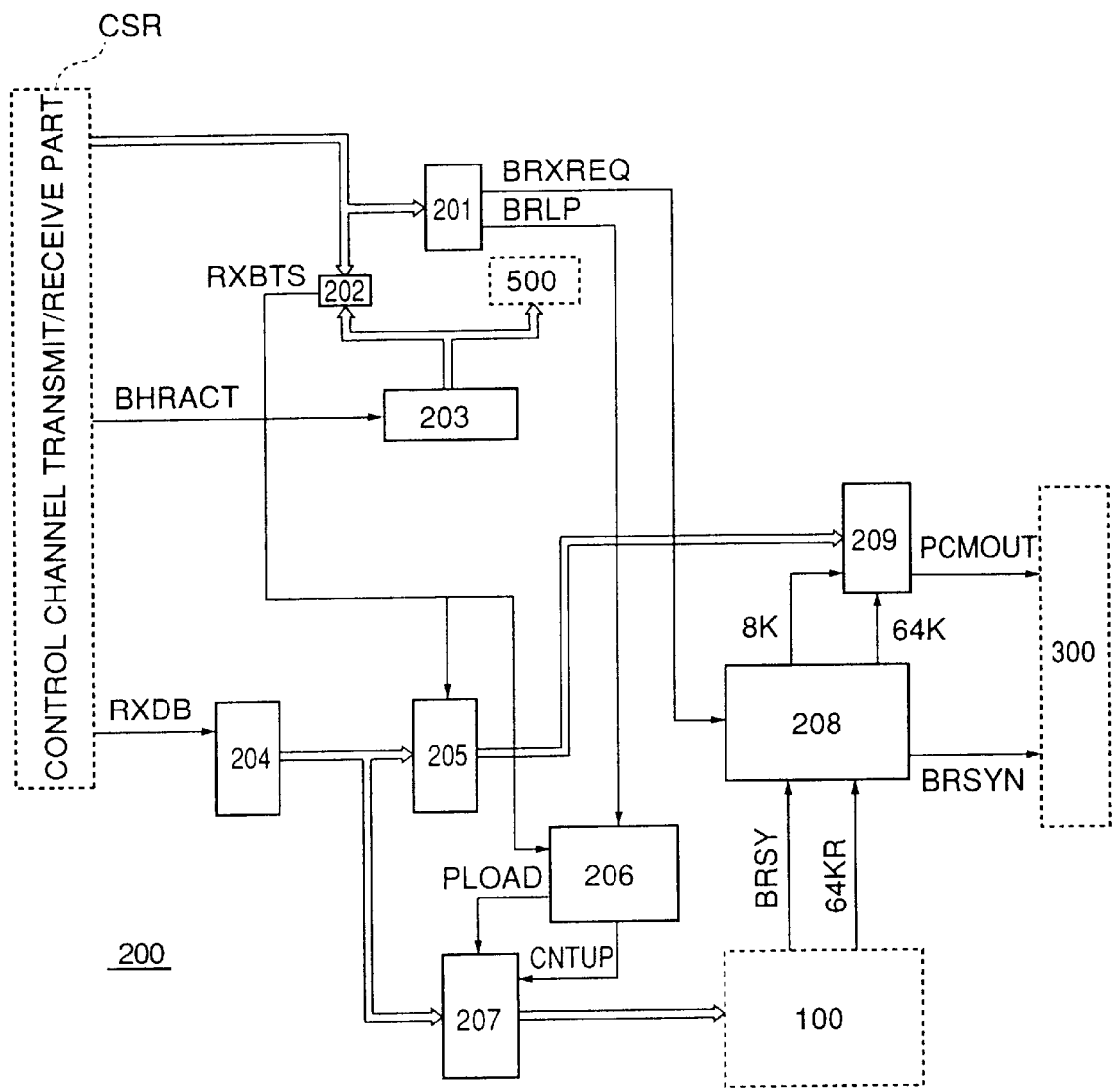
FIG. 25 is a block diagram of a speech-communication channel receive part.

In the present embodiment, data transferred via the speech communication channel (B channel) is processed in the conventional process. FIGS. 23A and 23B show a configuration obtained by adding, to the configuration shown in FIGS. 4A and 4B, two B-channel transmit parts 100 and a B-channel receive part 200 (FIG. 24). The detail of each of the B-channel transmit part 100 is shown in FIG. 24, and the detail of the B0channel receive part 200 is shown in FIG. 25. It will be noted that the configurations shown in FIGS. 24 and 25 relate to only one B channel. In FIGS. 23A, 23B, 24 and 25, parts that are the same as those shown in the previously described figures are given the same reference numbers. As will be described below, the speech communication channel can be controlled independently of the aforementioned control of the control channel data. In FIG. 24, the reference numbers assigned to the respective components are serial numbers starting from 101. In FIG. 25, the reference numbers assigned to the respective components are serial numbers starting from 201. However, the function blocks that are substantially the same as those of the transmit part of the control channel sending and receiving part CSR (reference numbers 13, 14, 26, 27, 45–49, 54 and 55) are assigned suffix A.

Referring to FIG. 24, a temporary byte register 101, a temporary function register 102 and a transmit data read register 103 of the B-channel transmit part 100 are connected to the data bus shown in FIGS. 23A and 23B. Thee registers 101, 102 and 103 are supplied with the signals TREAD and OPREAD from the machine cycle decoder circuit 26 and the signal BTXDRD of the task timing circuit 27. The ouput data of the registers 101–103 are supplied to a transfer data selecting circuit 104.

The transfer data selecting circuit 104 is supplied with output data from the PCM data selector 120 and the unit clocks M0–M2 via the timing bus TB. The output data from the transfer data selecting circuit 104 is applied to a B-channel transmission RAM (BTx-RAM) 110 via the local data bus LDB. The output data from the registers 101 and 102 are applied to the function decoder circuit 105 for transmission. The circuit 105 supplies output signals TWAINC, DWAINC, PWAINC and BWP to an operation code address counter 106, a header address counter 107, a PCM write address counter 108 and the BTx-RAM 110, respectively, in accordance with the signal TOVF and the machine cycle timings.

The counters 106 and 107 are supplied with the signal TXARST from the periodically initializing circuit (transmit part) 12, and supplies output data to a write address multiplexer 109 and the counter 108. The write address multiplexer 109 receives the machine clock from the timing bus TB, and applies address data ADDR to the BTx-RAM 110 via the local address bus LAD.

The B1 channel data in the registers 22 and 23 shown in FIGS. 23A and 23B is applied to a transmit time slot coincidence circuit 116 and an up path setting decoder circuit 118. The transmit time slot coincidence circuit 116 receives a counter value from a transmit time slot counter 119, and applies an output signal TXBTS to a machine cycle decoder circuit 26A. The counter 119 receives an output signal BHXACT from the task timing circuit 27 shown in FIGS. 23A and 23B, and applies its counter value to a transmit part 400 for the B2 channel. Further, an output signal TDRARST is applied to the transmit part 400, and registers 13A and 14A.

Output data PCMIN of a PCM codec 300 is applied to a serial-to-parallel converter circuit 121. Output data of the serial-to-parallel converter circuit 121 is applied to a PCM data selector 120 together with data from the receive part 200 (FIG. 25). The output data of the selector 120 is applied to the selecting circuit 104. The PCM data selector 120 receives a select control signal TBLP from the decoder circuit 118. An output signal of the decoder circuit 118 is applied to a codec interface circuit 122, output signals BCLK and BXSYN of which circuit are applied to the PCM codec 300. An output signal 64KT of the codec interface circuit 122 is applied to the serial-to-parallel circuit 121. Output signals 64KR and BRSY of the codec interface circuit 122 are applied to the B channel receive part 200. Further, an output signal PDWE (8K) of the circuit 122 is applied to the decoder circuit 105.

The registers 13A, 14A, the machine cycle decoder circuit 26A, a task timing circuit 27A, registers 45A–49A, a transmit data buffer register 54A and a parallel-to-serial converter circuit 55A correspond to the aforementioned the transmit part for the control channel data (parts indicated by the reference numbers 13, 14, 26, 27, 45–49, 54 and 55). However, a PCM read address counter 111 is provided and supplied with output data from the register 108, which is also supplied to the write address multiplexer 109. The register 111 is supplied with signals PRALD and PRAINC from the task timing circuit 27A. Data read from the register 111 is applied to an address multiplexer 115 for reading.

The multiplexer 115 receives the machine clock from the timing bus TB and a signal PCMRD from the task timing circuit 27A, and supplies address data ADDR to the BTx-RAM 110.

The B channel receive part 200 shown in FIG. 25 includes path setting decoder circuit 201 and a receive time slot coincidence circuit 202. These circuits receive the B1-channel data from the registers 32 and 33 shown in FIG. 23. A receive time slot counter 203 receives an output signal BHRACT from the receive task timing circuit 37, and supplies its counter value to the coincidence circuit 202 and a receive part 500 for the B2 channel.

An output signal RXDBa from a descramble circuit 50 is received by a serial-to-parallel conversion register 204, and output data read from the register 204 is applied to a buffer register 205 and a received data loop-back circuit 207. The buffer register 205 receives a signal RXTBS from the coincidence circuit 202, and supplies the output data to a parallel-to-serial converter circuit 209. The circuit 209 receives signals 8K and 64K from a codec interface circuit 208 receiving an output signal BRXREQ from the decoder circuit 201, and supplies serial data PCMOUT to the PCM codec 300. The PCM codec 300 is supplied with a signal BRSYN from the interface circuit 208.

The received data loop-back circuit 207 receives a signal BRLP from the decoder circuit 201 and a signal RXBTS from the coincidence circuit 202, and returns output data to the data bus DB shown in FIGS. 23A and 23B in accordance with signals PLOAD and CNTUP from a loop-back control circuit 206.

5. Operation of B Channel Transmit Part 100

The detail of the B channel transmit part 100 shown in FIGS. 23A and 23B is illustrated in FIG. 24. The basic operation of the B channel transmit part 100 is the same as that of the transmit process for the control channel data (step S13 shown in FIG. 5B). Hence, in order to avoid the redundant description, the difference between the B channel transmit part 100 and the transmit process for the control channel data will particularly be described in detail while making the correspondence therebetween.

(1) Storing of Program Information (Operation Code) and Transmit Data

Figure 5B:
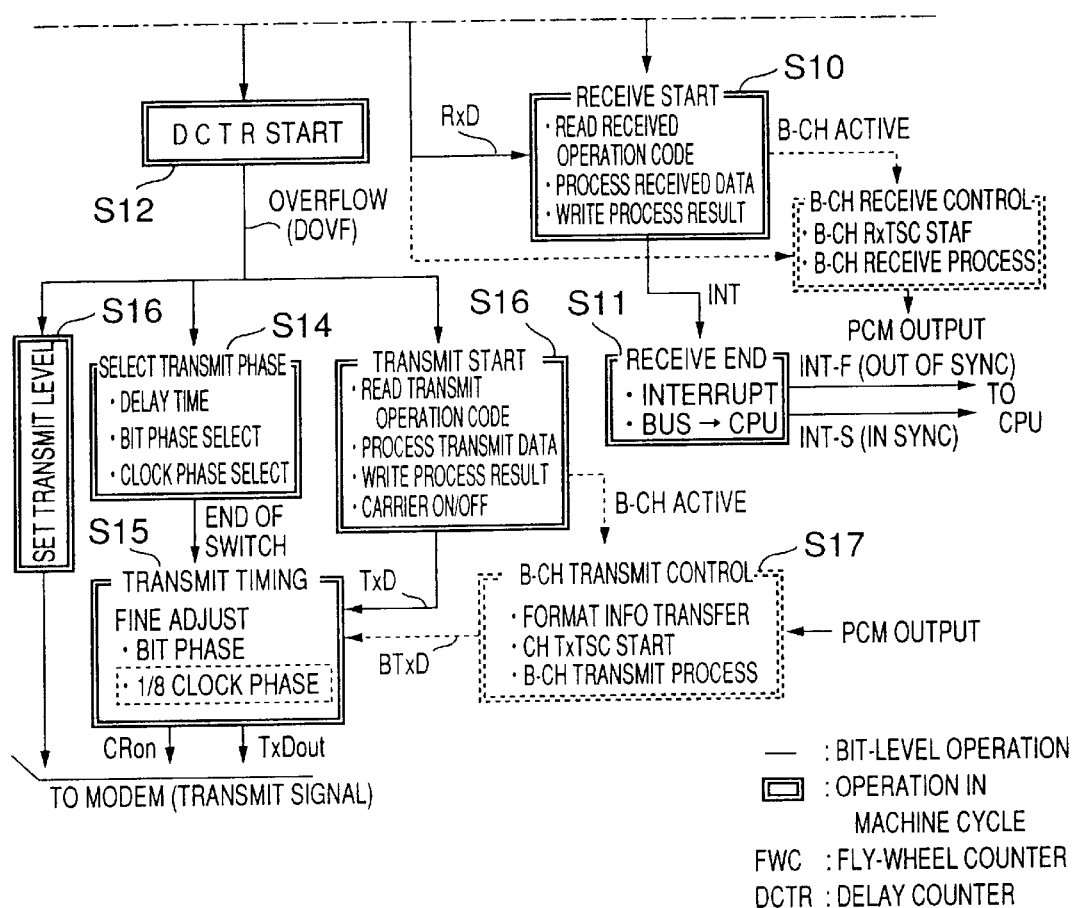

At step S13 shown in FIG. 5B, the transmit process for the control channel data is carried out in accordance with the operation code and the transmit data stored in the shared RAM 6 beforehand by the CPU 5. On the other hand, in the B channel transmit part 100, the operation code and transmit data are read from the shared RAM 110 to the BTx-RAM 110 serving as a RAM for use in receipt of the B channel in a transfer cycle (FIGS. 27A, 27B, 28A and 28B), as indicated as step S17 (broken line) in FIG. 5B. The transfer cycle is executed according to the program information concerning the B channel stored in the shared RAM 6. This will be described later as "background process".

(2) Activating Signal for Transmit Process

The transmit process at step S13 shown in FIG. 5B is activate by the overflow signal of the transmit delay counter 39 shown in FIG. 23. On the other hand, the B channel transmit process is started by the transmit time slot signal TXBTS output by the transmit time slot coincidence circuit 116 (FIG. 24) at step S17. This will be described later as "B-channel transmit activation".

(3) Contents of Transmit Process

The process at step S13 shown in FIG. 5B is directed to reading of transmit data, the CRC control and scramble control, writing of the process result and carrier ON/OFF control. On the other hand, the B channel transmit control carried out at step S17 differs from the above process at step S13 in the following. In the B channel transmit control, the CRC control is not carried out, and speech communication channel data (PCM data) is included in transmit data. The writing of the process result is not carried out. The carrier is turned OFF at the end of the PCM data. More particularly, the carrier OFF control is carried out after reading of a number of bytes of PCM data specified by the operation code.

It may be seen that the transmit process performed at step S17 is different from the transmit process performed at step S13. However, in the case of FIG. 24, the transmit process is carried out via the local data bus LDB and the local address bus LAD. Hence, the read operation on the BTx-RAM 110 can be carried out independently of the bus switching. In addition, the transmit process can be carried out at the same timing as that (M4–M7) assigned to the transmit process at step S13. Hence, the circuit operation of the transmit process at step S17 is similar to that of the transmit process at step S13. This will be described below in detail.

Figure 1:
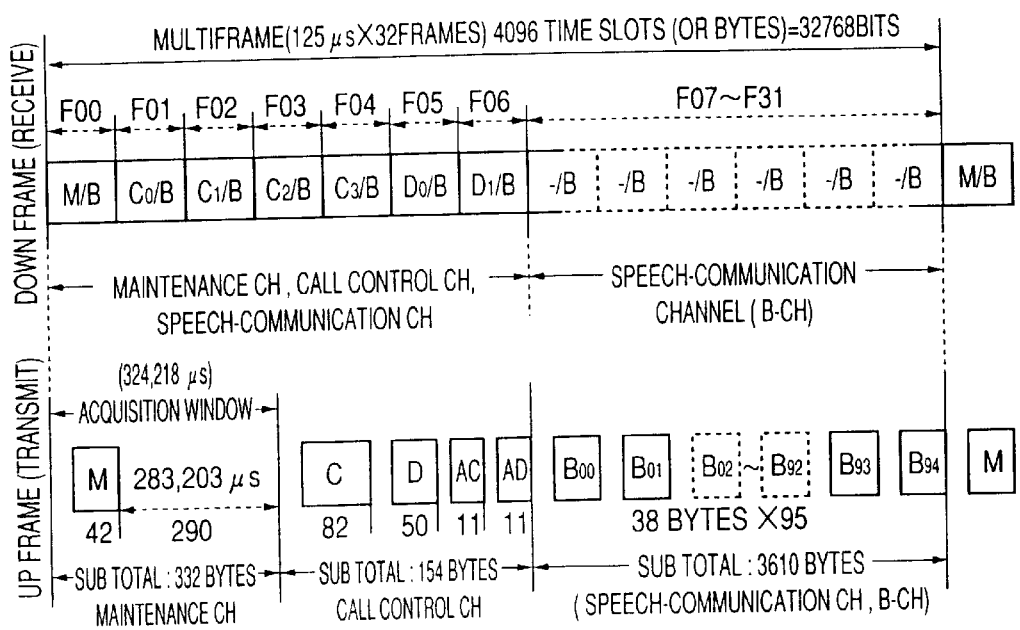
FIG. 1 shows a format used in the prior art and the present invention.
Figure 3:
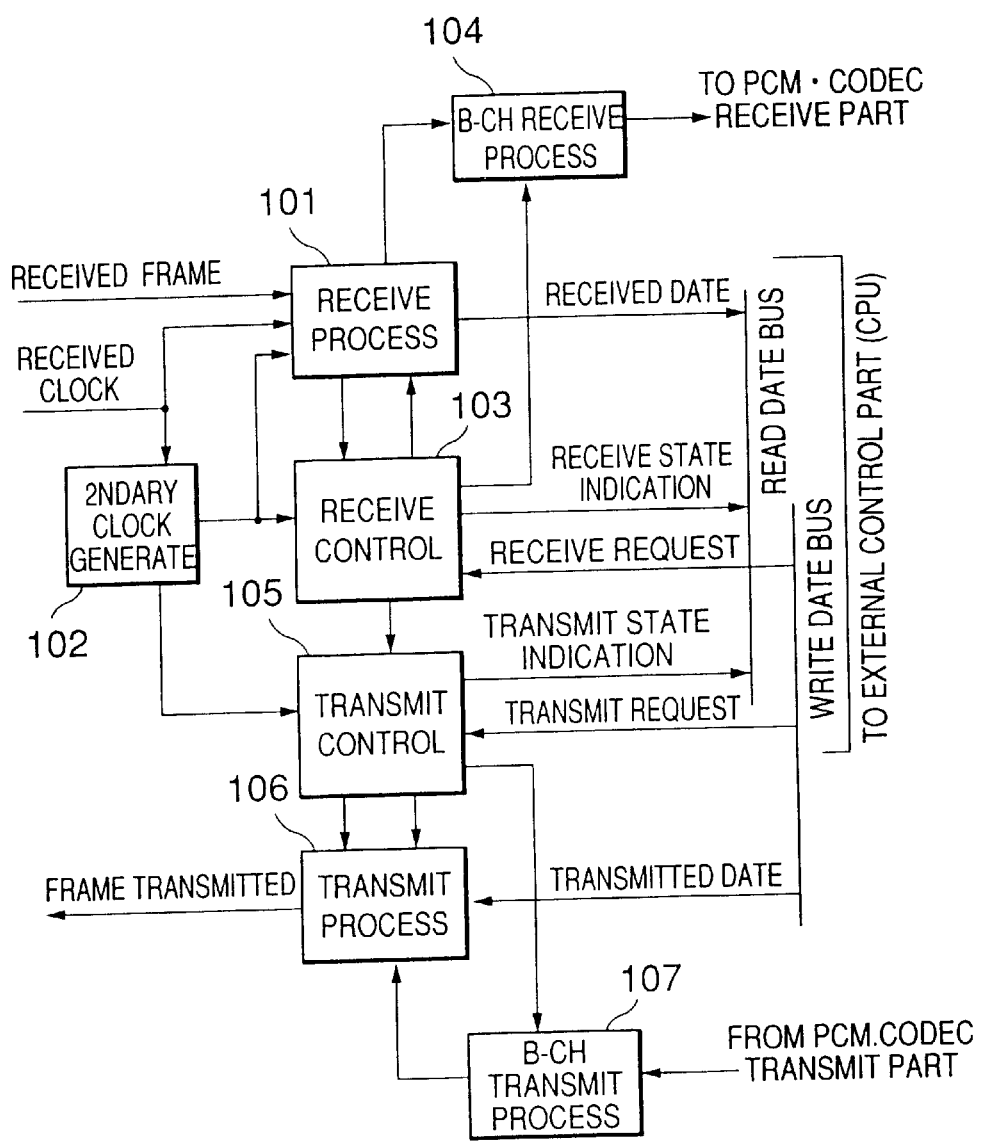
FIG. 3 is a block diagram showing functional blocks in the prior art.

The reason why PCM data can be handled in the same manner as transmit data handled at step S13 is as follows. The guard time GT, the preamble word PW and the unique word UW in the format of B-channel data shown in FIG. 1 correspond to transmit data (header) at step S13. PCM data which is speech data is transmit data inherent in the B channel. However, the writing of PCM data into the BTx-RAM 110 is carried out by using part (M3) of the transfer cycle (M0–M3). Hence, the read process for B-channel transmit data can be handled in the same manner as data written into the shared RAM 6 by the CPU 5 at step S13. As described above, the B-channel transmit data is all transmitted via the BTx-RAM 110.

The operation code for the B channel and transmit data (including PCM data) to be processed by the above operation code are written into the BTx-RAM 110 at the timings of M0–M3 of the machine cycle, and are read at the timings of M4–M7. The operation carried out at the timings of M4–M7 is the same as the aforementioned transmit process (step S13) for the control channel data. The timings of M0–M3 are allotted to the receive process for control channel data, whereas these timings are used to perform the background process in the B channel transmit part 100. That is, the background process is to transfer the operation code and the B-channel transmit data to the BTx-RAM 110 from the shared RAM 6 beforehand to thereby write PCM data externally supplied. This is carried out in the receive process executing phase consisting of the unit cycles M0–M3 of the machine cycle.

As described above, the above two processes differ from each other in the background process and the B channel transmit activating signal. In the following description, as compared to the background process, the B channel transmit process of step S17 executed at the timings of M4–M7 (equivalent to step S13; the process of reading PCM data written into the BTx-RAM 110) is referred to as a foreground process, which is executed in the transmit process executing phase shown in FIGS. 4A and 4B. The foreground process is equivalent to the process of step S13, and the suffix "A" is given, in the following description of the structure shown in FIG. 24, to the reference numbers shown in FIG. 23. Hence, the background process will be described in detail in the following item (4), and the B-channel transmit activation will be described in detail in the following item (5). Further, the foreground process will be described in detail in the following item (6). In the following description, when there is no need to separately consider the difference data GT, PW and UW and PCM data, the data GT, PW and UW is referred to as a header (indicative of the beginning of PCM data) as a whole.

(4) Background Process (Receive Process Executing Phase)

First, a description will be given of a transfer process for the operation code and header (transmit data) in item (4)-1, and a process of writing PCM data in item (4)-2.

(4)-1. Transfer Process for Operation Code and Header

This transfer process is realized so that the task control of the control channel data transmit part (FIG. 24) and the B-channel transmit part 100 cooperate with each other. For the control channel data transmit part, the transfer process is the aforementioned task control itself. That is, the operation code is read and applied to the registers 45 and 46 at the unit cycles #nM4–#nM5 (see FIG. 24), and the header is read in the unit cycles #(n+1)M6.

If the operation code read relates to the B channel (see FIG. 9), the B-channel transmit part 100 receives the header read signal BTXDRD and the B-channel transmit active signal BHXACT from the transmit task timing circuit 27 (see FIG. 23). In response to the signal BTXDRD, the header is written into the transmit data read register 103 of the B-channel transmit part 100 via the data bus DB. The signal BHXACT will be described in item (5).

The B channel transmit part 100 always monitors the operation code for the B channel while reading the operation code of the control channel data transmit part. That is, the B channel transmit part 100 receives the number-of-byte read signal TREAD and the process-content read signal OPREAD from the control channel data transmit part, and writes the B-channel operation code into the temporary byte register 101 and the temporary function register 102 at the timings of #nM4–#nM5.

The transfer function decoder circuit 105 receives the contents of the registers 101 and 102. If the decoder circuit 105 recognizes that the contents of the registers 101 and 102 are the B-channel operation code, it outputs, at the timings of #(n+1)M0–#(n+1)M1 under the condition that the signal TOVF is received, the write signal BWP to write the above operation code into the BTx-RAM 110 while incrementing the address counter 107. If the above operation code indicates a transmission of the header, the circuit 105 outputs the signal BWP at the timings of #(n+1)M2, and writes the contents of the register 103 into the BTx-RAM 110 via the transfer data selecting circuit 104. The writing of the header is repeatedly carried out at the timing of M2 until the above operation code is present (until the signal TOVF is output). The address to be written is specified by the operation code address counter 106 and the header address counter 107 via the write address multiplexer 109.

The write address signal output by the multiplexer 109 will be described in detail.

The multiplexer 109 receives the aforementioned 4 MHz clock signal (Q0), the 2 MHz clock signal (Q1) and the 1 MHz clock signal (Q2) from the timing bus TB, and outputs the following address signal. At the timings of M0 and M1, the address signal consists of seven bits including the four bits of the address counter 106 and the three bits Q0, Q1 and Q2. At the timing of M2, the address signal consists of seven bits including the five bits of the address counter 107 and the two bits Q1 and Q2. At the timing of M3, the five bits of the PCM write address counter 108 and the two bits Q1 and Q2. The address signal thus formed is output to the local address bus LAD.

Figure 26A:
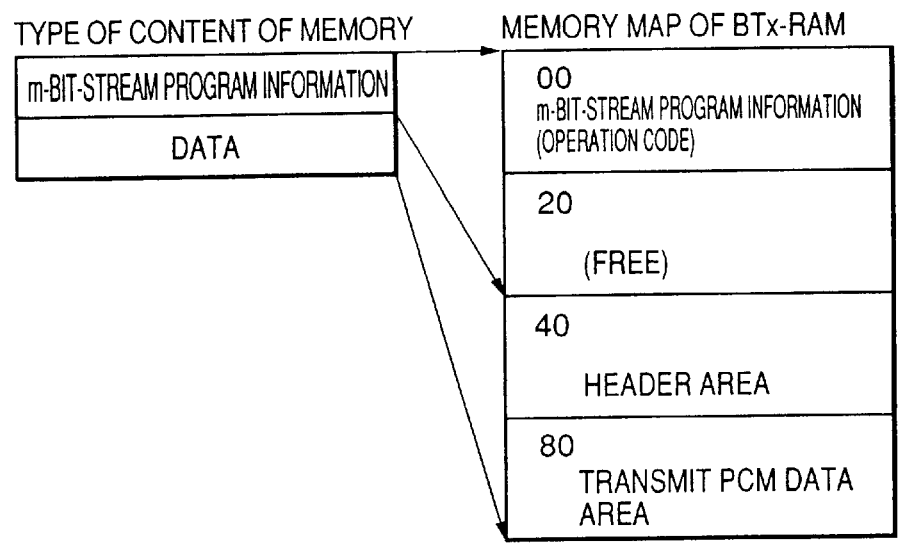
FIG. 26A is a diagram of a memory map of a memory (BTx-RAM) used in the speech-communication channel transmit part.

The clock signals Q1 and Q2 are used as the most significant bits in order to use the BTx-RAM 110 in a divided formation like a memory map shown in FIG. 26A.

The address counters 106 and 107 are reset for every frame by the signal TXARST from the periodically initializing circuit 12 (see FIGS. 23A and 23B) of the control channel data transmit part, and the counter values thereof are incremented by the address increment indication signals TWAINC and DWAINC output by the function decoder circuit 105.

In the above-mentioned manner, the program information (operation code) for the B channel and the transmit data (header) are transferred from the shared RAM 6 to the BTx-RAM110 at the timings of M0–M2 assigned thereto.

(4)-2. Process of Writing PCM Data (Speech Communication Channel Data)

The PCM data transmitted from the subscriber terminal to the switch station is written as follows.

The serial PCM signal PCMIN output from the PCM codec 300 is converted into an eight-bit parallel signal by the serial-to-parallel converter circuit 121, and is written into the BTx-RAM 110 via the PCM data selector 120 and the write data selecting circuit 104. The above write operation is carried out at the timing of M3. The PCM codec 300 receives the 64 kHz bit clock BCLK and the 8 kHz synchronizing signal BXSYN from the codec interface circuit 122, and produces 64 kbps serial PCM signal PCMIN. The PCM codec 300 is a known device and a further description thereof will be omitted.

A further description will now be given of the process of writing PCM data into the BTx-RAM 110. This process is not executed unless the aforementioned foreground process is started. In the following description, the foreground process is already started.

When the foreground process is started and the PCM transmit timing signal PCMSTA (the operation code stored at addresses "238" and "239") is output from the task timing circuit 27A, the codec interface circuit 122 outputs the bit clock BCLK synchronized with the timing of M7 of the machine cycle and the 8 kHz synchronizing signal BXSYN to the PCM codec 300, and outputs a clock signal 64KT of a phase reverse to that of the bit clock BCLK to the serial-to-parallel converter circuit 121.

The PCM codec 300 receives the above signals, and outputs the serial PCM signal PCMIN synchronized with the bit clock BCLK as described above. The serial-to-parallel converter circuit 121 receives the serial PCM signal PCMIN at the reverse-phase clock signal 64KT, and outputs the parallel signal to the PCM data selector 120. The codec interface circuit 122 outputs the PCM data write enable signal PDWE having a pulse width equal to one machine cycle with a period of 8 kHz.

The decoder circuit 105 receives the machine clock (see FIG. 6) from the timing bus TB, and decodes the timing of M3. When the decoder circuit 105 receives the PCM data write enable signal PDWE, it outputs the write signal BWP at the timing of M3, so that the PCM data is written into the BTx-RAM 110. Further, the decoder circuit 105 outputs the address increment indication signal PWAINC to the PCM write address counter 108, so that the address of the transmit PCM data area shown in FIG. 26A is incremented by 1.

In the above-mentioned manner, the PCM data is written, for every one byte, into the transmit PCM data area (FIG. 26A) of the BTx-RAM 110 every 8 kHz (125 $\mu$s frame), by the background process. Then, by the foreground process, the PCM data is read from the BTx-RAM 110 for every 32 bytes (it will be noted that the period of the up transmit frame is 4 ms) (see FIG. 1).

(5) Activation of B Channel Transmit

As has been described in item (4)-1, in the background process, the operation code for the B channel (see FIG. 9) is transferred to an m-bit stream program information area (see FIG. 26A) of the BTx-RAM 110. When the transmit time slot TXBTS is input to the machine cycle decoder circuit 26A, the foreground process is started in accordance with the m-bit-stream program information.

The transmit time slot signal TXBTS is used to define the time slot to be transmitted, and is a timing signal obtained from up speech path setting data (time slot number) set by the periodically initializing operation (step S8) of the control channel data transmit part. When a request for setting the up communication path is received from the switch station via the down D channel (see FIG. 1), the CPU 5 writes the time slot number into addresses "204" and "205" ("206" and "207" for the second line circuit) in binary formation (see FIG. 9). The time slot number is transferred to the registers 22 and 23 shown in FIGS. 23A and 23B (registers 24 and 25 for the second line circuit) by the periodic initialization operation (step S8), and is applied to one of the two inputs of the time slot coincidence circuit 116, as shown in FIG. 24.

The other input of the time slot coincidence circuit 116 is supplied with the 12-bit value of the transmit time slot counter 119. When the counter 119 starts the count operation, the coincidence circuit 116 outputs the transmit time slot signal TXBTS when the counter value becomes equal to the speech communication path setting data. In other words, the time slot number is translated into the time axis (time base).

When the CPU 5 receives the channel number (N=0–94) from the switch station, the CPU 5 calculates N×38+1

(bytes), and converts the calculation result into the time slot number, which is then written into the shared RAM 6. Hence, the transmit time slot signal TXBTS indicates the beginning time slot among the 38 time slots per channel. The value "38" corresponds to the sum of 32 bytes of PCM data and 6 bytes of the header (=2GT+3PW+1UW). The 6 bytes of the header can be specified by the m-bit-stream program information. Hence, if the header consists of four bytes, a value of "36" is used.

The transmit time slot counter 119 is activated by the B-channel transmit active signal BHXACT output by the task timing circuit 27 (see FIGS. 23A and 23B), and is incremented at the timing of M7 of each machine cycle.

In the present embodiment, the increment operation is executed in response to the signal BHXACT so that the counter value changes from "2" to "4095" and then changes from "0" to "1". This is based on the following two reasons. The first reason is as follows. When N=0, the number of the beginning time slot is "1" (=N×38+1), so that it can be distinguished from all-zero data indicative of disconnection of a speech-communication path. The second reason is that there is an internal logic delay.

The up path setting decoder circuit 118 determines whether all the bits of the path setting data are zero. When the path setting data are zero, the decoder circuit 118 sets the transmit request signal BTXREQ to logic "0", and maintains the codec interface circuit 122 in the disabled state. On the other hand, when the path setting data indicates a value other than zero, the decoder circuit 118 sets the transmit request signal BTXREQ to logic "1", and switches the codec interface circuit 122 to the enabled state. Further, the path setting decoder circuit 118 makes a decision as to whether the path setting data indicates a B-channel loop-back mode in which the down B channel is looped back to the up B channel. The most significant bit D15 of the path setting data consisting of two bytes is assigned to the B-channel loop back. When the bit D15 is logic "1", the loop-back indication signal BTLP is output to the PCM data selector 120, which outputs the PCM data from the B-channel receive part 200 in response to the signal BTLP.

As described above, the activation of the B-channel transmit is carried out by writing the path setting data into the registers 22 and 23 shown in FIGS. 23A and 23B (registers 24 and 25 for the second line circuit) in the periodic initialization operation (step S8) and applying the transmit time slot signal TXBTS to the machine cycle decoder circuit 26A at the given time slot position. This operation is repeatedly carried out for every 4 ms frame as long as the path setting data exits.

The output of the transmit time slot counter 119 is supplied to the B-channel transmit part 400 for the second line circuit. The register 54A and the parallel-to-serial converter circuit 55A are the same as the register 54 and the parallel-to-serial converter circuit 55, and a description thereof will be omitted here.

(6) Foreground Process (Transmit Process Executing Phase)

The operation of the foreground process after the B-channel transmit is activated is substantially the same as the process carried out at step S13 shown in FIG. 5B except that the foreground process includes a particular PCM read process. A description will now be given of a method of specifying the address in the PCM read process.

A PCM read address counter 111 continuously starts the count operation from the value of the PCM write address counter 108 by a parallel set signal PRALD which is output at the timing of M4 (#nM4) of the machine cycle in which the PCM transmit timing signal PCMSTA is output. This means that the reading is started (at the timing of M6) from the address (the oldest PCM data among the 32 bytes) to be written at the timing of M3 (#(n+1)M3) of the next machine cycle. In this way, the 125 μs period write operation and the 4 ms read operation can be sequentially carried out.

The address multiplexer 115 for the read operation receives the machine clocks Q0, Q1 and Q2 from the timing bus TB and the PCM data read signal PCMRD from the task timing circuit 27A, and produces the following address signal. At the timings of M4 and M5 of the machine cycle, the address signal consists of 7 bits including the four bits of the address counter 13A and the three bits Q0, Q1 and Q2. At the timing of M6 at which the header is to be read, the address signal consists of 7 bits including the five bits of the address counter 14A and the two bits Q1 and Q2. At the timing of M6 at which the PCM data is to be read, the address signal consists of 7 bits including the five bits of the PCM read address counter 111 and the two bits Q1 and Q2. The address signal thus produced is output to the local address bus LAD.

The machine clocks Q1 and Q2 are used as the most significant bits in order to use the BTx-RAM 110 in a divided formation like a memory map shown in FIG. 26A.

The counters 13A and 14A are reset, every 4 ms, by the address reset signal TDRARST which is output when the time slot counter 119 overflows. The increment operations of the counters 13A and 14A are carried out by the address increment indication signal TRAINC from the task timing circuit 27A.

6. Operation of B-channel Receive Part 200

In the embodiment of the B-channel receive part 200 shown in FIG. 25, the down frame format is a single frame structure is employed in which one byte of PCM data is received every 125 μs, as shown in FIG. 2. The operation of the B-channel receive part 200 will now be described with reference to FIG. 25.

When a down speech path setting request is received from the switch station via the down D-channel, the CPU 5 writes the time slot number into address "005" of the shared RAM 6 (address "007" for the second line circuit) in the binary formation (see FIG. 8). Since the PCM receive frame is the single frame structure (consisting of 128 time slots) as described before, the time slot specifying data can consist of 7 bits. Pieces of data at addresses "004" and "006" shown in FIG. 8 are neglected, as indicated by XX (in hexadecimal notation).

The time slot number is read and written into the register 33 (register 35 for the second line circuit) shown in FIGS. 23A and 23B in the periodic initialization operation (step S4). Then, the time slot number is applied to one of the two inputs of the receive time slot coincidence circuit 202 (FIG. 25). The other input of the receive time slot coincidence circuit 202 is supplied with the 7-bit value of the receive time slot counter 203. After the counter 203 starts the count operation, the receive time slot signal RXGBTS is output from the time slot coincidence circuit 202 when the counter value coincides with the speech path setting data.

When the channel number N (N=0–94) is received from the switch station, the CPU 5 calculates an equation N+1, and converts the calculation result into the time slot number, which is then written into the shared RAM 6. The receive time slot counter 203 is activated by B-channel receive active signal BHRACT output by the task timing circuit 37 (see FIGS. 23A and 23B), and the counter value thereof is incremented at the timing of M7 of each machine cycle. Hence, the time slot number is translated into the receive time slot number RXBTS of the one-machine length on the time axis with respect to the timing at which the operation code of "5F" and "42" (B-CH ACT) (addresses "010" and "011" shown in FIG. 8).

The serial PCM receive data RXDB always passes through the serial-to-parallel conversion register 204. The eight-bit data for each time slot is synchronized with the phase of the machine cycle, as has been described previously. The buffer register 205 latches the time slot signal RXBTS at the timing of M7 of the machine cycle.

The above latch operation is repeatedly carried out every 125 μs as long as the path setting data exits because the time slot counter 203 has the fly-wheel function which enables the counter 203 to continue to perform the 125 μs-period count operation, once activated, even if the receive active signal BHRACT is not received. Hence, the received PCM data in the buffer register 205 is updated every 125 μs (8 kHz).

The codec interface circuit 208 receives the 8 kHz synchronizing signal BRSY and the 64 kHz bit synchronizing signal 64KR from the B-channel transmit part 100, and outputs the receive synchronizing signal BRSYN to the PCM codec 300. Further, the codec interface circuit 208 sends the frame synchronizing signal 8K and the bit synchronizing signal 64K to the parallel-to-serial converter circuit 209. The parallel-to-serial converter circuit 209 converts the 8-bit parallel PCM data into 64 kbps serial PCM data by using the synchronizing signals 8K and 64KR. The 64 kbps serial PCM data is then sent to the PCM codec 300.

In the present embodiment, the increment operation is executed in response to the signal BHXACT so that the counter value changes from "2" to "127" and then changes from "0" to "1". This is based on the following two reasons. The first reason is as follows. When N=0, the number of the beginning time slot is "1" (=N+1), so that it can be distinguished from all-zero data indicative of disconnection of a speech-communication path. The second reason is that there is an internal logic delay.

The down path setting decoder circuit 201 determines whether all the bits of the path setting data are zero. When the path setting data are zero, the decoder circuit 201 sets the receive request signal BRXREQ to logic "0", and maintains the codec interface circuit 208 in the disabled state. On the other hand, when the path setting data indicates a value other than zero, the decoder circuit 201 sets the transmit request signal BRXREQ to logic "1", and switches the codec interface circuit 208 to the enabled state. Further, the path setting decoder circuit 201 makes a decision as to whether the path setting data indicates a B-channel loop-back mode in which the down B channel is looped back to the up B channel. The most significant bit D7 of the path setting data consisting of one byte is assigned to the B-channel loop back. When the bit D7 is logic "1", the loop-back indication signal BRLP is output to the loop-back control circuit 206, which controls the receive data loop-back circuit 207 in accordance with the signal BRLp.

The loop-back circuit 207 is formed of an eight-bit binary counter in which data can be set in parallel, and normally functions as a buffer register in parallel-set/parallel out formation.

As described above, the activation of the B-channel receive is carried out by writing the down path setting data into the registers 32 and 33 shown in FIGS. 23A and 23B (registers 34 and 35 for the second line circuit) in the periodic initialization operation (step S4) and latching the PCM data of the given time slot by the receive time slot signal RXBTS. Then, the latched PCM data is converted into 64 kbps serial data. This operation is repeatedly carried out for every 125 μs frame as long as the path setting data exits. The output signal of the receive time slot counter 203 is applied to the B-channel receive part 500 for the second line circuit.

The above description of the operation of the B-channel receive part 200 corresponds to the single frame structure in which one byte of PCM data is received every 125 μs. In an alternative, it is possible to configure a programmable B-channel receive part on the basis of the same concept as that of the B-channel transmit part 100.

FIGS. 29A, 29B, 30A and 30B show an allocation of the machine cycle for access to the B-channel receive memory to be used in the alternative and an example of the process of the alternative.

Figure 26B:
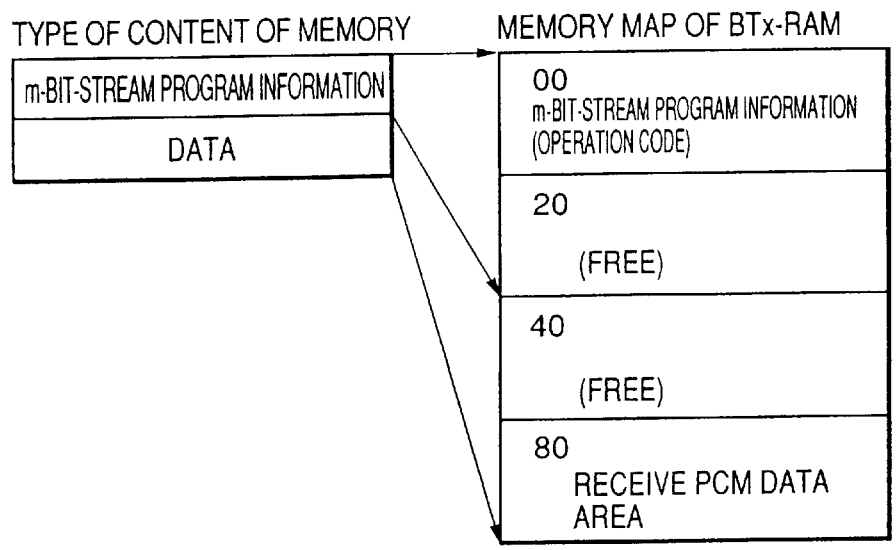
FIG. 26B is a diagram of a memory map of a memory (BRx-RAM) used in the speech-communication channel receive part.

At the timings of M4–M7 (which forms a transmit process executing phase), the operation code for receive is transferred from the shared RAM 6 to the BRx-RAM (see FIG. 26B). Further, the received PCM data is read and sent to the subscriber terminal (the background process). At the timings of M0–M3 (which forms a receive process executing phase), the received PCM data is written into the BRx-RAM in accordance with the operation code for receive (the foreground process).

As described above, it is easily possible to realize the programmable transfer process for program information, the programmable foreground process and programmable background process on the basis of the aforementioned principle of the operation.

7. Test Functions

There are two test functions, one of which is a local loop-back test function, and the other is a remote loop-back test function in which the line circuit is looped back in a remote switch station. The local loop-back function is provided in order to realize a self-test function. In this function, a frame transmitted by the transmit part is received by the receive part of the same device and is then checked. The remote loop-back test is used to perform a test including a transmission line in the switch station. In the remote loop-back test, the down B channel is looped back to the up B channel. Hereinafter, the local loop-back is simply referred to as a loop back (which will be described in the following item (1)), and the remote loop back is referred to as a B-channel loop back (which will be described in the following item (2)).

(1) Loop-back Test Function

In order to realize the loop-back test, the transmit and receive parts are equipped with operation modes shown in FIG. 31. The operation modes can be set by using the periodic initialization areas shown in FIGS. 8 and 9. The loop-back test is carried out so that the transmit mode is set as a master mode and the receive mode is set as a loop-back mode.

In the master mode, the control channel transmit part performs a self-supporting transmit operation irrespective of the synchronized state of the received frame. In order to perform the self-supporting transmit operation, a transmit frame counter 99 is provided as shown in FIGS. 23A and 23B. The periodic initialization in the transmit part is activated by an overflow signal TFOVF from the transmit frame counter 99 (see FIG. 32).

The transmit frame counter 99 starts the operation from the cleared state in response to the first periodic initialization activating signal TFRUN for transmission after power on. The counter 99 continuously outputs the overflow signal TFOVF for every 4 ms frame. The periodic initialization operation after activated has been described previously.

In the loop-back mode, the control channel receive part receives the transmitted frame. As shown in FIGS. 23A and 23B, an input signal selecting circuit 98 is provided. When the circuit 98 receives a loop-back indication signal N/LP from the register 28, it switches from the receive clock RCLK and received bit stream RXBIT to the transmit clock SCLK and transmitted bit stream TXBIT.

Various tests directed to determining whether the various functions operate normally can be carried out by arbitrarily specifying transmit conditions (register 18) and receive conditions (register 28) as shown in FIG. 31. Examples of the transmit conditions relate to burst frames/consecutive frames and scrambler validation/invalidation, which can independently be specified. Examples of the receive conditions relate to multiframe pattern inversion/non-inversion and descrambler validation/invalidation, which can independently be specified.

As has been described previously, it is possible to set the initial pattern for scrambling in the register 19, the initial pattern for descrambling in the register 29, and the multiframe pattern in the registers 30 and 31. These registers can be used to perform the tests.

Figure 33A:
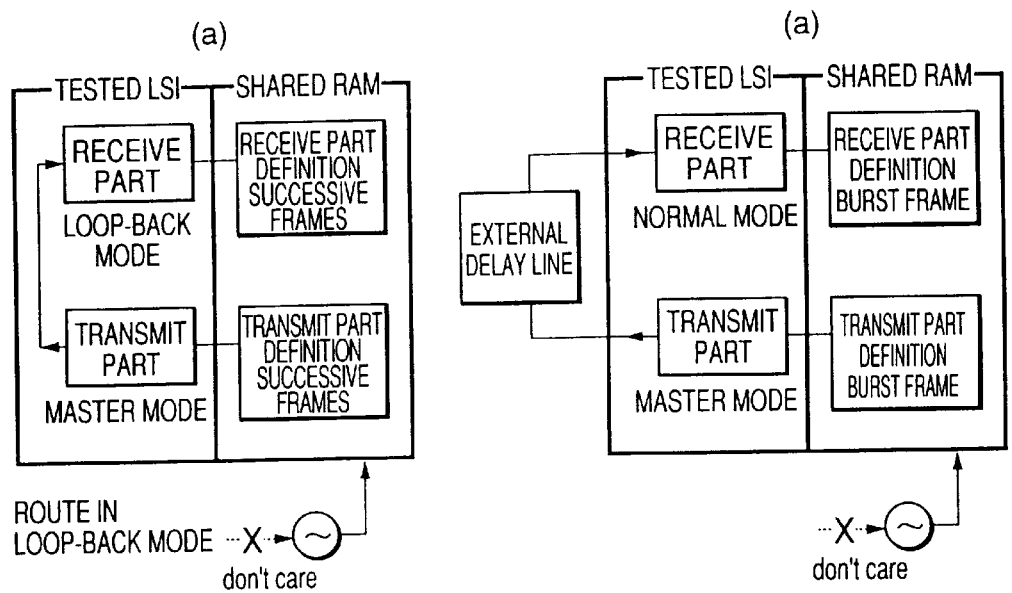
FIG. 33A shows examples of applications of the master mode.
Figure 33B:
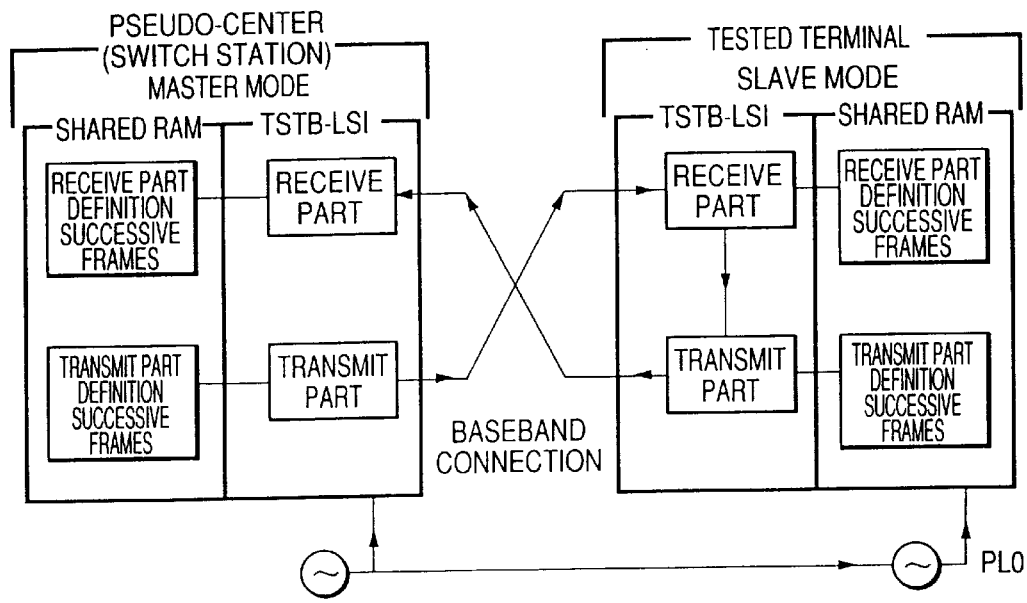
FIG. 33B shows another example of applications of the master mode.

FIGS. 33A and 33B show examples of the texts which can be carried out in the master mode. FIG. 33A shows tests in which an LSI is tested alone. Part (a) of FIG. 33A shows a test in which a loop is formed so that a signal from the shared RAM returns thereto via the transmit and receive parts of an LSI to be tested (a testee LSI). Part (b) thereof shows a test in which a loop formed of a delay line or the like is provided to connect the transmit part of a testee LSI to the receive part thereof. FIG. 33B shows a test in which a subscriber terminal equipped with an LSI is tested alone. More particularly, a loop is formed so that a signal from the transmit part of a pseudo switch station (center station) passes through the receive and transmit parts of an LSI of the subscriber terminal, and returns to the receive part of the LSI of the pseudo-switch station.

Figure 34:
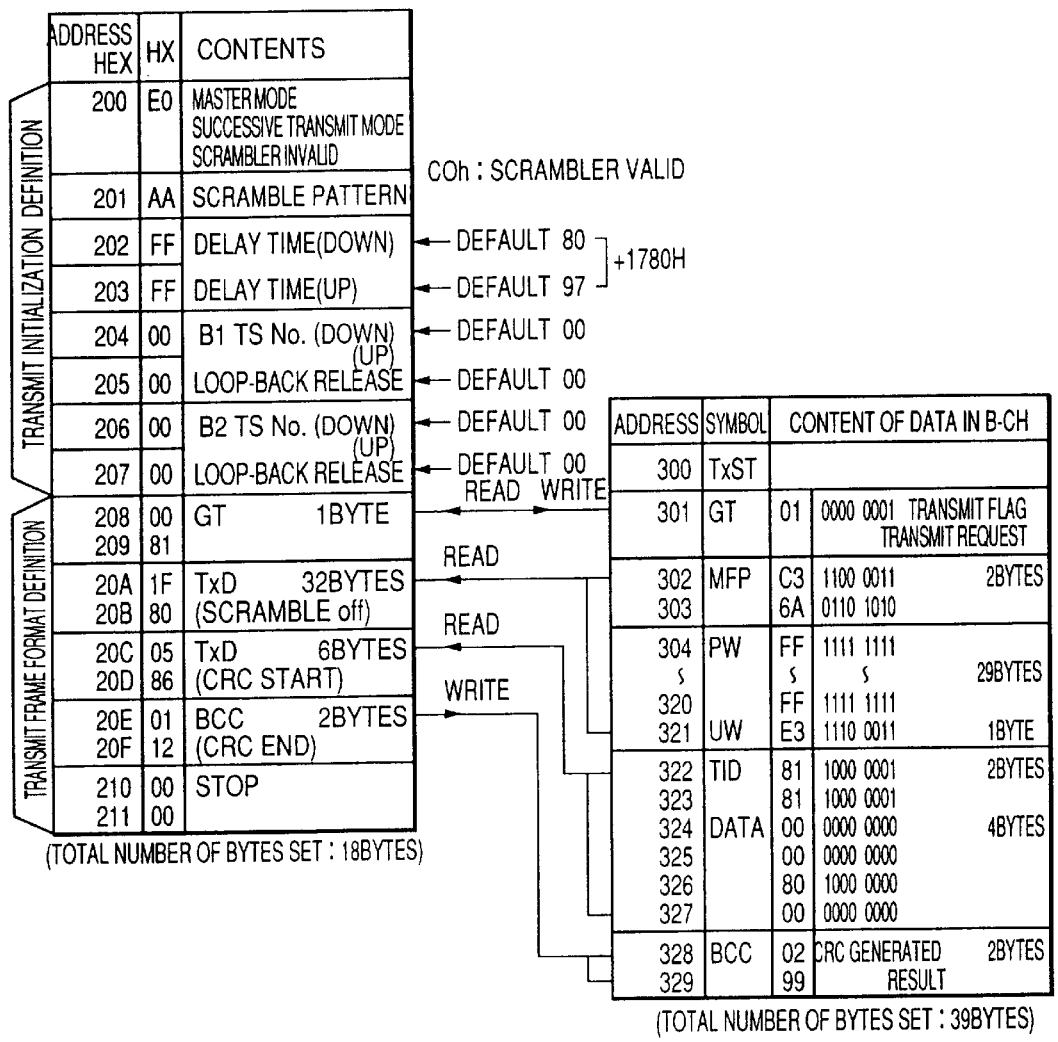
FIG. 34 is a diagram of a program for the transmit part equipped with a self-testing function in the master mode.
Figure 35:
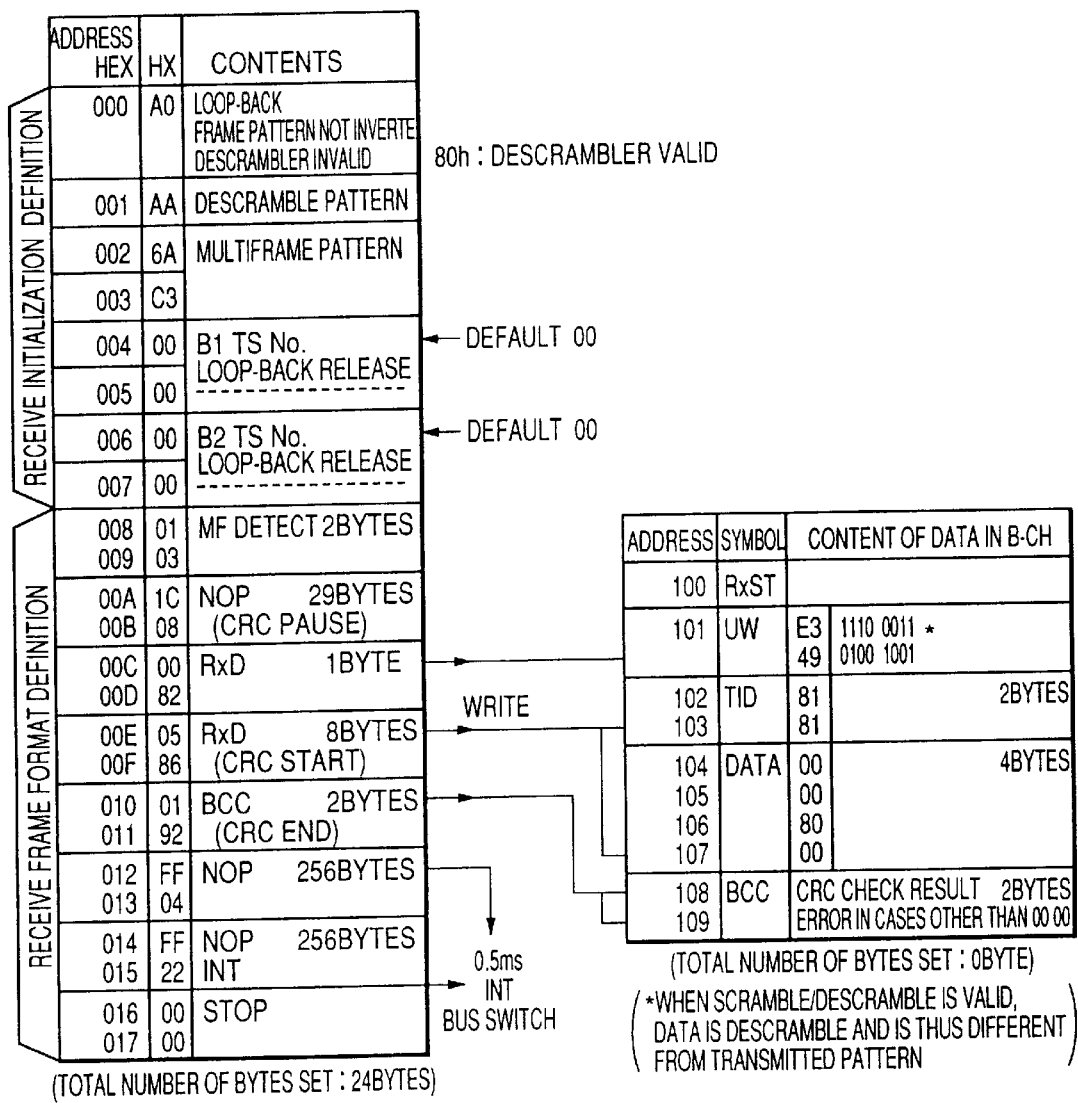
FIG. 35 is a diagram of a program for the receive part equipped with the self-testing function in the master mode.

FIGS. 34 and 35 respectively show programs for carrying out the tests shown in FIGS. 33A and 33B. In the programs shown in FIGS. 34 and 35, in the successive frame mode, transmitted are the multiframe pattern MFP (two bytes), preamble word PW (29 bytes), unique word UW (one byte), terminal identifier TID (two bytes), data DATA (four bytes) and block check character BCC (two bytes). The CPU 5 checks the frame synchronization protection function and data received in the receive data area of the shared RAM 6.

(2) B-channel Loop-back Test Function

The B-channel loop-back is originally used to perform the test in the switch station, as has been described previously. In the present embodiment, the programmable structure is positively utilized and is combined with the loop-back mode so that the self-testing function of testing the B channel can be performed.

First, a description will be given of a simple loop-back operation on the B channel only. The CPU 5 sets a path for folding the down B channel to the up B channel (when a corresponding instruction from the switch station is received). At this time, the CPU 5 sets the most significant bit of the path setting data to logic "1". Thus, the decoder circuits 201 and 118 (see FIG. 24) sends the B-channel loop-back indication signals BRLP and BTLP to the loop-back control circuit 206 (FIG. 25) and the PCM data selector 120 (FIG. 24), respectively. Thereby, the down B channel is looped back to the up B channel. The switch station transmits a test signal to the subscriber terminal, and compares a returned signal with the transmitted signal. Hence, it is possible to perform the test including the transmission line.

Figure 36:
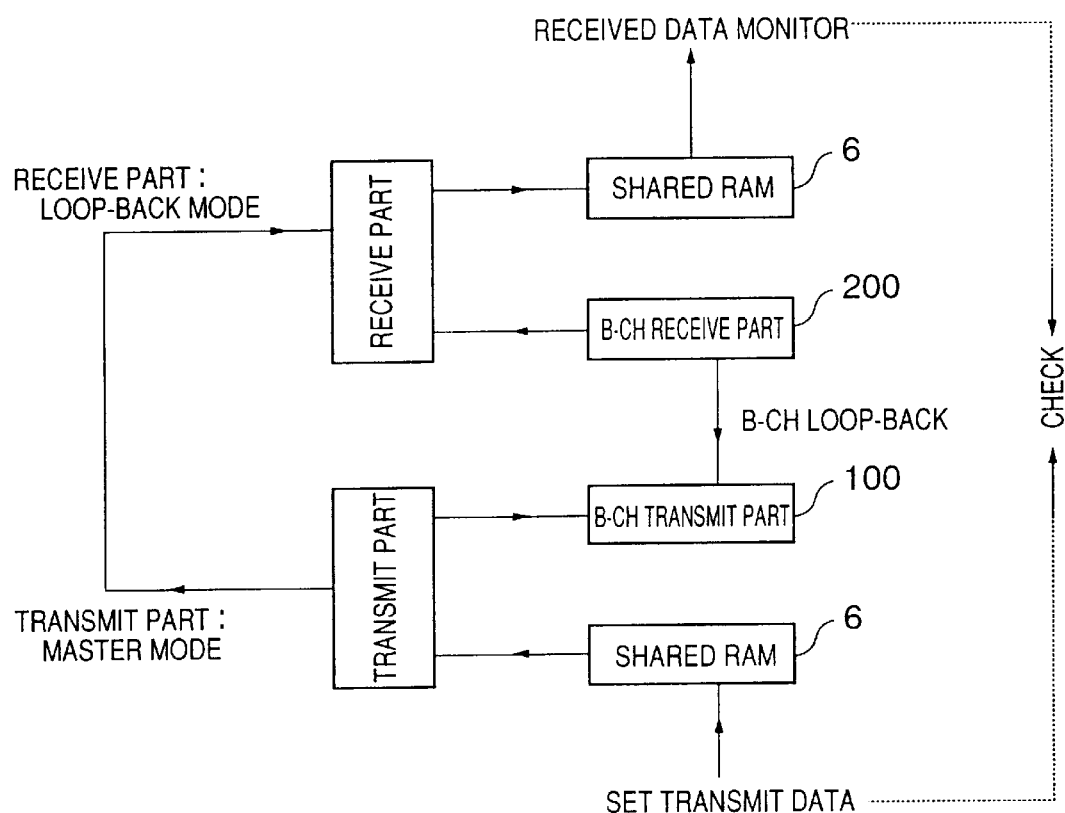
FIG. 36 is a block diagram of a self-testing structure in which a local loop-back operation and a speech-communication channel loop-back operation are combined together.

The self-testing function consisting of the B-channel loop-back operation and the loop-back operation can be called a double loop-back test. That is, as shown in FIG. 36, data to be transmitted is set in the shared RAM 6, and is then transmitted as data in the control channel. The transmitted data is input to the receive part by the loop-back function. The receive part receives the transmitted data and folds it to the B-channel transmit part (B-channel loop-back).

The B-channel transmit part transmits the data received from the B-channel receive part, so that the data is looped back again. The receive part receives the above data at the control channel receive part, the received data being then written into the shared RAM 6 and checked.

By the double loop-back test, the CPU 5 can indirectly access the BTx-RAM 110, which cannot originally be accessed by the CPU 5.

Figure 37:
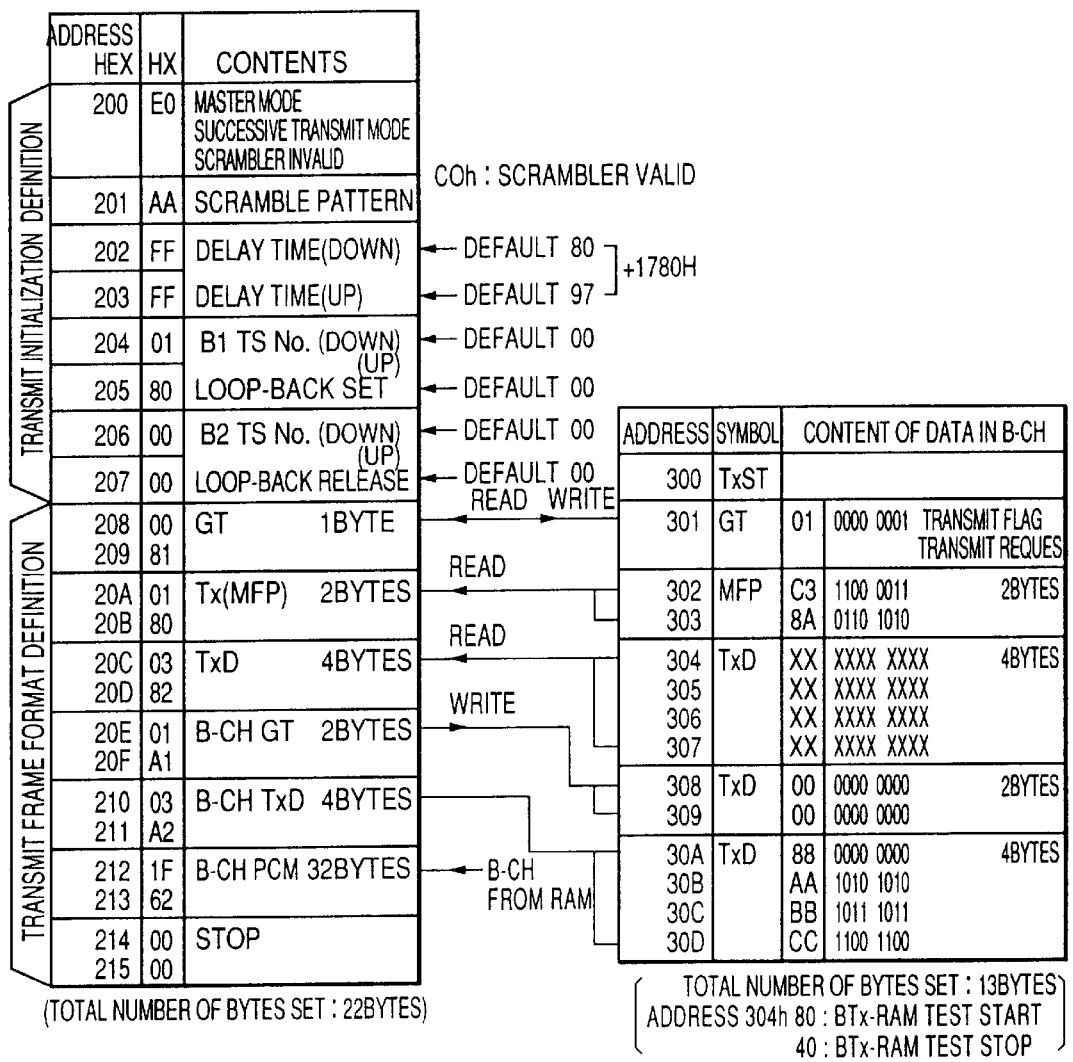
FIG. 37 is a diagram of a program for the transmit part in which a double loop-back self-testing function can be realized.
Figure 38:
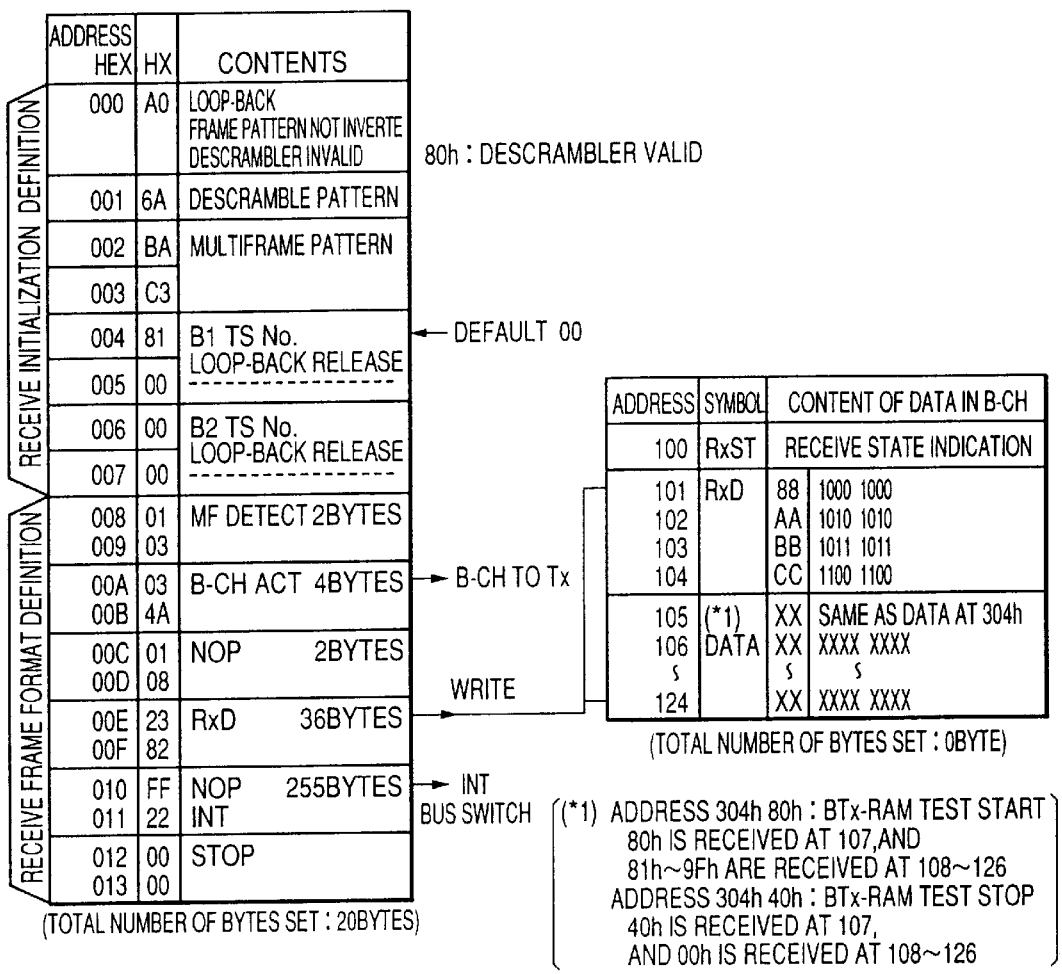
FIG. 38 is a diagram of a program for the receive part in which the double loop-back self-testing function can be realized.

FIGS. 37 and 38 show programs which realize the double loop-back function. A command (80 h) is set in address "304h" of the shared RAM 6, and a test of the BTx-RAM is started. The loop-back part automatically writes the counter value starting from "80 h" into the BTx-RAM 110. The starting command can be one of 8Xh–FXh. The counter starts from the command value as the initial value. At address "107", command 80 h is received, and at addresses "108–126" 81 h–9 Fh are received. The test ends with a command 40 h, which is received at address "107". A command 00h is received.

Conventionally, when the up and down frame formats are asymmetrically different from each other, the self-text cannot be realized by simply connecting the output of the transmit part to the input of the receive part. In the prior art, a particular circuit is required to modify one of the frame formats so as to match the other. Alternatively, a test apparatus is externally connected to modify one of the frame formats. On the other hand, the present invention employs the programmable structure, which can avoid the conventional requirements and can easily realize the self-test function.

The present invention is not limited to the specifically disclosed embodiments, and variations and modifications may be made without departing from the scope of the present invention.

What is claimed is:

1. A method of transmitting and receiving a frame including unique pattern information indicative of a starting point of digital information, said method comprising the steps of:

(a) performing a receive synchronizing process in which the frame is pulled in a given phase of a machine cycle equal to m which is equal to (1/N)×L where L denotes the number of bits forming the frame, N is a positive integer and m is a positive integer larger than 2;

(b) performing, in a receive process executing phase forming part of a same machine cycle as that of the step (a), a receive process in which receive control channel data contained in a received frame is written into a shared memory in accordance with first m-bit stream program information which defines the receive process and is stored in the shared memory; and (c) performing, in a transmit process executing phase forming another part of the same machine cycle, a transmit process in accordance with second m-bit stream program information which defines a transmit procedure and is stored in the shared memory while reading transmit control channel data stored in the shared memory, whereby the transmit control channel data is transmitted in a phase of a bit level or a clock level;

(d) correcting a delay time of control channel data received under a situation in which there is a time difference between a detection of the pattern information carried out in the receive synchronizing process and a write timing of the shared memory; and (e) correcting a delay time of data to be transmitted under a situation in which there is a time difference between a read timing of the shared memory and a given transmit frame starting timing externally supplied.

2. The method as claimed in claim 1, further comprising the step of controlling a phase of a transmitted frame with respect to a phase of a received frame so that the phase of the transmitted frame is controlled at a machine cycle level in advance of the phase of the received frame by a maximum delay control time and is then controlled at bit level or the clock level after the control of the phase of the transmitted frame is completed at the machine cycle level.

3. A device for transmitting and receiving a frame including unique pattern information indicative of a starting point of digital information, said device comprising:

a machine clock generating circuit generating a machine clock having a machine cycle equal to a length of m bits where m is larger than 2 and equal to $(1/N) \times L$ where L denotes the number of bits forming the frame and N is a positive integer;

a receive synchronizing circuit which pulls the frame in a given phase of the machine cycle;

a shared memory in which first and second m-bit stream program information respectively define a receive procedure and a transmit procedure, and transmit control channel data are stored beforehand;

a transmit/receive process part which performs, in a receive process executing phase forming part of a same machine cycle as that processed by the receive synchronizing circuit, a receive process in which receive control channel data contained in a received frame is written into the shared memory in accordance with the first m-bit stream memory information, and which performs, in a transmit process executing phase forming another part of the same machine cycle, a transmit process in accordance with a second m-bit stream program information while reading the transmit control channel data stored in the shared memory; and a transmit phase control circuit which transmits the transmit control channel data in a phase of a bit level or a clock level;

a pattern information detecting circuit which detects the pattern information in the phase of the bit level;

a receive frame synchronization protecting circuit which stabilizes a pattern information detecting operation of said pattern information detecting circuit;

a received frame length counter which performs a count operation in the phase of the machine cycle;

a pattern information synchronizing circuit which synchronizes a pattern information detecting signal output by the pattern information detecting circuit with the phase of the machine cycle level whereby another pattern information detecting signal is synchronized with the machine cycle; and a phase level converting circuit which converts a pattern information hunting signal having the phase of the machine cycle level into another pattern information hunting signal having the phase of the bit level, and wherein:

the received frame length counter starts the count operation in response to the pattern information detection signal having the phase of the machine cycle level, and generates the pattern information hunting signal having the phase of the machine cycle level immediately before one frame is counted by the received frame length counter;

the received frame synchronization protecting circuit protects the received frame synchronization by the another pattern information detection signal having the phase of the bit level from the pattern information detecting circuit and the pattern information hunting signal having the phase of the bit level;

the transmit phase control circuit includes a transmit delay control circuit which controls a phase of a transmitted frame with respect to the phase of the received frame; and the received frame length counter activates the transmit delay control circuit by the received frame length counter so that the transmit delay control circuit is activated in advance of the phase of the received frame by a maximum delay control time;

the transmit delay control circuit comprises a delay counter having the phase of the machine cycle level, a first selector having the phase of the bit level and a second selector having the phase of the clock level; and bit-level and clock-level delay controls are sequentially carried out after a machine-cycle-level delay control is completed, so that the transmit/receive process part starts to access the shared memory.

4. A device for transmitting and receiving a frame including unique pattern information indicative of a starting point of digital information, said device comprising:

a machine clock generating circuit generating a machine clock having a machine cycle equal to a length of m bits where m is larger than 2 and equal to $(1/N) \times L$ where L denotes the number of bits forming the frame and N is a positive integer;

a receive synchronizing circuit which pulls the frame in a given phase of the machine cycle;

a shared memory in which first and second m-bit stream program information respectively define a receive procedure and a transmit procedure, and transmit control channel data are stored beforehand;

a transmit/receive process part which performs, in a receive process executing phase forming part of a same machine cycle as that processed by the receive synchronizing circuit, a receive process in which receive control channel data contained in a received frame is written into the shared memory in accordance with the first m-bit stream memory information, and which performs, in a transmit process executing phase forming another part of the same machine cycle, a transmit process in accordance with a second m-bit stream program information while reading the transmit control channel data stored in the shared memory; and a transmit phase control circuit which transmits the transmit control channel data in a phase of a bit level or a clock level;

wherein in said shared memory, there is stored beforehand periodic initialization program information which defines frame-based operation modes and process conditions, and the transmit/receive process part executes the transmit and receive processes in accordance with the periodic initialization program information;

wherein said receive synchronizing circuit comprises:

a pattern information detecting circuit which detects the pattern information in the phase of the bit level;

a receive frame synchronization protecting circuit which stabilizes a pattern information detecting operation of said pattern information detecting circuit;

a received frame length counter which performs a count operation in the phase of the machine cycle;

a pattern information synchronizing circuit which synchronizes a pattern information detecting signal output by the pattern information detecting circuit with a phase of the count operation of said received frame length counter;

a receive-part periodic initialization executing circuit which initializes a receive part of the transmit/receive process part in accordance with the periodic initialization program information; and a phase-level converting circuit which converts a pattern information hunting signal of the phase of the machine cycle level generated at an end of the periodic initialization for the receive part into another pattern information hunting signal having a phase of the bit level, and wherein:
the received frame length counter starts the initial setting and count operation in response to the pattern information detection signal having the phase of the machine cycle level;

when the received frame length counter overflows, the received frame length counter activates the receive-part periodic initialization executing circuit, which generates the pattern information hunting signal of the phase of the machine cycle level after completion of the initialization at a given counter value X and activates the received frame length counter again; and the received frame synchronization protection circuit protects the received frame synchronization by the pattern information detection signal having the phase of the bit level from the pattern information detecting circuit and the pattern information hunting signal having the phase of the bit level from the phase level converting circuit.

5. The device as claimed in claim 4, wherein the transmit phase control circuit comprises:

a transmit-part periodic initialization executing circuit which initializes a transmit part of the transmit/receive process part in accordance with periodic initialization program information; and a transmit delay control circuit which controls a transmit phase of a frame corresponding to the phase of the received frame, and wherein:
the received frame length counter activates the transmit-part periodic initialization executing circuit in advance of the phase of the received frame by a timing Y equal to the sum of a maximum control time of the transmit delay control circuit and a time Z necessary to execute the transmit-part periodic initialization; and the transmit-part periodic initialization executing circuit activates the transmit delay control circuit when the time Z elapses after completion of the transmit-part periodic initialization.

6. The device as claimed in claim 5, wherein:

the transmit delay control circuit includes a delay counter of the machine cycle level, a first selector having the phase of the bit level, and a second selector having the phase of the clock level;

the delay counter of the machine cycle level performs a delay control of the machine cycle level after activated;

the first and second selectors sequentially perform delay controls of the bit level and clock level, and then a transmit process part of the transmit/receive process part starts the transmission process.

* * * * *